United States Patent
Kim et al.

(10) Patent No.: US 12,225,609 B2
(45) Date of Patent: Feb. 11, 2025

(54) METHOD AND APPARATUS FOR PROVIDING HEAT GENERATION RELATED INFORMATION OF TERMINAL IN MOBILE COMMUNICATION SYSTEM SUPPORTING MULTIPLE CONNECTIONS

(71) Applicant: Samsung Electronics Co., Ltd., Suwon-si (KR)

(72) Inventors: Sangbum Kim, Suwon-si (KR); Soenghun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 346 days.

(21) Appl. No.: 17/768,459

(22) PCT Filed: Oct. 13, 2020

(86) PCT No.: PCT/KR2020/013930
§ 371 (c)(1),
(2) Date: Apr. 12, 2022

(87) PCT Pub. No.: WO2021/075822
PCT Pub. Date: Apr. 22, 2021

(65) Prior Publication Data
US 2023/0042702 A1    Feb. 9, 2023

(30) Foreign Application Priority Data

Oct. 14, 2019   (KR) .................. 10-2019-0127273
Nov. 6, 2019    (KR) .................. 10-2019-0140656
(Continued)

(51) Int. Cl.
*H04W 76/15*   (2018.01)
*H04W 8/24*    (2009.01)
*H04W 76/28*   (2018.01)

(52) U.S. Cl.
CPC ............. *H04W 76/15* (2018.02); *H04W 8/24* (2013.01); *H04W 76/28* (2018.02)

(58) Field of Classification Search
CPC ....... H04W 8/24; H04W 76/28; H04W 24/02; H04W 76/15; H04W 88/06
See application file for complete search history.

(56) References Cited

U.S. PATENT DOCUMENTS

| 11,382,049 B2 | 7/2022 | Kim et al. |
| 2020/0022095 A1 | 1/2020 | Kim et al. |

(Continued)

FOREIGN PATENT DOCUMENTS

| CN | 109451812 A | 3/2019 |
| CN | 110049563 A | 7/2019 |

(Continued)

OTHER PUBLICATIONS

International Search Report and Written Opinion of the International Searching Authority dated Jan. 12, 2021, in connection with International Application No. PCT/KR2020/013930, 8 pages.

(Continued)

*Primary Examiner* — Congvan Tran

(57) ABSTRACT

The present disclosure relates to a communication technique for combining, with IoT technology, a 5G communication system for supporting a higher data transmission rate than a 4G system, and a system therefor. The present disclosure may be applied to intelligent services, such as smart homes, smart buildings, smart cities, smart cars or connected cars, health care, digital education, retail, and security and safety related services, on the basis of 5G communication technologies and IoT-related technologies. The present disclosure discloses a method and an apparatus for reporting heat generation related information of a terminal.

20 Claims, 29 Drawing Sheets

(30) Foreign Application Priority Data

| Nov. 6, 2019 | (KR) | 10-2019-0140748 |
| Nov. 6, 2019 | (KR) | 10-2019-0140966 |
| Nov. 6, 2019 | (KR) | 10-2019-0141022 |
| Aug. 31, 2020 | (KR) | 10-2020-0110459 |

(56) References Cited

U.S. PATENT DOCUMENTS

| 2020/0100099 | A1* | 3/2020 | Tenny | H04W 8/24 |
| 2020/0106674 | A1* | 4/2020 | Van Der Velde | H04W 72/0453 |
| 2020/0162891 | A1 | 5/2020 | Hong | |
| 2020/0221289 | A1* | 7/2020 | Lee | H04W 8/24 |
| 2020/0275526 | A1* | 8/2020 | Sharma | H04W 88/10 |
| 2020/0351638 | A1* | 11/2020 | Kim | H04W 8/005 |
| 2021/0153086 | A1* | 5/2021 | Kim | H04W 80/08 |

FOREIGN PATENT DOCUMENTS

| KR | 10-2020-0044720 A | 4/2020 |
| KR | 10-2021-0007285 A | 1/2021 |
| KR | 10-2021-0044152 A | 4/2021 |
| WO | 2019059673 A1 | 3/2019 |

OTHER PUBLICATIONS

3GPP TS 38.133 V16.1.0 (Sep. 2019), Technical Specification, 3rd Generation Partnership Project; Technical Specification Group Radio Access Network; NR; Requirements for support of radio resource management (Release 16), Sep. 2019, 15 pages.

3GPP TS 36.133 V16.3.0 (Sep. 2019), Technical Specification, 3rd Generation Partnership Project; Technical Specification Group Radio Access Network; Evolved Universal Terrestrial Radio Access (E-UTRA); Requirements for support of radio resource management (Release 16), Sep. 2019, 86 pages.

3GPP TS 36.331 V15.7.0 (Sep. 2019), Technical Specification, 3rd Generation Partnership Project; Technical Specification Group Radio Access Network; Evolved Universal Terrestrial Radio Access (E-UTRA); Radio Resource Control (RRC); Protocol specification (Release 15), Sep. 2019, 945 pages.

Apple Inc., "UE overheating for EN-DC," R2-1802415, 3GPP TSG-RAN WG2 Meeting #101, Athens, Greece, Feb. 26-Mar. 2, 2018, 10 pages.

Catt, et al., "UE assistance for SCell," R2-1912112, 3GPP TSG-RAN WG2 Meeting #107bis, Chongqing, China, Oct. 14-18, 2019, 3 pages.

Ericsson, "UE Assistance Information for UE preferred SCell configuration," R2-1909991, 3GPP TSG-RAN2 Meeting #107, Prague, Czech Republic, Aug. 26-30, 2019, 5 pages.

Ericsson, et al., "cDRX enhancement for CA," R2-1913196, 3GPP TSG-RAN2 Meeting #107bis, Chongqing, China, Oct. 14-18, 2019, 14 pages.

Huawei, et al., "Further consideration on overheating issue in EN-DC scenario," R2-1911036, Revision of R2-1907865, 3GPP TSG-RAN2 Meeting #107, Prague, Czech Republic, Aug. 26-30, 2019, 4 pages.

Huawei, et al., "36.331 Draft CR for addressing overheating issue in EN-DC scenario—Option 1," R2-1913690, 3GPP TSG-RAN2 Meeting #107bis, Chongqing, China, Oct. 14-18, 2019, 9 pages.

Qualcomm Incorporated, "Extending LTE Overheating mechanism to NR," R2-1803617, 3GPP TSG-RAN WG2 #101, Athens, Greece, Feb. 26-Mar. 2, 2018, 4 pages.

Ericsson, "Overheating enhancements for EN-DC", 3GPP TSG-RAN WG2 #107bis, Oct. 14-18, 2019, Tdoc R2-1913529, 4 pages.

Huawei et al., "Signalling design for overheating reporting in (NG)EN-DC scenario", 3GPP TSG-RAN2 Meeting#107bis, Oct. 14-18, 2019, R2-1913689, 4 pages.

Supplementary European Search Report dated Sep. 6, 2022 in connection with European Patent Application No. 20 87 7219, 9 pages.

Examination report dated Apr. 18, 2024, in connection with Indian Application No. 202237021990, 6 pages.

Notification of the First Office Action dated Nov. 25, 2024, in connection with Chinese Patent Application No. 202080070928.0, 13 pages.

* cited by examiner

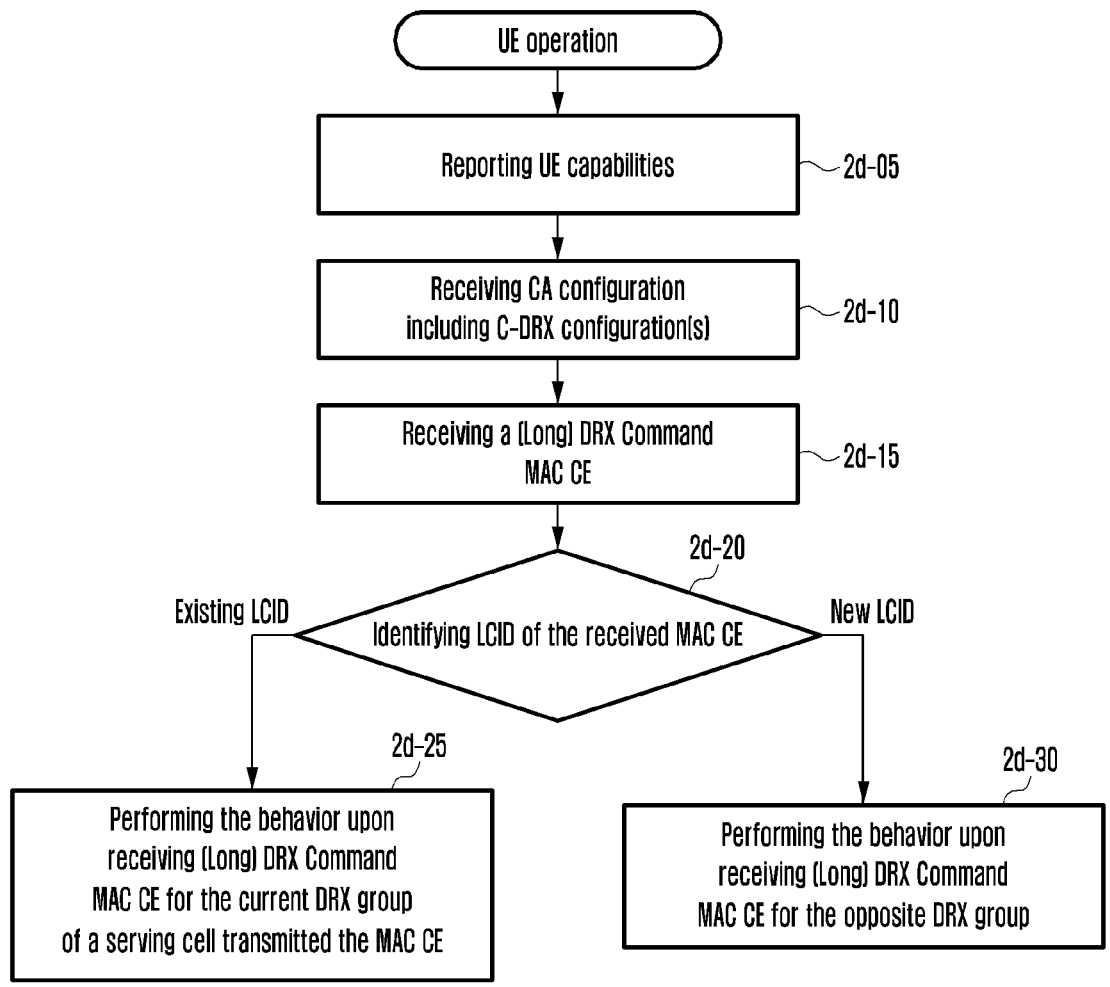

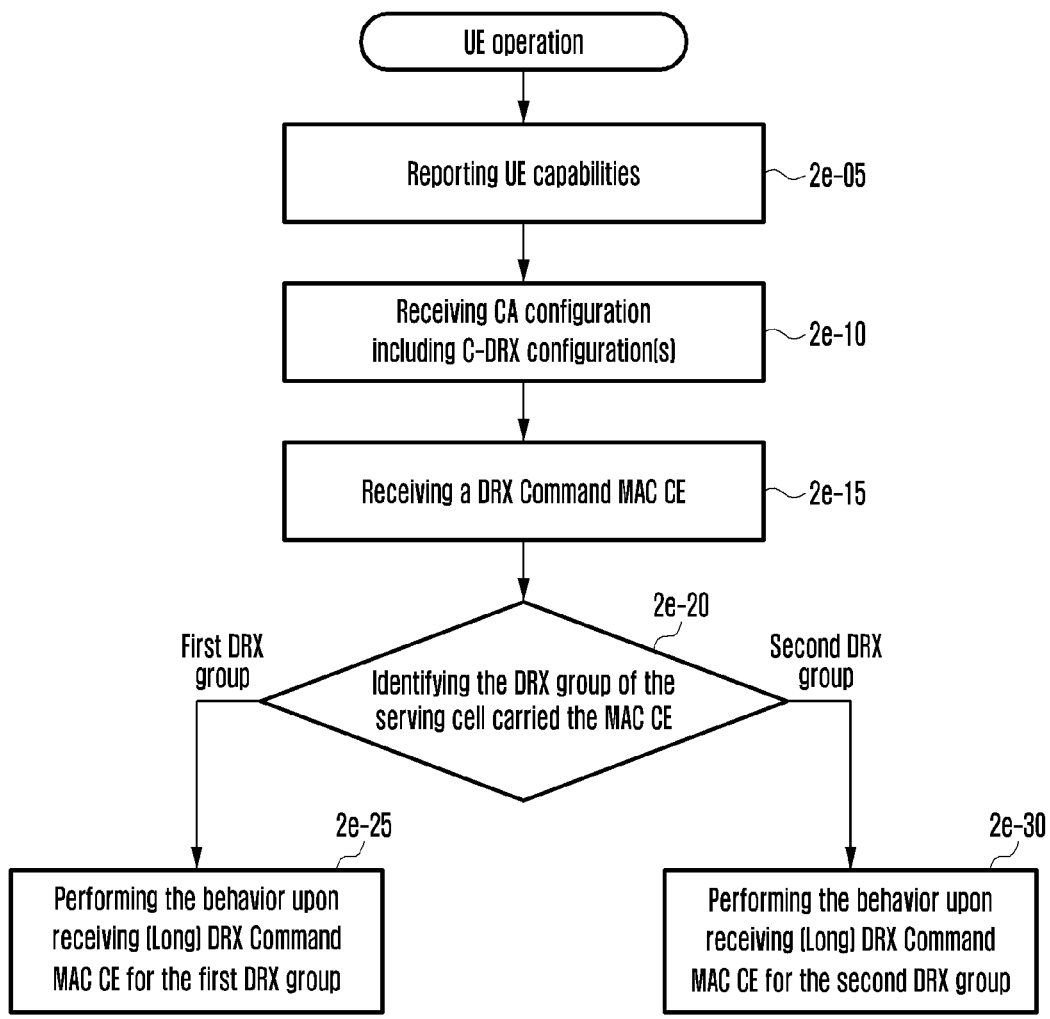

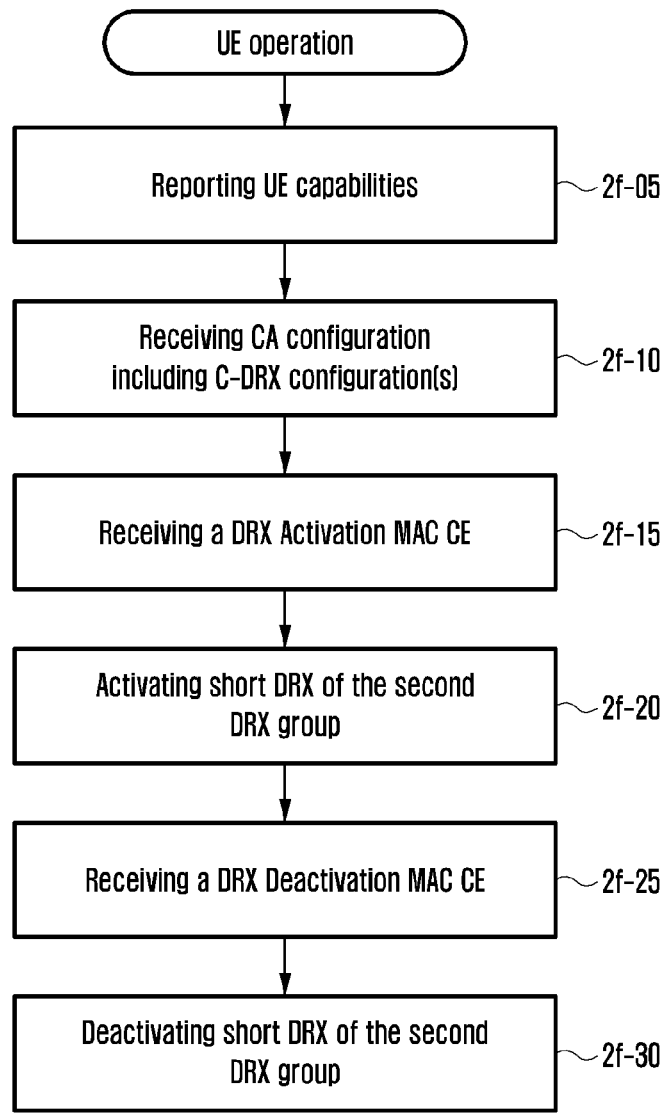

(a)

(b)

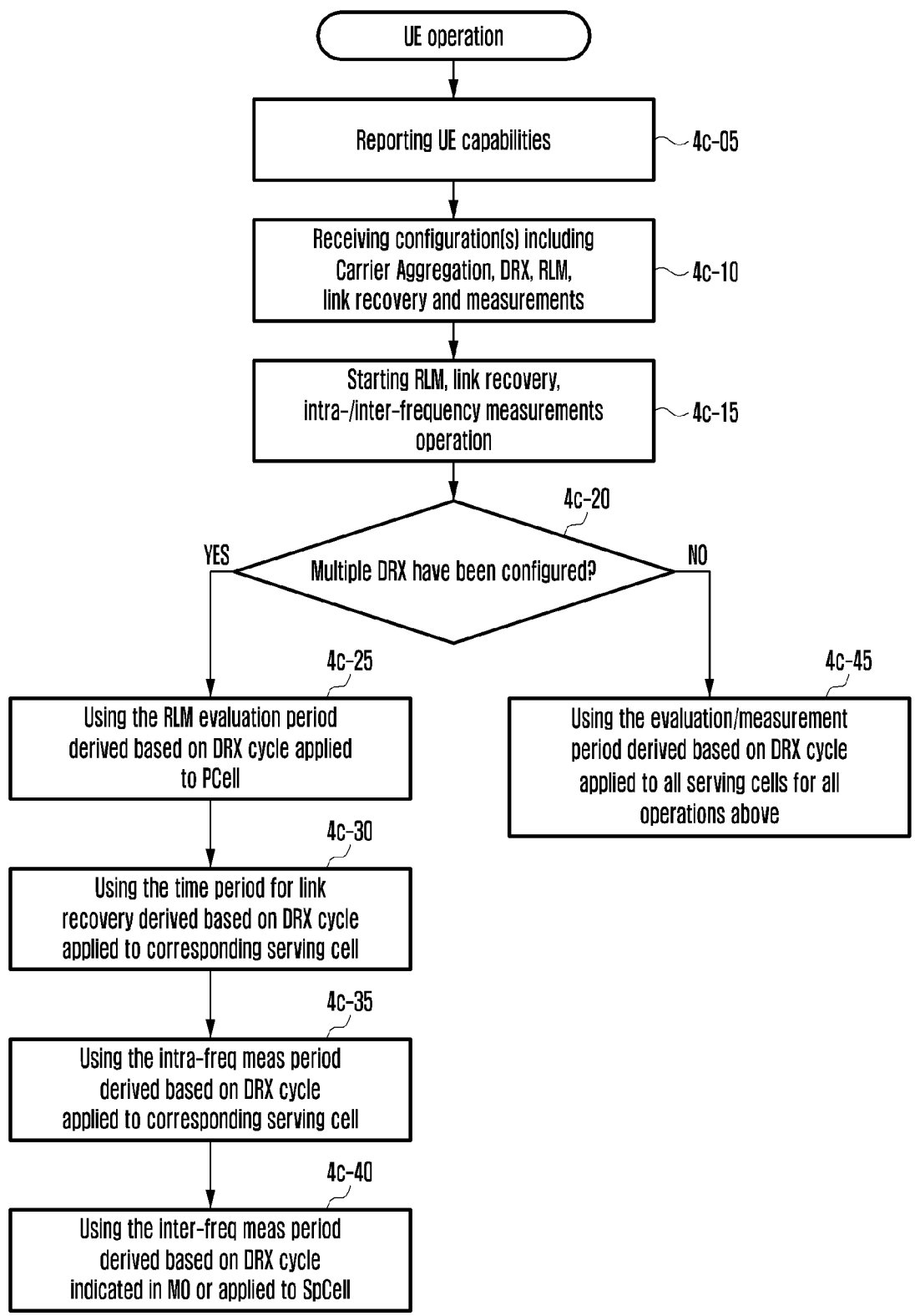

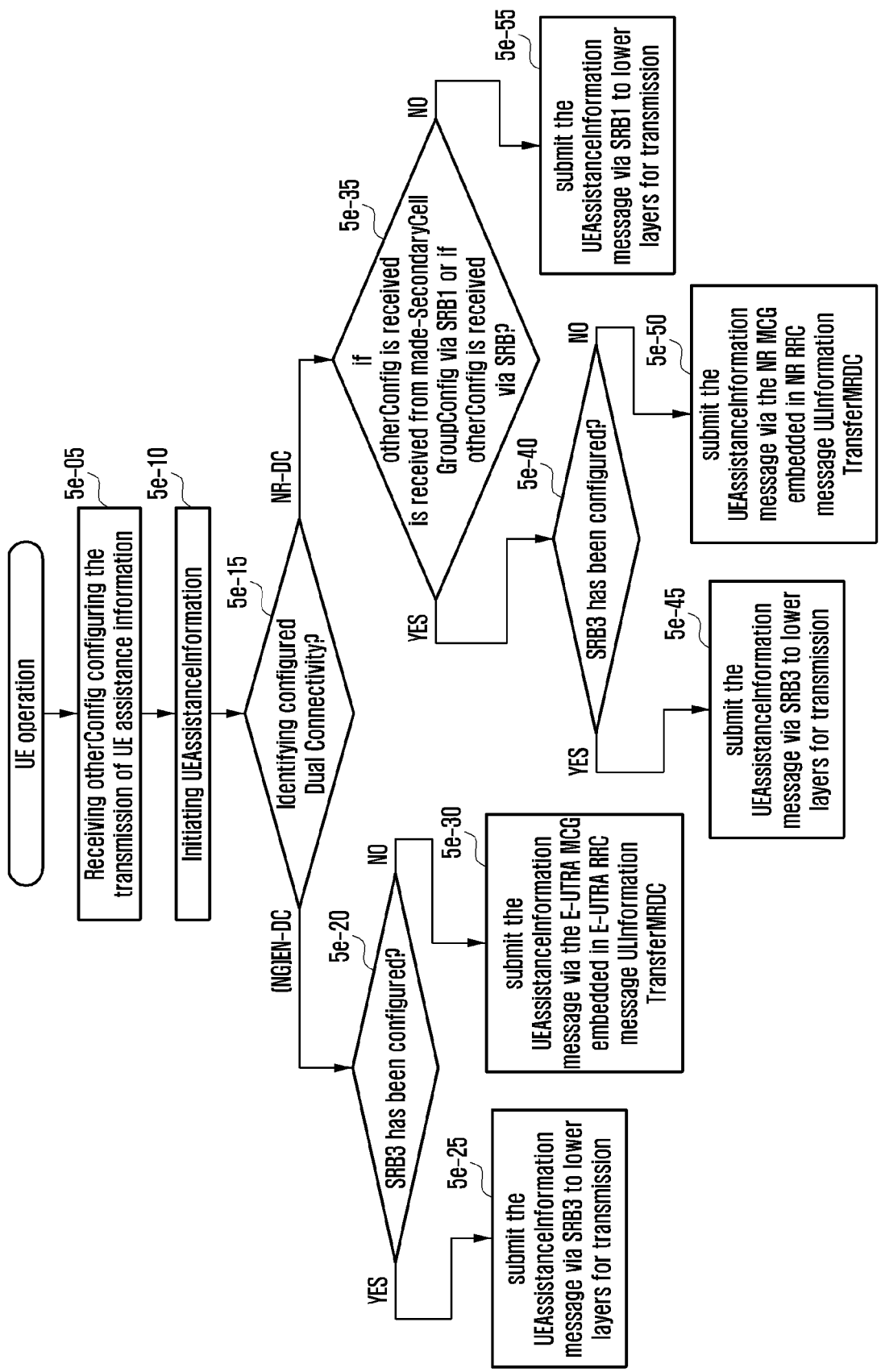

METHOD AND APPARATUS FOR PROVIDING HEAT GENERATION RELATED INFORMATION OF TERMINAL IN MOBILE COMMUNICATION SYSTEM SUPPORTING MULTIPLE CONNECTIONS

CROSS-REFERENCE TO RELATED APPLICATIONS

This application is a 371 National Stage of International Application No. PCT/KR2020/013930, filed Oct. 13, 2020, which claims priority to Korean Patent Application No. 10-2019-0127273, filed Oct. 14, 2019, Korean Patent Application No. 10-2019-0140656, filed Nov. 6, 2019, Korean Patent Application No. 10-2019-0140748, filed Nov. 6, 2019, Korean Patent Application No. 10-2019-0140966, filed Nov. 6, 2019, Korean Patent Application No. 10-2019-0141022, filed Nov. 6, 2019, and Korean Patent Application No. 10-2020-0110459, filed Aug. 31, 2020, the disclosures of which are herein incorporated by reference in their entirety.

BACKGROUND

The disclosure relates to a mobile communication system supporting dual connectivity (DC), and more particularly, to a method and device for providing heat related information of a terminal in a communication system supporting dual connectivity.

2. DESCRIPTION OF RELATED ART

In order to satisfy increases in demand for wireless data traffic now that a 4G communication system is commercially available, efforts are being made to develop an enhanced 5G communication system or a pre-5G communication system. Therefore, a 5G communication system or a pre-5G communication system is referred to as a beyond 4G network communication system or a post LTE system. The 5G communication system defined by 3GPP is referred to as the new radio (NR) system.

In order to achieve a high data transmission rate, consideration is being given to implementing the 5G communication system in a mmWave band (e.g., 60 GHz band). In order to mitigate any route loss of electronic waves in a mmWave band and to increase transmission distances of electronic waves, the technologies of beamforming, massive multiple input and multiple output (MIMO), full dimensional MIMO (FD-MIMO), array antenna, analog beamforming, and large scale antenna are being discussed for the 5G communication system.

Further, in order to enhance networks in the 5G communication system, the technologies of an innovative small cell, advanced small cell, cloud radio access network (cloud RAN), ultra-dense network, device to device communication (D2D), wireless backhaul, moving network, cooperative communication, coordinated multi-points (CoMP), and interference cancellation are being developed.

Further, hybrid frequency shift keying and quadrature amplitude modulation (FQAM) and sliding window superposition coding (SWSC), which are advanced coding modulation (ACM) methods; and filter bank multi carrier (FBMC), non-orthogonal multiple access (NOMA), and sparse code multiple access (SCMA), which are advanced access technologies, are being developed for the 5G system.

In the 5G system, the support for various services is being considered compared to the existing 4G system. For example, the most representative services may include an enhanced mobile broad band (eMBB), ultra-reliable and low latency communication (URLLC), massive machine type communication (mMTC), an evolved multimedia broadcast/multicast service (eMBMS), and the like. A system providing the URLLC service may be referred to as a URLLC system, and a system providing the eMBB service may be referred to as an eMBB system. Further, terms 'service' and 'system' may be used interchangeably.

The URLLC service is a service newly considered in the 5G system, unlike the existing 4G system, and requires ultra-high reliability (e.g., packet error rate about 10-5) and low latency (e.g., about 0.5 msec) conditions to be satisfied compared to other services. In order to satisfy such strict requirements, the URLLC service may need to apply a shorter transmission time interval (TTI) than that of the eMBB service, and various operation methods using this are being considered.

Innovation of Internet from a human-centered connection network in which a human generates and consumes information to an Internet of Things (IoT) network that gives and receives and processes information to and from distributed constituent elements such as things has occurred. Internet of Everything (IoE) technology in which big data processing technology through connection to a cloud server is combined with IoT technology has been appeared. In order to implement the IoT, technology elements such as sensing technology, wired and wireless communication and network infrastructure, service interface technology, and security technology are required; thus, nowadays, research is being carried out on technology of a sensor network, machine to machine (M2M), and machine type communication (MTC) for connection between things.

In an IoT environment, an intelligent Internet technology (IT) service that collects and analyzes data generated in connected things to provide a new value to human lives may be provided. The IoT may be applied to the field of a smart home, smart building, smart city, smart car or connected car, smart grid, health care, smart home appliances, and high-tech medical service through fusion and complex connections between existing information technology (IT) and various industries.

Accordingly, various attempts for applying a 5G communication system to an IoT network are being made. For example, 5G communication technologies such as a sensor network, machine to machine (M2M), and machine type communication (MTC) have been implemented by the technique of beamforming, MIMO, and array antenna. Application of a cloud RAN as the foregoing big data processing technology may be an example of convergence of 5G technology and IoT technology.

With the development of communication systems, various operations for dual connectivity are being specified.

SUMMARY

The disclosure provides a procedure for transmitting heat related information to each base station in a dual connectivity situation of a terminal. Further, the disclosure provides a procedure in which each base station supporting dual connectivity shares and negotiates heat related information reported from a terminal.

The disclosure provides a method and device in which a plurality of DRXs may be configured and in which one or more serving cells apply one of the plurality of configured DRXs.

The disclosure further provides a method and device for configuring and applying a (long) DRX command MAC CE for a plurality of DRXs.

The disclosure further provides a method and device in which a plurality of DRXs may be configured and in which one or more serving cells apply one of the plurality of configured DRXs.

The disclosure further provides a method and device in which a plurality of DRXs may be configured and in which one or more serving cells apply one of the plurality of configured DRXs.

The disclosure further provides a method and device for determining applied DRX upon radio link monitoring (RLM), link recovery, and measurement.

The disclosure further provides a method of transmitting control information to a base station in a mobile communication system.

The technical problems to be achieved in the disclosure are not limited to the technical problems mentioned above, and other technical problems not mentioned will be clearly understood by those of ordinary skill in the art to which the disclosure belongs from the description below.

According to an embodiment of the disclosure, a method performed by a terminal of a wireless communication system includes receiving, by the terminal, a first message including information indicating that the terminal can transmit first auxiliary information on a second base station to a first base station according to detection of internal overheating of the terminal from the first base station; detecting the internal overheating of the terminal; and transmitting a second message including the first auxiliary information on the second base station according to internal overheating of the terminal to the first base station.

Further, the first message may further include configuration information configuring the terminal to report second auxiliary information on the first base station according to detection of internal overheating of the terminal, the second message may further include the second auxiliary information on the first base station, the configuration information may include a timer configured to limit transmission of the second auxiliary information on the first base station, and the second message including the first auxiliary information on the second base station may not be transmitted to the first base station while the timer is running.

Further, the auxiliary information on the second base station may include at least one of maximum frequency bandwidth information preferred by the terminal in a frequency range 1 (FR1), maximum frequency bandwidth information preferred by the terminal in a frequency range 2 (FR2), information on the number of maximum multi input multi output (MIMO) layers preferred by the terminal in the FR1, information on the number of maximum MIMO layers preferred by the terminal in the FR2, or the number of maximum secondary cells (SCell) preferred by the terminal.

Further, the first base station may be a long term evolution (LTE) base station, and the second base station may be a new radio (NR) base station, and evolved universal terrestrial radio access (E-UTRA)-NR dual connectivity (EN-DC) by the first base station and the second base station may be configured to the terminal.

According to another embodiment of the disclosure, a method performed by a first base station of a wireless communication system includes transmitting, by the first base station, a first message including information indicating that the terminal can transmit first auxiliary information on the second base station to the first base station according to detection of internal overheating of the terminal to the terminal; receiving a second message including the first auxiliary information on the second base station according to the internal overheating of the terminal from the terminal; and transmitting the first auxiliary information on the second base station to the second base station.

According to another embodiment of the disclosure, a terminal of a wireless communication system includes a transceiver; and a controller configured to receive a first message including information indicating that the terminal can transmit first auxiliary information on the second base station to a first base station according to detecting of internal overheating of the terminal from the first base station through the transceiver, to detect the internal overheating of the terminal, and to transmit a second message including the first auxiliary information on the second base station according to the internal overheating of the terminal to the first base station through the transceiver.

According to another embodiment of the disclosure, a first base station of a wireless communication system includes a transceiver; and a controller configured to transmit a first message including information indicating that a terminal can transmit first auxiliary information on a second base station to the first base station according to detection of internal overheating of the terminal to the terminal through the transceiver, to receive a second message including the first auxiliary information on the second base station according to the internal overheating of the terminal from the terminal through the transceiver, and to transmit the first auxiliary information on the second base station to the base station through the transceiver.

According to various embodiments of the disclosure, a procedure in which a terminal of dual connectivity transmits heat related information to each base station can be efficiently performed, and a procedure in which each base station supporting dual connectivity of a terminal gives and receives heat related information reported from the terminal can also be performed efficiently.

Further, according to an embodiment of the disclosure, it is possible to provide a method and device in which a plurality of DRXs may be configured and in which one or more serving cells apply one of the plurality of configured DRXs.

Further, according to an embodiment of the disclosure, it is possible to provide a method and device for configuring and applying a (long) DRX command MAC CE for a plurality of DRXs.

Further, according to an embodiment of the disclosure, it is possible to provide a method and device in which a plurality of DRXs may be configured and in which one or more serving cells apply one of the plurality of configured DRXs.

Further, according to an embodiment of the disclosure, it is possible to provide a method and device in which a plurality of DRXs may be configured and in which one or more serving cells apply one of the plurality of configured DRXs.

Further, according to an embodiment of the disclosure, it is possible to provide a method and device for determining applied DRX upon radio link monitoring (RLM), link recovery, and measurement.

Further, according to an embodiment of the disclosure, control information can be efficiently transmitted to a base station in a mobile communication system.

The effects obtainable in the disclosure are not limited to the effects mentioned above, and other effects not mentioned may be clearly understood by those of ordinary skill in the art to which the disclosure belongs from the description below.

BRIEF DESCRIPTION OF THE DRAWINGS

FIG. 2D is a flowchart illustrating an operation of a terminal in a method of applying a new DRX command MAC CE in a first scenario according to an embodiment of the disclosure.

FIG. 2E is a flowchart illustrating an operation of a terminal in a method of recycling a conventional DRX command MAC CE in a first scenario according to an embodiment of the disclosure.

FIG. 2F is a flowchart illustrating an operation of a terminal for activating or deactivating second DRX configuration information in a second scenario according to an embodiment of the disclosure.

FIG. 4C is a flowchart illustrating an operation of a terminal for applying multiple DRX configuration information to RLM, link recovery, and measurement operations according to an embodiment of the disclosure.

FIG. 5E is a flowchart illustrating an operation of a terminal according to an embodiment of the disclosure.

DETAILED DESCRIPTION

Figure 1A:
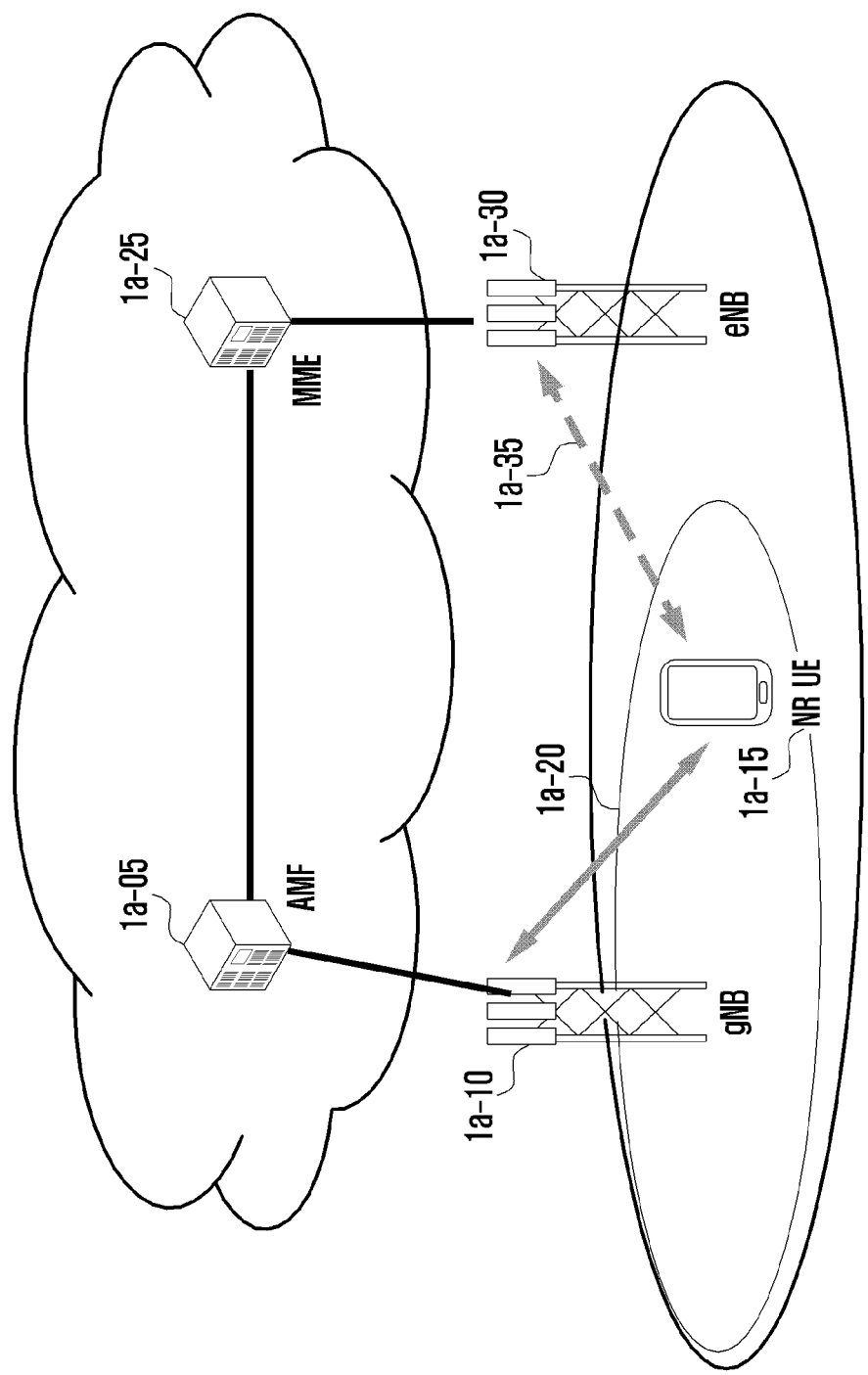
FIG. 1A is a diagram illustrating a structure of a mobile communication system according to an embodiment of the disclosure.

Hereinafter, an embodiment of the disclosure will be described with reference to the accompanying drawings. In the following description, in describing the disclosure, when it is determined that a detailed description of a related well-known function or configuration may unnecessarily obscure the gist of the disclosure, a detailed description thereof will be omitted.

For the same reason, some components are exaggerated, omitted, or schematically illustrated in the accompanying drawings. Further, the size of each component does not fully reflect the actual size. In each drawing, the same reference numerals are given to the same or corresponding components.

Hereinafter, a term identifying an access node used in the description, a term indicating network entities, a term indicating messages, a term indicating an interface between network objects, a term indicating various types of identification information and the like are exemplified for convenience of description. Accordingly, the disclosure is not limited to the terms described below, and other terms indicating objects having equivalent technical meanings may be used.

Hereinafter, for convenience of description, the disclosure uses terms and names defined in the 3rd generation partnership project long term evolution (3GPP LTE) standard. However, the disclosure is not limited by the above terms and names, and may be equally applied to systems conforming to other standards. In the disclosure, an evolved node B (eNB) may be used in combination with a gNB for convenience of description. That is, a base station described as an eNB may represent a gNB. Also, the term 'terminal' may refer to mobile phones, NB-IoT devices, sensors, as well as other wireless communication devices.

Advantages and features of the disclosure, and a method of achieving them will become apparent with reference to the embodiments described below in detail in conjunction with the accompanying drawings. However, the disclosure is not limited to the embodiments disclosed below, but may be implemented in various different forms, and only these embodiments enable the disclosure to be complete, and are provided to fully inform the scope of the disclosure to those of ordinary skill in the art to which the disclosure pertains, and the disclosure is only defined by the scope of the claims. Like reference numerals refer to like components throughout the specification.

In this case, it will be understood that each block of flowcharts and combinations of the flowcharts may be performed by computer program instructions. Because these computer program instructions may be mounted in a processor of a general purpose computer, special purpose computer, or other programmable data processing equipment, the instructions performed by a processor of a computer or other programmable data processing equipment generate a means that performs functions described in the flowchart block(s). Because these computer program instructions may be stored in a computer usable or computer readable memory that may direct a computer or other programmable data processing equipment in order to implement a function in a particular manner, the instructions stored in the computer usable or computer readable memory may produce a production article containing instruction means for performing the function described in the flowchart block(s). Because the computer program instructions may be mounted on a computer or other programmable data processing equipment, a series of operational steps are performed on the computer or other programmable data processing equipment to generate a computer-executed process; thus, instructions for performing a computer or other programmable data processing equipment may provide steps for performing functions described in the flowchart block(s).

Further, each block may represent a module, a segment, or a portion of a code including one or more executable instructions for executing specified logical function(s). Further, it should be noted that in some alternative implementations, functions recited in the blocks may occur out of order. For example, two blocks illustrated one after another may in fact be performed substantially simultaneously, or the blocks may be sometimes performed in the reverse order according to the corresponding function.

In this case, the term '-unit' used in this embodiment means software or hardware components such as FPGA or ASIC, and '-unit' performs certain roles. However, '-unit' is not limited to software or hardware. '-unit' may be configured to reside in an addressable storage medium or may be configured to reproduce one or more processors. Therefore, as an example, '-unit' includes components such as software components, object-oriented software components, class components, and task components, processes, functions, properties, procedures, subroutines, segments of program code, drivers, firmware, microcode, circuit, data, databases, data structures, tables, arrays, and variables. Functions provided in the components and '-units' may be combined into a smaller number of components and '-units' or may be further separated into additional components and '-units'. Further, components and '-units' may be implemented to reproduce one or more CPUs in a device or secure multimedia card.

FIG. 1A is a diagram illustrating a structure of a mobile communication system according to an embodiment of the disclosure.

With reference to FIG. 1A, as illustrated, a radio access network of a next generation mobile communication system (new radio (NR)) may be configured with a next generation base station (new radio node B, hereinafter, gNB) 1a-10 and an access management function (AMF, 1a-05, i.e., an entity of a new radio core network). Anew radio user equipment (hereinafter, NR UE or UE) 1a-15 accesses an external network through the gNB 1a-10 and the AMF 1a-05.

In FIG. 1A, the gNB 1a-10 correspond to an evolved node B (eNB) of the existing LTE system. The gNB 1a-10 is connected to the NR UE 1a-15 through a radio channel and may provide a service superior to that of the existing node B (1a-20). In the NR, because all user traffic is serviced through a shared channel, a device for collecting and scheduling status information such as a buffer status, an available transmission power status, and a channel status of UEs is required, and the gNB 1a-10 is responsible for this. One gNB 1a-10 typically controls a plurality of cells. In order to implement ultrahigh speed data transmission compared to existing LTE, the gNB 1a-10 may have more than the existing maximum bandwidth, and beamforming technology may be additionally grafted thereto using orthogonal frequency division multiplexing (hereinafter, referred to as OFDM) as radio access technology. Further, an adaptive modulation & coding (AMC) scheme that determines a modulation scheme and a channel coding rate according to the channel state of the UE is applied. The AMF 1a-05 performs functions such as mobility support, bearer configuration, and quality of service (QoS) configuration. The AMF 1a-05 is a device in charge of various control functions as well as a mobility management function for the UE and is connected to a plurality of base stations. Further, the NR may be linked with the existing LTE system, and the AMF 1a-05 is connected to a mobility management entity (MME) 1a-25 through a network interface. The MME 1a-25 is connected to an eNB 1a-30, which is the existing base station. A UE supporting LTE-NR dual connectivity (EN-DC) may transmit and receive data while maintaining a connection to not only the gNB 1a-10 but also the eNB 1a-30 (1a-35).

Figure 1B:
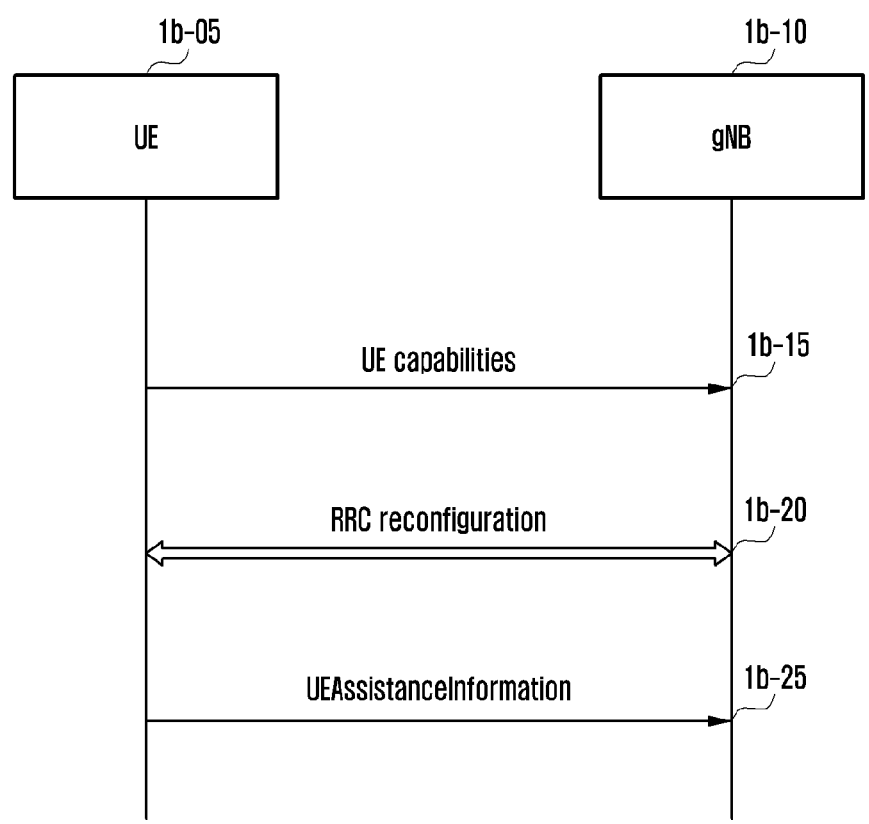
FIG. 1B is a message flow diagram illustrating a process of reporting predetermined information reporting preferences of a terminal to a base station in a mobile communication system according to an embodiment of the disclosure.

FIG. 1B is a message flow diagram illustrating a process of reporting predetermined information reporting UE preference to a base station in a mobile communication system according to an embodiment of the disclosure.

In LTE and NR mobile communication systems, the UE may report preference thereof compared to a current configuration to the base station. For example, in LTE, the UE may report the following preferences.

Power consumption reduction preference (UE power preference)
Preferred uplink/downlink bandwidth (BW preference)
Preferred delay budget
Preferred semi-persistent scheduling (SPS) configuration
Heating reduction preference (overheating assistance)

The base station that has reported the preferences may trigger a reconfiguration corresponding thereto. For example, the base station that has reported that power consumption reduction, delay reduction, and heat reduction are preferred may reconfigure by reducing or increasing a discontinuous reception (DRX) cycle.

In NR, the UE may report the preferred delay budget and heat reduction preference to the base station.

In particular, in NR, the UE may report in more detail preferred reconfiguration items in order to reduce a heat compared to LTE. That is, in LTE, the UE may indicate a preferred UE category and the number of maximum secondary cells (SCells) preferred by the UE for heat reduction, whereas in NR, the UE may indicate the number of preferred maximum SCells, aggregated BW (frequency bandwidth), and the number of maximum multiple input multiple output (MIMO) layers.

In a procedure for reporting the preference, first, a UE 1b-05 reports to a base station 1b-10 that it has a capability to report each of the above items (1b-15). The base station configures that the UE may report each preference to the base station at a necessary time point for each preference based on the capability information (1b-20). The UE reports a preference thereof to the base station at a necessary time point (1b-25).

Figure 1C:
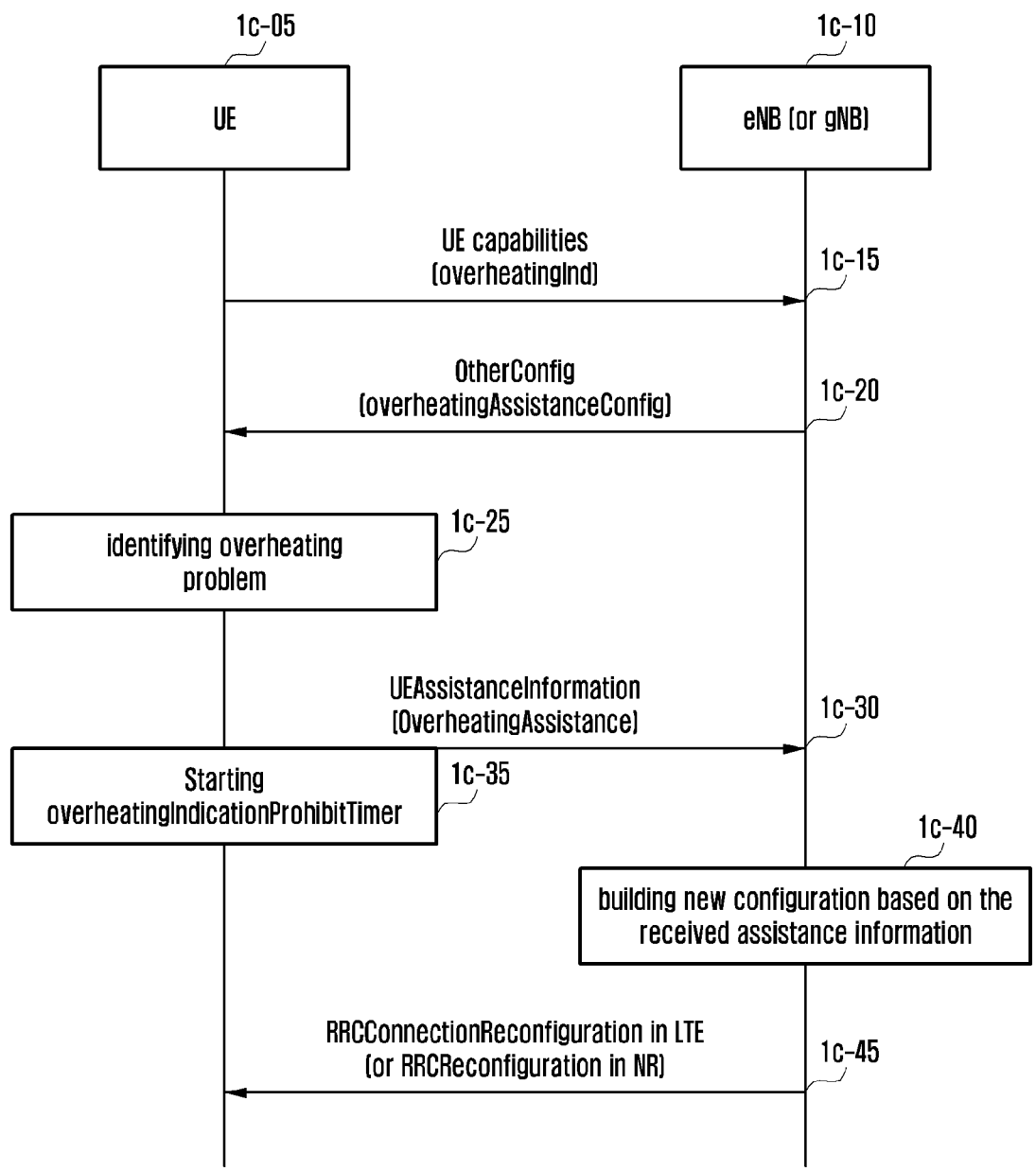
FIG. 1C is a message flow diagram illustrating a process in which a terminal reports predetermined information to a base station in order to alleviate terminal overheating in a mobile communication system according to an embodiment of the disclosure.

FIG. 1C is a message flow diagram illustrating a process in which a UE reports predetermined information to a base station in order to alleviate UE overheating in a mobile communication system according to an embodiment of the disclosure.

In two mobile communication systems LTE and NR, there are many similarities in a process in which the UE reports information for overheating alleviation. Because the UE may be overheated in a data transmission and reception process, a reconfiguration from the base station may be required to alleviate UE heating. To this end, the mobile communication system introduced a process in which the UE reports predetermined information to the base station in order to alleviate UE heating. The predetermined information is reconfiguration information preferred by the UE for the purpose of suppressing overheating.

A UE 1c-05 reports to a base station 1c-10 that it has a capability to report the predetermined information (1c-15). The base station configures that the UE can report the predetermined information to itself through a predetermined information element (IE), for example, an overheatingAssistanceConfig IE. The IE may include a value of one prohibit timer, overheatingIndicationProhibitTimer. A timer 1c-35 is driven when the UE recognizes overheating (1c-25) and the predetermined information is reported (1c-30), and the predetermined information may not be reported again while the timer is running. This is to prevent a signaling overhead from excessively occurring due to frequent triggering of the report. The predetermined information is stored in the overheatingAssistance IE, and is transmitted to the base station through a UEAssistanceInformation message, which is one radio resource control (RRC) message. In the two mobile communication systems LTE and NR, information stored in the overheatingAssistance IE is different.

In TS36.331, which is the LTE standard document, the overheatingAssisatnce IE is illustrated in Table 1.

TABLE 1

| | |
|---|---|
| OverheatingAssistance-r14 ::= | SEQUENCE { |
| reducedUE-Category | SEQUENCE { |
| reducedUE-CategoryDL | INTEGER (0..19), |
| reducedUE-CategoryUL | INTEGER (0..21) |
| } OPTIOLAL, | |
| reducedMaxCCs | SEQUENCE { |
| reducedCCs DL | INTEGER (0..31), |
| reducedCCSUL | INTEGER (0..31) |
| } OPTIOLAL | |
| } | |

In [Table 1], reduced UE-Category indicates a UE category preferred by the UE. The UE category is an indicator for classifying overall capabilities of the UE. For example, the higher the UE category, the better a data transfer rate.

reducedMaxCCs indicates the number of maximum SCells preferred by the UE. The information is indicated for each uplink and downlink.

However, the overheatingAssistance IE in the NR standard document TS38.331 is illustrated in [Table 2].

TABLE 2

| | |
|---|---|
| OverheatingAssistance ::= | SEQUENCE { |
| reducedMaxCCs | SEQUENCE { |
| reducedCCsDL | INTEGER (0..31), |
| reducedCCSUL | INTEGER (0..31) |
| } OPTIOLAL, | |
| reducedMaxBW-FRI | SEQUENCE { |
| reducedBW-FR1-DL | ReducedAggregatedBandwidth, |
| reducedBW-FR1-UL | ReducedAggregatedBandwidth |
| } OPTIOLAL, | |
| reducedMaxBW-FR2 | SEQUENCE { |
| reducedBW-FRZ-DL | ReducedAggregatedBandwidth, |
| reducedBW-FR2-UL | ReducedAggregatedBandwidth |
| } OPTIOLAL, | |
| reducedMaxMIMO-LayersFRI | SEQUENCE { |
| reducedMIMO-LayersFRI-DL | MIMO-LayersDL, |
| reducedMIMO-LayersFRI-UL | MIMO-LayersUL |
| } OPTIOLAL, | |
| reducedMaxMIMO-LayersER2 | SEQUENCE { |
| reducedMIMO-LayersFR2-DL | MIMO-LayersDL, |
| reducedMIMO-LayersFR2-UL | MIMO-LayersUL |
| } OPTIOLAL | |
| } | |

In [Table 2], reducedMaxCCs indicates the number of maximum SCells preferred by the UE. The information is indicated for each uplink and downlink.

reducedMaxBW-FR1 and reducedMaxBW-FR2 indicate a maximum frequency bandwidth preferred by the UE in a frequency range 1 (FR1) and a frequency range 2 (FR2), respectively. The information is indicated for each uplink and downlink. An FR is a frequency range defined by the NR standard, the FR1 means a lower frequency range based on a specific frequency, and the FR2 means an upper frequency range. reducedMaxBW-FR2 may indicate 0 MHz, which means requesting FR2 release. In reducedMaxBW-FR1, 0 MHz cannot be indicated.

reducedMaxMIMO-LayersFR1 and reducedMaxMIMO-LayersFR2 indicate the number of maximum MIMO layers preferred by the UE in the FR1 and FR2, respectively. The information is indicated for each uplink and downlink.

In overheatingAssistance IE in LTE and NR, reducedMaxCCs are the same. Further, reducedMaxBW and reducedMaxMIMO-Layers of overheatingAssistance IE in NR may be indicated for each FR1 and FR2. For reference, in an EN-DC scenario, an LTE frequency belongs to the FR1, and an NR frequency belongs to the FR1 or FR2.

The UE may transmit RRC message UEAssistanceInformation that stores the IE to report reconfiguration information preferred by itself in order to prevent overheating. In both LTE and NR, a name of the RRC message is the same. Upon receiving the IE, the base station may perform a reconfiguration based on the reconfiguration information suggested by the UE (1c-40). In this case, whether an actual reconfiguration is performed and a reconfigured parameter configuration value are determined by the base station.

The reconfiguration information is provided to the UE through RRCReconfiguration, which is one RRC message (1c-45).

The disclosure proposes a method of reporting UE preference in order to prevent overheating in an EN-DC scenario. The disclosure proposes information included in a procedure for the UE to report the preference according to an option. Dual connectivity (DC) is technology in which a UE is connected to two or more base stations to receive a service. In this case, the two base stations may provide a service to the UE through a separate scheduler within a range not exceeding a capability of the UE through mutual interworking. A base station to which a PCell belongs is referred to as a master node (MN), and a base station to which a PCell does not belong is referred to as a secondary node (SN). There are several types of dual connectivity according to the RAT to which the base stations belong. For example, dual connectivity between NR base stations is NR DC, dual connectivity between an LTE base station (PCell)-NR base station is EN-DC, and dual connectivity between an NR base station (PCell)-LTE base station is NE-DC. An LTE overheatingAssistance IE introduced above in an EN-DC scenario is also considered in the NR SCell, which is SN in reducedMaxCC. However, the UE cannot request a change in configuration information related to NR for preventing overheating other than reducedMaxCC. The NR overheatingAssistance IE is not defined to be transmitted to the NR, which is the SN in the EN-DC scenario. Accordingly, the disclosure aims to report NR overheatingAssistance level information to a network in the EN-DC scenario so that the MN and SN may reconfigure for mitigating overheating. The disclosure considers the following two options for the reporting procedure.

Option 1: additional information is defined in overheatingAssistance included in UEAssistanceInformation, which is an LTE RRC message. The information is forwarded to the SN.

Option 2: UEAssistanceInformation, which is an NR RRC message is transmitted to the SN via the MN or directly. If signaling radio bearer 3 (SRB3) is configured, the UE may directly transmit the message to the SN, and if SRB3 is not configured, the UE reports reception information of NR overheatingAssistance to the MN using UEInformationTransferMRDC, which is an LTE RRC message. The information is forwarded to the SN.

Figure 1D:
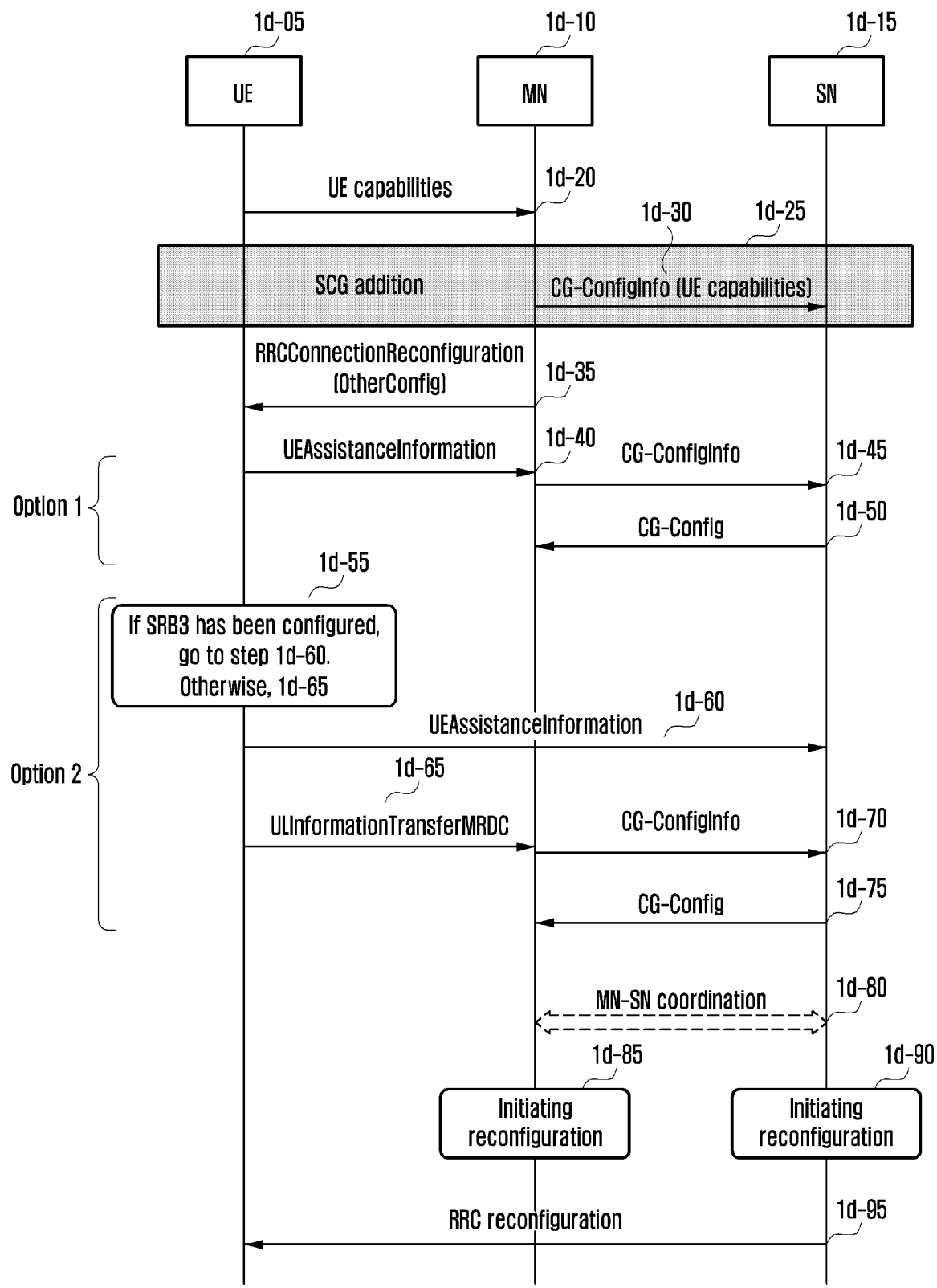
FIG. 1D is a message flow diagram illustrating a process of reporting predetermined information reporting UE preference to a base station in order to prevent overheating in an EN-DC (EUTRA-NR DC) scenario according to an embodiment of the disclosure.

FIG. 1D is a message flow diagram illustrating a process of reporting predetermined information reporting UE preference to a base station in order to prevent overheating in an EN-DC (EUTRA-NR DC) scenario according to an embodiment of the disclosure.

A UE 1d-05 reports capability information thereof to an MN 1d-10. The capability information includes capability information reporting the UE preference and a supporting DC scenario (1d-20).

The MN 1d-10 configures EN-DC to the UE through coordination with an SN 1d-15 (1d-25). In a coordination process, the MN 1d-10 transmits capability information of the UE to the SN 1d-15 through a predetermined inter-node message (CG-ConfigInfo) (1d-30).

The UE 1d-05 reports assistance information to the network according to predetermined conditions.

The MN 1d-10 configures that the assistance information may be reported to the UE 1d-05 through a predetermined RRC message, if necessary (1d-35). The MN 1d-10 may configure which information may be specifically transmitted. For example, the following information or values may be configured.

conventional LTE overheatingAssistance IE through LTE UEAssistanceInformation message (In case of option 1) LTE overheatingAssistance IE including additional information through LTE UEAssistanceInformation message (In case of option 2) NR overheatingAssistance IE through SRB3 or UEInformationTransferMRDC message The MN 1d-10 configures a new prohibit timer, overheatingIndicationProhibitTimerExt, for the new procedure option 1 or option 2 in addition to the existing prohibit timer and overheatingIndicationProhibitTimer.

The new timer may operate independently of the conventional timer. That is, the new timer starts running when new LTE overheatingAssistance or NR overheatingAssistance is transmitted, and the information cannot be newly transmitted while the timer is running.

In another embodiment, when new overheatingAssistance information is transmitted through the option 1 procedure, the existing prohibit timer operates, but a new independent timer for the option 2 procedure is introduced.

In another embodiment, a new prohibit timer for the option 1 or option 2 is defined, and when the conventional overheatingAssistance information is transmitted, the conventional prohibit timer starts running, otherwise, when the related information is transmitted according to the new procedure, a new prohibit timer starts running. In this case, when any timer is running, any kind of overheatingAssistance information cannot be transmitted.

In another embodiment, the conventional prohibit timer may be reused in the new procedure. In this case, the timer starts running no matter what kind of overheatingAssistance information is reported, and any kind of overheatingAssistance information cannot be transmitted while the timer is running.

The conventional LTE overheatingAssistance IE and the new LTE overheatingAssistance IE or NR overheatingAssistance IE may be configured at the same time.

In the EN-DC scenario, detailed information included in the new LTE overheatingAssitance IE or NR overheatingAssistance IE will be described later.

The UE 1d-05 triggers an operation of reporting the preference. For example, the UE determines to report the preference in case that UE heat exceeds a predetermined threshold.

Through the option 1 procedure, when the UE 1d-05 reports a preference for preventing overheating, the UE 1d-05 adds additional information in addition to the conventional overheatingAssistance IE to an LTE UEAssistanceInformation message. The added information is information included in the NR overheatingAssistnace IE, except for the reducedMaxCCs IE. That is, according to the procedure of the option 1, additional information included in the message reported by the UE may be configured, as illustrated in [Table 3].

TABLE 3

| | |
|---|---|
| reducedMaxBW-FR1 | SEQUENCE { |
|     reducedBW-FR1-DL |     ReducedAggregatedBandwidth, |
|     reducedBW-FR1-UL |     ReducedAggregatedBandwidth |
| } OPTIOLAL, | |
| reducedMaxBW-FR2 | SEQUENCE { |
|     reducedBW-FR2-DL |     ReducedAggregatedBandwidth, |
|     reducedBW-FR2-UL |     ReducedAggregatedBandwidth |
| } OPTIOLAL, | |
| reducedMaxMIMO-LayersFR1 | SEQUENCE { |
|     reducedMIMO-LayersFR1-DL |     MIMO-LayersDL, |
|     reducedMIMO-LayersFR1-UL |     MIMO-LayersUL |
| } OPTIOLAL, | |

TABLE 3-continued

| | |
|---|---|
| reducedMaxMIMO-Layers FR2 | SEQUENCE { |
|     reducedMIMO-LayersFR2-DL | MIMO-LayersDL, |
|     reducedMIMO-LayersFR2-UL | MIMO-LayersUL |
| } OPTIOLAL | |

The information in [Table 3] is stored in an IE separated from the conventional overheatingAssistance IE in the UEAssistanceInformation message. The UE 1d-05 transmits UEAssistanceInformation message containing the information to the MN 1d-10 (1d-40). The conventional overheatingAssistance IE and the IE containing new information may be simultaneously included in the UEAssistanceInformation message. In option 1 procedure, the conventional prohibit timer is reused. Upon receiving the message, the MN 1d-10 forwards FR2 specific information (or SN specific information) to the SN 1d-15 (1d-45). For example, reducedMaxBW-FR2 IE and reducedMaxMIMO-LayersFR2 IE are FR2 specific information and need to be recognized by the SN 1d-15. Because the SN 1d-15 may have an SCell driven in the FR1, when the SCell driven in the FR1 is configured to the SN 1d-15, FR1 specific information, reducedMaxBW-FR1 IE, and reducedMaxMIMO-LayersFR1 IE need to be forwarded to the SN 1d-15. Alternatively, coordinated information may be transmitted to the SN 1d-15 by the MN 1d-10. For example, the processed reducedMaxBW-FR1 information may be transmitted to the SN 1d-15 in consideration of the reduced BW in the MN 1d-10. The SN 1d-15 may perform reconfiguration based on the transmitted information, and, if necessary, the SN 1d-15 notifies the MN 1d-10 of this or requests a reconfiguration so that a negotiation process may be performed between the MN 1d-10 and the SN 1d-15 (1d-50).

Through the option 2 procedure, when the UE 1d-05 reports a preference for preventing overheating, the UE 1d-05 determines whether SRB3 is configured to the SN 1d-15 (1d-55). When the SRB3 is configured, the UE 1d-05 directly transmits an NR UEAssistanceInformation message containing the NR overheatingAssistance IE to the SN 1d-15 (1d-60). Otherwise, if the SRB3 is not configured, the UE 1d-05 stores the overheatingAssistance information in the ULInformationTransferMRDC message and transmits the ULInformationTransferMRDC message to the MN 1d-10 (1d-65). The MN 1d-10 forwards all of the received information or FR2 specific information (or SN specific information) to the SN 1d-15 (1d-70). When SRB3 is configured and the SN 1d-15 directly receives the overheatingAssistance information, FR1 specific information (or MN specific information) may be forwarded to the MN 1d-10 (1d-75). FR1 specific information is reducedMaxBW-FR1 IE and reducedMaxMIMO-LayersFR1 IE. The reducedMaxCCs are also forwarded to the MN 1d-10 for coordination with the MN 1d-10.

The option 2 procedure and the existing LTE overheatingAssistance reporting procedure (using the LTE UEAssistanceInformation message) may be configured at the same time. In this case, specific information may be transmitted to both the MN 1d-10 and the SN 1d-15 with the same value or different values. For example, reducedMaxCCs is defined in both the existing LTE overheatingAssistance IE and the NR overheatingAssistance IE. This may cause confusion in the MN 1d-10 or the SN 1d-15, and unnecessarily complicate the coordination process. Therefore, when option 2 procedure and the existing LTE overheatingAssistance reporting procedure are configured at the same time, the reducedMaxCCs may be limited to be always stored only in the LTE overheatingAssistance IE, or to be always stored in only one of the LTE overheatingAssistance IE and the NR overheatingAssistance IE. Alternatively, it may be configured in which IE the MN 1d-10 is stored. When only the option 2 procedure is configured, the reducedMaxCCs are stored in the NR overheatingAssistance IE.

The MN 1d-10 and the SN 1d-15, which have obtained the above information, perform coordination (1d-80). The MN 1d-10 finally determines the number of CCs of the MN 1d-10 and the SN 1d-15 to be reduced to prevent overheating. Further, when the SN 1d-15 is also using the FR1, the MN 1d-10 finally determines FR1 BW of the MN 1d-10 and the SN 1d-15 to be reduced to prevent overheating.

The MN 1d-10 and the SN 1d-15 trigger a reconfiguration based on the information (1d-85, 1d-90). The MN 1d-10 and the SN 1d-15 reconfigure the UE 1d-05 (1d-95).

As another embodiment, a method of negotiating the options 1 and 2 may be proposed.

ReducedMaxBW-FR1 IE and reducedMaxMIMO-LayersFR1 IE information is added to LTE overheatingAssistance. The information is stored in the LTE UEAssistanceInformation message and transmitted to the MN 1d-10. However, NR overheatingAssistance information excluding the reducedMaxCCs IE, the reducedMaxBW-FR1 IE, and the reducedMaxMIMO-LayersFR1 IE is transmitted through a procedure of the option 2.

In order to reduce the complexity of the coordination process between the MN 1d-10 and the SN 1d-15, the reducedMaxCCs and reducedMaxBW-FR1 information may be reported separately for each MN 1d-10 and SN 1d-15. That is, reducedMaxCCs and reducedMaxBW-FR1 information reported in LTE overheatingAssistance is considered to be limited only to the MN 1d-10, and reducedMaxCCs and reducedMaxBW-FR1 information reported in NR overheatingAssistance is considered to be limited only to the SN 1d-15 through a procedure of the option 2.

Figure 1E:
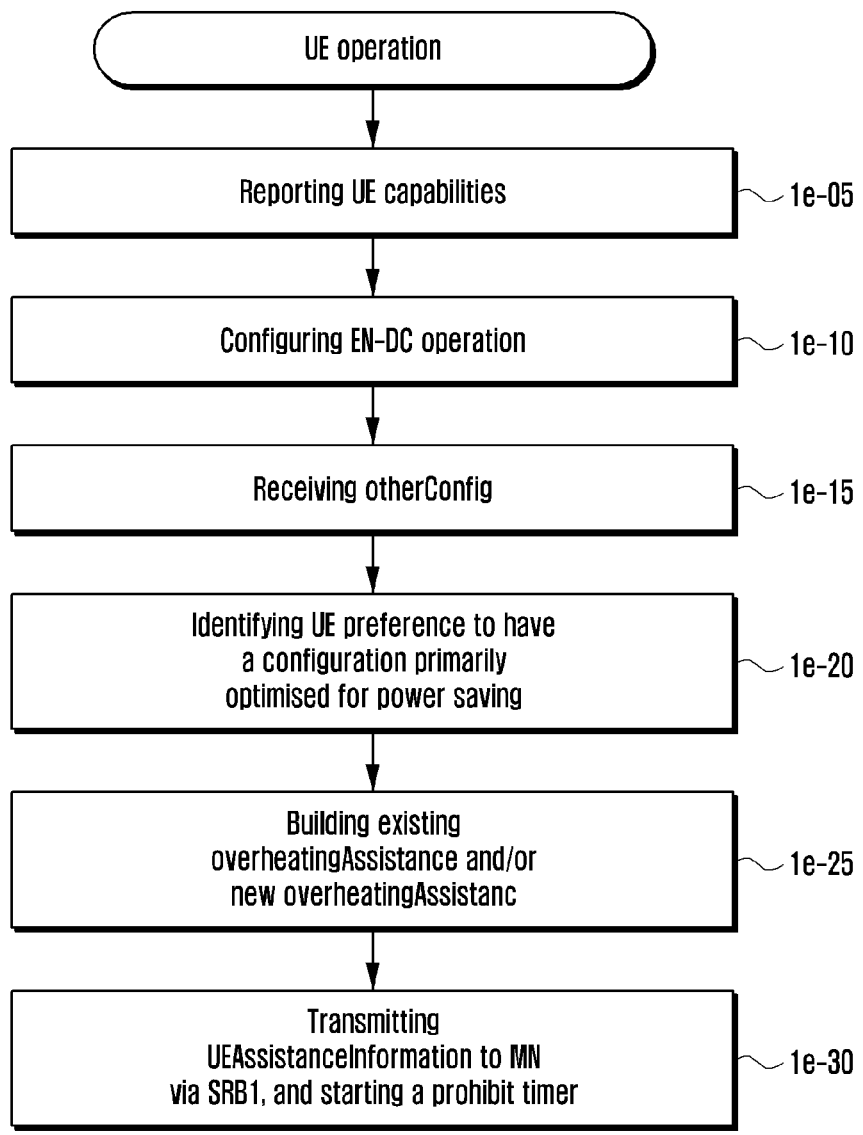
FIG. 1E is a flowchart illustrating an operation of a terminal in an option 1 procedure according to an embodiment of the disclosure.

FIG. 1E is a flowchart illustrating a UE operation in an option 1 procedure according to an embodiment of the disclosure.

In step 1e-05, the UE reports capability information thereof to the MN. The capability information includes capability information reporting the UE preference and a supporting DC scenario.

In step 1e-10, the UE receives a configuration of EN-DC from the MN.

In step 1e-15, the UE is configured to be able to report the conventional and new overheating assistance information from the MN. The configuration that new overheating assistance information may be reported may mean that the conventional overheating assistance IE may also be reported.

In step 1e-20, the UE recognizes that a reconfiguration is required to prevent overheating.

In step 1e-25, the UE configures a new IE containing the conventional overheatingAssistance IE, reducedMaxBW-FR1 IE, reducedMaxBW-FR2 IE, reducedMaxMIMO-LayersFR3, and reducedMaxMIMO-LayersFR3. When the new IE may also configure information stored in the overheatingAssistance IE, there is no need to configure the conventional IE.

In step 1e-30, the UE transmits a UEAssistanceInformation message containing the IE to the MN, and drives a corresponding prohibit timer. The message is SRB1.

Figure 1F:
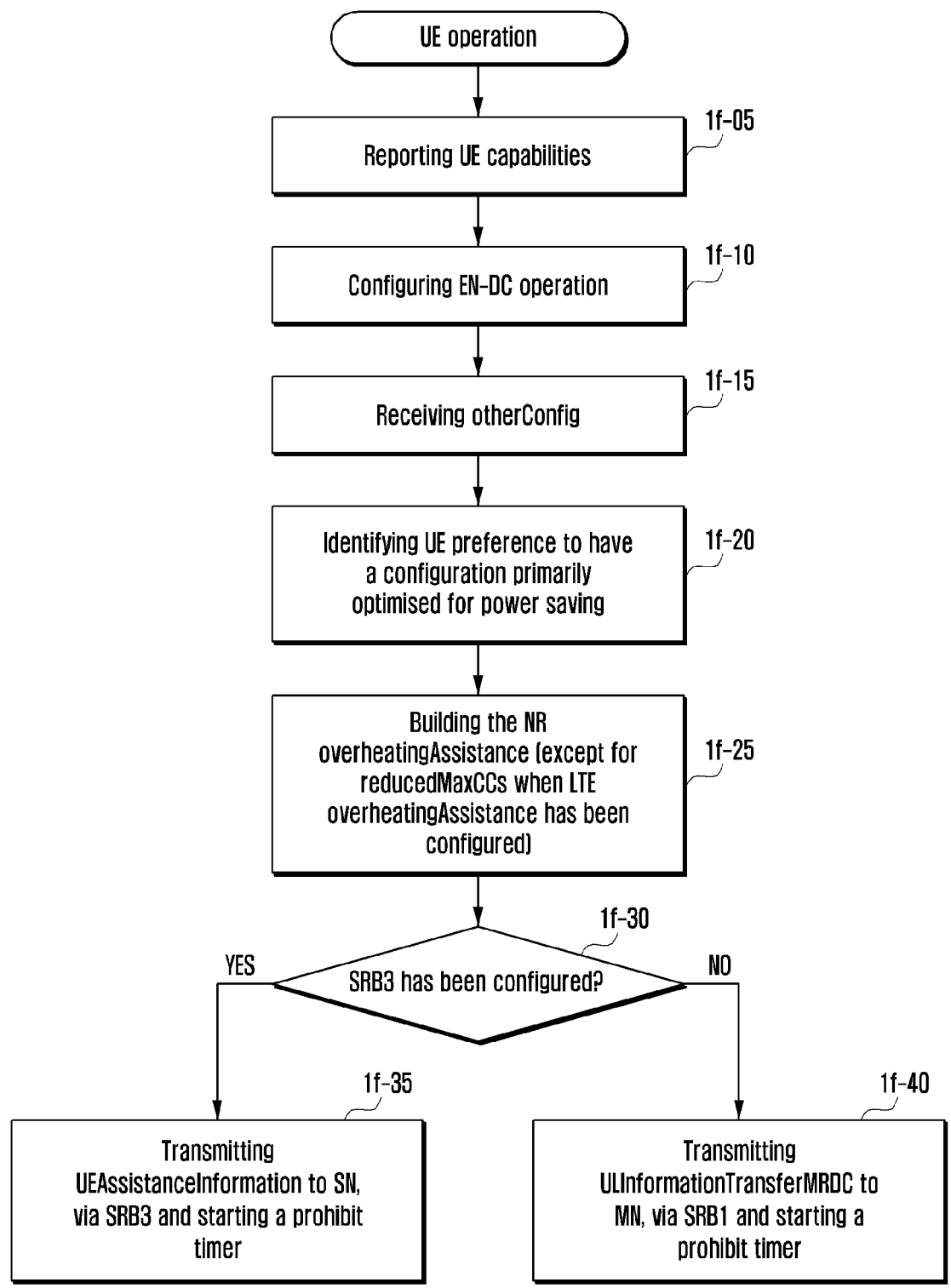
FIG. 1F is a flowchart illustrating an operation of a terminal in an option 2 procedure according to an embodiment of the disclosure.

FIG. 1F is a flowchart illustrating a UE operation in an option 2 procedure according to an embodiment of the disclosure.

In step 1*f*-05, the UE reports capability information thereof to the MN. The capability information includes capability information reporting the UE preference and a supporting DC scenario.

In step 1*f*-10, the UE receives a configuration of EN-DC from the MN.

In step 1*f*-15, the UE is configured to be able to report the conventional and new overheating assistance information from the MN. The configuration that new overheating assistance information may be reported may mean that the conventional overheating assistance IE may also be reported.

In step 1*f*-20, the UE recognizes that a reconfiguration is required to prevent overheating.

In step 1*f*-25, the UE configures an NR overheatingAssistance IE. When the report of LTE overheatingAssistance IE is also configured, specific information such as reducedMaxCCs is not included in the NR overheatingAssistance IE.

In step 1*f*-30, the UE determines whether SRB3 has been configured.

In step 1*f*-35, the UE transmits a UEAssistanceInformation message containing the IE to the SN and drives a corresponding prohibit timer. The message is SRB3.

In step 1*f*-40, the UE transmits a ULInformationTransferMRDC message containing the IE to the SN and drives a corresponding prohibit timer. The message is SRB1.

Figure 1G:
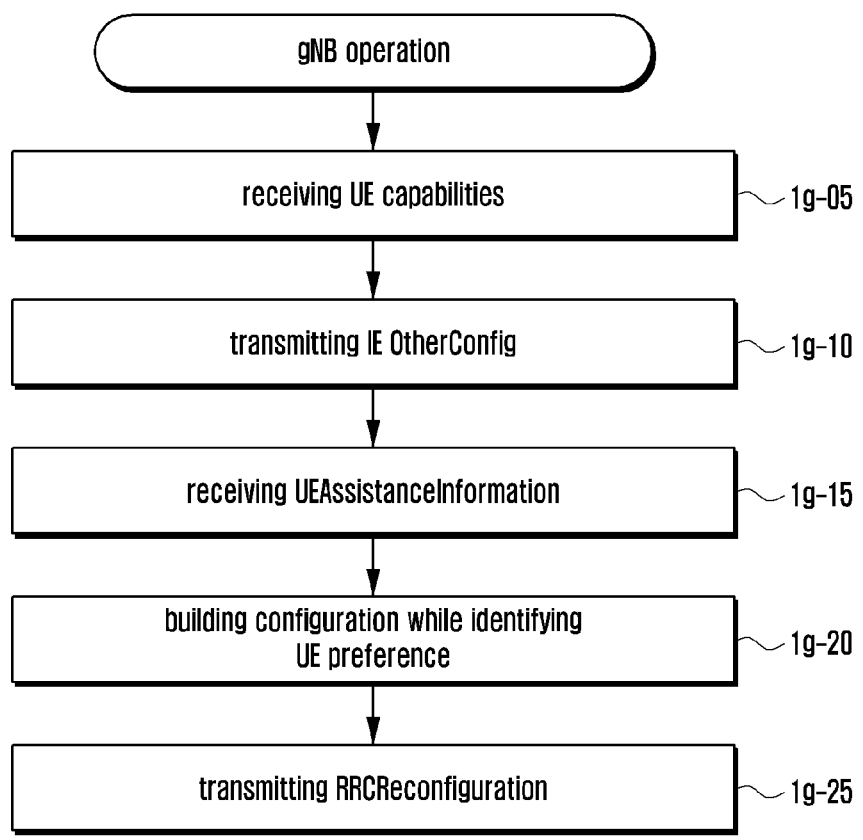
FIG. 1G is a flowchart illustrating an operation of a base station according to an embodiment of the disclosure.

FIG. 1G is a flowchart illustrating an operation of a base station according to an embodiment of the disclosure.

In step 1*g*-05, the base station (MN or SN) receives UE capability information from the UE.

In step 1*g*-10, the base station transmits IE otherConfig including IE overheatingAssistanceConfig and IE powerPreferenceAssistanceConfig to the UE.

In step 1*g*-15, the base station receives a UEAssistanceInformation message from the UE. The message may include IE overheatingAssistance or IE powerPreferenceAssistance.

In step 1*g*-20, the base station configures configuration parameters based on the received information.

In step 1*g*-25, the base station stores the configuration information in an RRCReconfiguration message and transmits the RRCReconfiguration message to the UE.

Figure 2A:
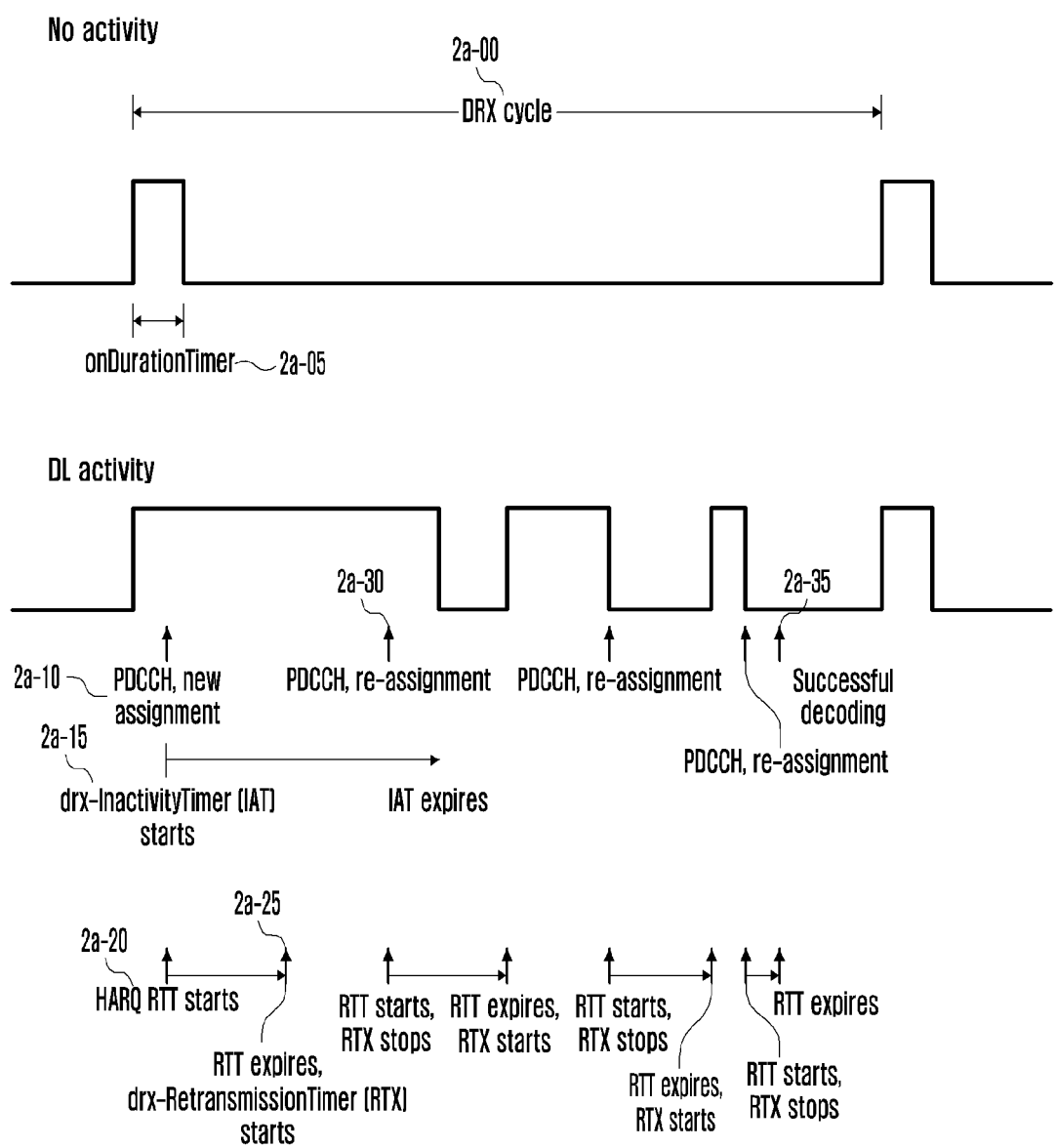
FIG. 2A is a diagram illustrating a DRX operation in the existing LTE technology.

FIG. 2A is a diagram illustrating a DRX operation in the existing LTE technology.

With reference to FIG. 2A, discontinuous reception (DRX) is applied to minimize power consumption of the UE, and is technology for monitoring only in a predetermined physical downlink control channel (PDCCH) in order for the UE to obtain scheduling information. DRX may operate in both a standby mode and a connected mode, and an operation method thereof is slightly different. The disclosure relates to a connected mode.

In order to obtain scheduling information, it may cause large power consumption for the UE to continuously monitor the PDCCH. A basic DRX operation has a DRX cycle (2*a*-00), and the UE may monitor the PDCCH only during an on-duration (2*a*-05) time. In the connected mode, two values of long DRX and short DRX may be configured to the DRX cycle (2*a*-00). In a general case, a long DRX cycle is applied, and if necessary, the base station may trigger a short DRX cycle using a medium access control (MAC) control element (CE). After a certain time has elapsed, the UE may change from a short DRX cycle to along DRX cycle. Initial scheduling information of a specific UE is provided only in the predetermined PDCCH. Accordingly, the UE can minimize power consumption by periodically monitoring only the PDCCH.

When scheduling information on a new packet is received (2*a*-10) by the PDCCH during the on-duration (2*a*-05) time, the UE starts a DRX inactivity timer 2*a*-15. The UE maintains an active state during the DRX inactivity timer 2*a*-15. That is, the UE continues PDCCH monitoring. Further, the UE starts a hybrid automatic repeat-request (HARQ) round trip time (RTT) timer 2*a*-20. The HARQ RTT timer 2*a*-20 is applied to prevent the UE from unnecessarily monitoring the PDCCH during the HARQ RTT time, and the UE does not need to perform PDCCH monitoring during the HARQ RTT timer 2*a*-20 operation time. However, while the DRX inactivity timer 2*a*-15 and the HARQ RTT timer 2*a*-20 operate simultaneously, the UE continues PDCCH monitoring based on the DRX inactivity timer 2*a*-15. When the HARQ RTT timer 2*a*-20 expires, a DRX retransmission timer 2*a*-25 is started. While the DRX retransmission timer 2*a*-25 is operating, the UE should perform PDCCH monitoring. In general, during an operation time of the DRX retransmission timer 2*a*-25, scheduling information for HARQ retransmission may be received (2*a*-30). Upon receiving the scheduling information, the UE immediately stops the DRX retransmission timer 2*a*-25 and starts again the HARQ RTT timer 2*a*-20. The above operation may be continued until the packet is successfully received (2*a*-35).

Configuration information related to the DRX operation in the connected mode is transferred to the UE through the RRCConnectionReconfiguration message. The on-duration timer, the DRX inactivity timer, and the DRX retransmission timer are defined by the number of PDCCH subframes. After the timer is started, when a configured number of subframes defined to PDCCH subframes pass, the timer expires. In a frequency division duplex (FDD) mode, all downlink subframes belong to PDCCH subframes, and in a time division duplex (TDD) mode, a downlink subframe and a special subframe correspond thereto. In TDD, a downlink subframe, an uplink subframe, and a special subframe exist in the same frequency band. The downlink subframe and the special subframe are regarded as PDCCH subframes.

The base station may configure two states of long DRX and short DRX to the UE. The base station may use one of the two states in consideration of power preference indication information and UE mobility record information reported from the UE, and characteristics of configured data radio bearer (DRB). The transition between the two states may be accomplished whether a specific timer expires or when the base station transmits a specific MAC CE to the UE.

In the existing LTE technology, because only two DRX cycles may be configured, it is impossible to dynamically change the DRX cycle according to various DRB characteristics, traffic patterns, and buffer states.

In the disclosure, it is characterized in that a plurality of DRXs may be configured and that one or more serving cells apply one of the plurality of configured DRXs. In particular, in order to minimize UE power consumption, it is characterized in that a group consisting of one or more serving cells corresponds to one DRX and that the serving cells belonging to the group apply the DRX. For example, in the case of serving cells operating in the same radio frequency (RF) chain, it is preferable to apply the same DRX to minimize UE power consumption. In the case of carrier aggregation (CA), the base station may separately provide DRX applied to serving cells belonging to a frequency range 1 (FR1) and DRX applied to serving cells belonging to a frequency range 2 (FR2) to the UE. In the disclosure, the group information is referred to as a DRX group.

Figure 2B:
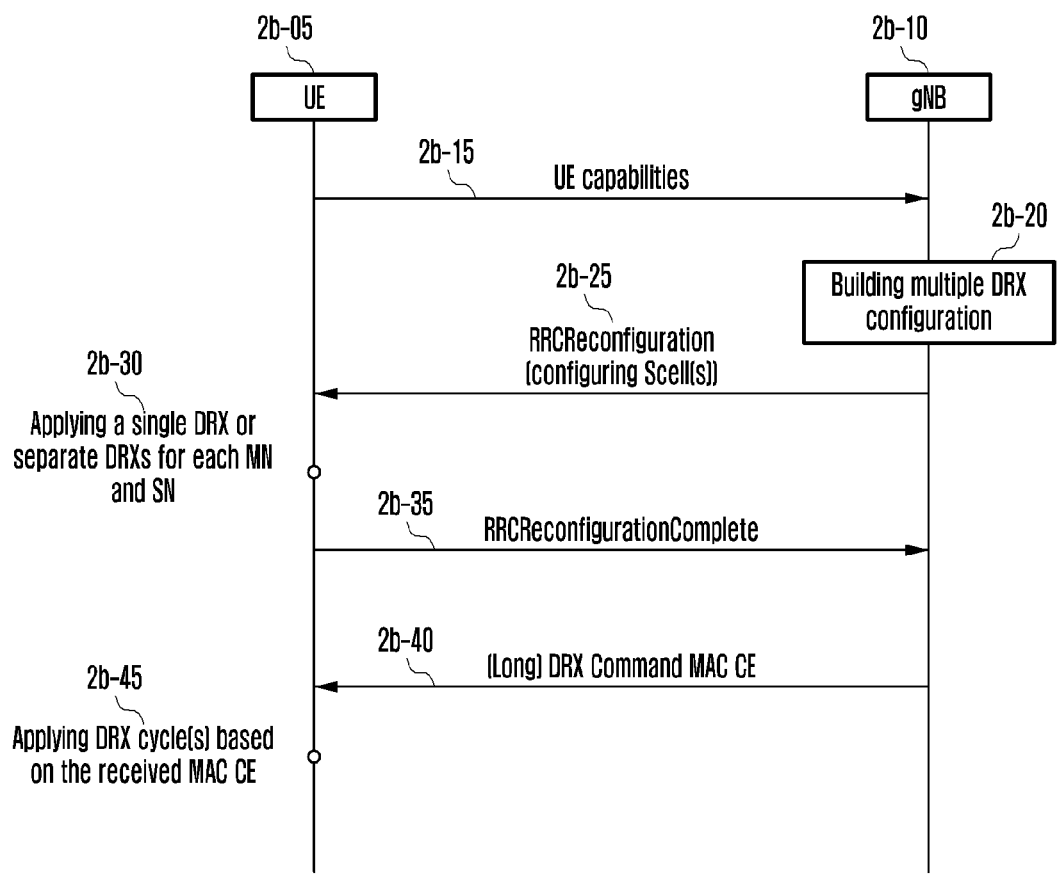
FIG. 2B is a message flow diagram illustrating a method of providing multiple DRX configuration information according to an embodiment of the disclosure.

FIG. 2B is a message flow diagram illustrating a method of providing multiple DRX configuration information according to an embodiment of the disclosure.

With reference to FIG. 2B, a UE 2b-05 may report capability information thereof to abase station 2b-10 (step 2b-15). The capability information may include information (indicator) indicating that the UE 2b-05 may apply a plurality of DRXs when a plurality of serving cells are configured. The base station 2b-10 may configure multiple DRX configuration information to be configured to the UE 2b-05 (step 2b-20). In the disclosure, it is considered that two pieces of DRX configuration information is provided to the UE 2b-05. In this case, it is necessary to configure to which serving cells each DRX configuration information is to be applied. The base station 2b-10 may enable the UE 2b-05 to apply first DRX configuration information to the serving cell belonging to the FR1 and second DRX configuration information to the serving cell belonging to the FR2. Alternatively, the base station 2b-10 may define an indicator indicating whether to apply which DRX configuration information to each serving cell configuration information. Alternatively, the UE 2b-05 may determine which serving cells to apply to DRX configuration information.

The base station 2b-10 may configure the SCell together with the plurality of DRX configuration information to the UE 2b-05 in a connected mode (step 2b-25). According to an embodiment, the configuration information may be an RRCReconfiguration message. In this case, the UE 2b-05 may apply DRX configuration information corresponding to each serving cell (step 2b-30).

The UE 2b-05 may transmit, to the base station 2b-10, an RRCReconfigurationComplete message as a response message to the RRCReconfiguration message (step 2b-35). According to an embodiment, serving cell information (e.g., DRX group information) to which each DRX configuration information is applied may be stored in the RRCReconfigurationComplete message.

The base station 2b-10 may change the applying DRX cycle through a predetermined MAC CE (step 2b-40). For example, when the long DRX and short DRX cycles are configured, the DRX command MAC CE may be used for changing the running long DRX to short DRX, and the long DRX command MAC CE may be used for changing the running short DRX to long DRX. The UE 2b-05 may apply the configured long DRX or short DRX according to the received MAC CE.

The disclosure proposes a method of applying the MAC CE in consideration of multiple DRX configuration information. For example, the disclosure considers two scenarios. In a first scenario, both first DRX configuration information and second DRX configuration information may provide long DRX and short DRX. In a second scenario, the first DRX configuration information may provide both long DRX and short DRX, but second DRX configuration information may provide only short DRX (or long DRX). In this case, in the disclosure, a group of cells to which the first DRX configuration information is applied is referred to as a first DRX group, and a group of cells to which the second DRX configuration information is applied is referred to as a second DRX group. At least one serving cell should belong to each DRX group. According to an embodiment, it may be regarded that the PCell belongs to the first DRX group.

Figure 2C:
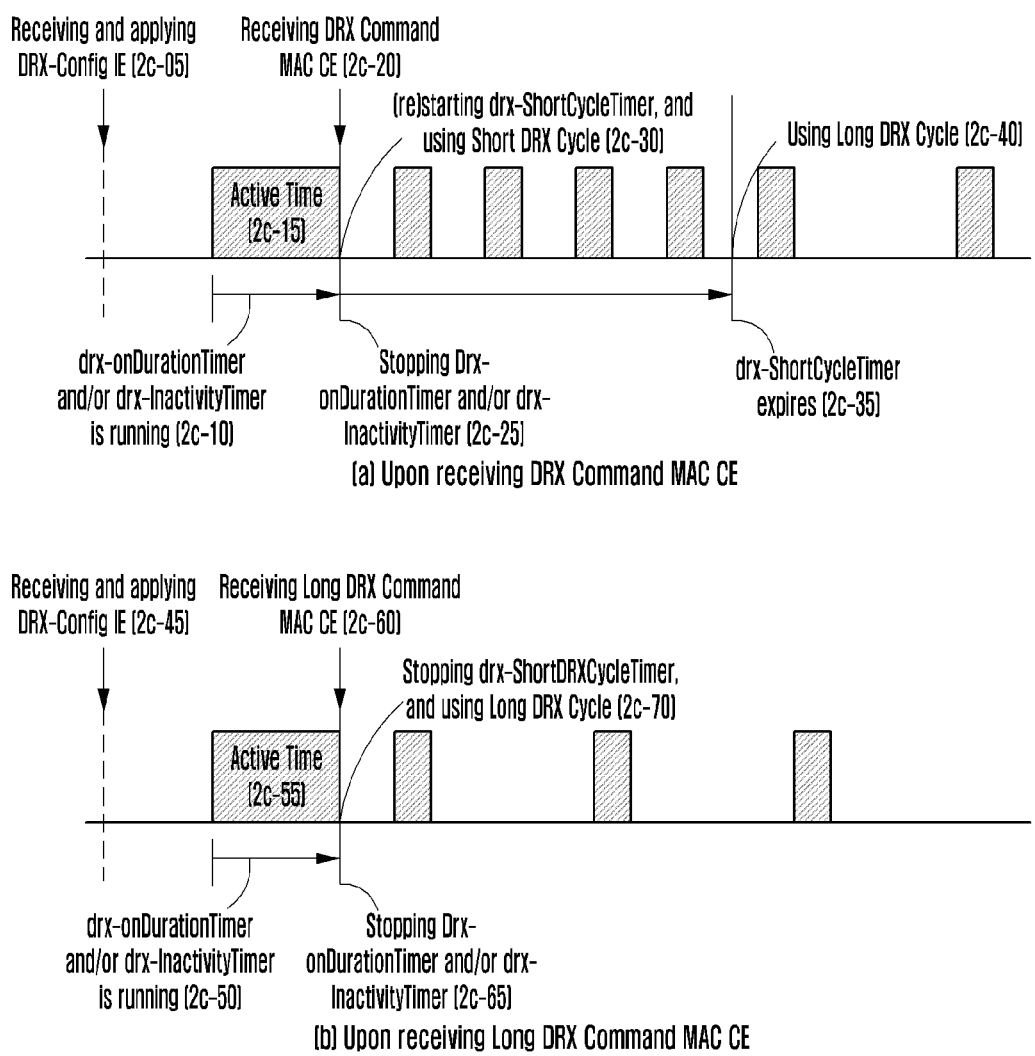
FIG. 2C is a diagram illustrating an operation of a terminal when a (long) DRX command MAC CE is received according to an embodiment of the disclosure.

FIG. 2C is a diagram illustrating an operation of a UE when a (long) DRX command MAC CE is received according to an embodiment of the disclosure.

When long DRX and short DRX cycles are configured, the DRX command MAC CE may be used for changing running long DRX to short DRX, and the long DRX command MAC CE may be used for changing running short DRX to long DRX.

FIG. 2C(a) is a diagram illustrating an operation of a UE when the UE receives a DRX command MAC CE.

The UE may receive DRX configuration information stored in the DRX-Config (configuration) IE (information element) at a predetermined time point and apply the DRX configuration information (2c-05). The default may be that the UE performs the DRX operation using the configured long DRX cycle. The UE is in an active time (2c-15) while the drx-onDurationTimer timer or the drx-InactivityTimer timer is running (2c-10), and may monitor the PDCCH during the time period. When the UE receives the DRX command MAC CE at a predetermined time point (2c-20), the UE may stop the running drx-onDurationTimer timer and drx-InactivityTimer timer (2c-25), (re)start drx-ShortCycleTimer at a first symbol after receiving the MAC CE, and use a short DRX cycle (2c-30). When the running drx-ShortCycleTimer stops (2c-35), the UE may use the long DRX cycle (2c-40).

FIG. 2C(b) is a diagram illustrating an operation of a UE when the UE receives a long DRX command MAC CE.

The UE may receive the DRX configuration information stored in the DRX-Config IE at a predetermined time point and apply the DRX configuration information (2c-45). The default may be that the UE performs the DRX operation using the configured long DRX cycle. The UE is in an active time (2c-55) while the drx-onDurationTimer timer or the drx-InactivityTimer timer is running (2c-50), and may monitor the PDCCH during the time period. When the UE receives the long DRX command MAC CE at a predetermined time point (2c-60), the UE may stop the running drx-onDurationTimer timer, drx-InactivityTimer timer, and drx-ShortCycleTimer (2c-65, 2c-70), and use a long DRX cycle (2c-70).

When the short DRX cycle is used, in a subframe satisfying an equation [(SFN×10)+subframe number] modulo (drx-ShortCycle)=(drx-StartOffset) modulo (drx-ShortCycle), after drx-SlotOffset passes, the UE starts the drx-onDurationTimer.

When the long DRX cycle is used, in a subframe satisfying an equation [(SFN×10)+subframe number] modulo (drx-LongCycle)=drx-StartOffset, after drx-SlotOffset passes, the UE starts the drx-onDurationTimer.

The long DRX Command MAC CE and the DRX command MAC CE are each configured with a subheader having a corresponding local channel identifier (LCID), and a payload thereof is zero bits. That is, the MAC CE is configured with sub-headers. An LCID value corresponding to the MAC CE may be seen in [Table 4].

TABLE 4

Table 6.2.1-1 Values of LCID for DL-SCH

| Index | LCID values |
|---|---|
| 0 | CCCH |
| 1-32 | Identity of the logical channel |
| 33-46 | Reserved |
| 47 | Recommended bit rate |
| 48 | SP ZP CSI-RS Resource Set Activation/Deactivation |
| 49 | PUCCH spatial relation Activation/Deactivation |
| 50 | SP SRS Activation/Deactivation |
| 51 | SP CSI reporting on PUCCH Activation/Deactivation |

TABLE 4-continued

Table 6.2.1-1 Values of LCID for DL-SCH

| Index | LCID values |
|---|---|
| 52 | TCI State Indication for UE-specific PDCCH |
| 53 | TCI States Activation/Deactivation for UE-specific PDSCH |
| 54 | Aperiodic CSI Trigger State Subselection |
| 55 | SP CSI-RS/CSI-IM Resource Set Activation/Deactivation |
| 56 | Duplication Activation/Deactivation |
| 57 | SCell Activation/Deactivation (four octets) |
| 58 | SCell Activation/Deactivation (one octet) |
| 59 | Long DRX Command |
| 60 | DRX Command |
| 61 | Timing Advance Command |
| 62 | UE Contention Resolution Identity |
| 63 | Padding |

FIG. 2D is a flowchart illustrating a UE operation in a method of applying a new DRX command MAC CE in a first scenario according to an embodiment of the disclosure.

With reference to FIG. 2D, a new MAC CE is proposed to switch a long DRX cycle and a short DRX cycle in second DRX configuration information. A new LCID is assigned to the new MAC CE, and the LCID may be used for distinguishing the new MAC CE from the conventional MAC CE. Because the purpose of the new MAC CE is to switch the DRX cycles, the new MAC CE is a MAC CE configured only with a subhead that stores an LCID without a payload. When the new MAC CE is received, the UE operation may have several options.

Option 1: In order to switch the long DRX cycle and the short DRX cycle in the second DRX configuration information, a new long DRX command MAC CE and a DRX command MAC CE may be introduced. In this case, a new LCID may be assigned to each new MAC CE. The conventional long DRX command MAC CE and DRX command MAC CE are used for switching long DRX and short DRX in the first DRX configuration information. In option 1, because MAC CEs for switching DRX cycles of the first DRX configuration information and DRX cycles of the second DRX configuration information are respectively defined, information included in each MAC CE regardless of the serving cell transmitting the MAC CE may be applied.

Option 2: The conventional long DRX command MAC CE and DRX command MAC CE may be used for switching the DRX cycle applied to a DRX group to which the serving cell transmitting the MAC CE belongs. However, the new long DRX command MAC CE and DRX command MAC CE may be used for switching the DRX cycle applied to another DRX group to which the serving cell transmitting the MAC CE does not belong. In this case, a new LCID may be assigned to each new MAC CE. The advantage of option 2 is that the long DRX cycle may be quickly converted to a short cycle by transmitting the DRX command MAC CE applied to another DRX group applying the long DRX cycle from the serving cell applying the short DRX cycle.

Based on option 2, the order of the UE operation is as follows.

In step 2d-05, the UE may report capability information thereof to the base station. The capability information may include an indicator indicating that the UE may apply a plurality of DRXs when a plurality of serving cells are configured.

In step 2d-10, the UE may receive a configuration of the SCell together with the plurality of DRX configuration information from the base station.

In step 2d-15, the UE may receive a (long) DRX command MAC CE from the base station.

In step 2d-20, the UE determines an LCID of the received MAC CE.

When the LCID indicates the conventional (long) DRX command MAC CE, the UE may switch a DRX cycle of a DRX group to which the serving cell transmitting the MAC CE belongs according to the MAC CE in step 2d-25. Further, the UE may perform the operation described in FIG. 2C according to the (long) DRX command MAC CE.

When the LCID indicates the new (long) DRX Command MAC CE, the UE may switch a DRX cycle of a DRX group to which the serving cell transmitting the MAC CE does not belong according to the MAC CE in step 2d-30. Further, the UE may perform the operation described in FIG. 2C according to the (long) DRX command MAC CE.

FIG. 2E is a flowchart illustrating a UE operation in a method of reusing a conventional DRX command MAC CE in a first scenario according to an embodiment of the disclosure.

An LCID is a resource with a limited number and needs to be conserved. Therefore, it is also useful to reuse the conventional (long) DRX command MAC CE without defining a new LCID. An operation for this may have the following options.

Option 3: A DRX cycle applying to the DRX group to which the serving cell transmitting the conventional (long) DRX command MAC CE belongs may be switched according to the MAC CE. For example, in order to switch the DRX cycles provided by the second DRX configuration information, the base station may transmit the conventional (long) DRX command MAC CE to the UE through one serving cell in the second DRX group to which the second DRX configuration information is applied.

Option 4: When the UE receives the conventional (long) DRX command MAC CE, the UE may switch both the DRX cycle provided by the first DRX configuration information and the second DRX configuration information. When the DRX cycle indicated by the MAC CE is already applied, the UE may ignore the MAC CE for the DRX group to which the corresponding DRX cycle is applied.

Based on option 3, the order of operation of the UE is as follows.

In step 2e-05, the UE may report capability information thereof to the base station. The capability information may include an indicator indicating that the UE may apply a plurality of DRXs when a plurality of serving cells are configured.

In step 2e-10, the UE may receive a configuration of the SCell together with the plurality of DRX configuration information from the base station.

In step 2e-15, the UE may receive a conventional (long) DRX command MAC CE from the base station.

In step 2e-20, the UE may determine which DRX group the MAC CE is received from a serving cell belonging to.

When the conventional (long) DRX command MAC CE is received from the serving cell belonging to the first DRX group, the UE may switch a DRX cycle of a first DRX group to which the serving cell transmitting the MAC CE belongs according to the MAC CE in step 2e-25. Further, the UE may perform the operation described in FIG. 2C according to the (long) DRX command MAC CE.

When the conventional (long) DRX command MAC CE is received from the serving cell belonging to the second DRX group, the UE may switch the DRX cycle of the second DRX group to which the serving cell transmitting the MAC CE belongs according to the MAC CE in step 2e-30. Further, the UE may perform the operation described in FIG. 2C according to the (long) DRX command MAC CE.

FIG. 2F is a flowchart illustrating a UE operation for activating or deactivating second DRX configuration information in a second scenario according to an embodiment of the disclosure.

In the second scenario, only one DRX cycle is provided in the second DRX configuration information. Therefore, there is no need to switch the short DRX cycle and the long DRX cycle. Accordingly, when the DRX cycle is not used in the second DRX configuration information, an operation for releasing the DRX cycle may be required.

The second DRX configuration information may be set up through a dedicated RRC message. When the DRX cycle is no longer used in the second DRX configuration information, the base station may release the second DRX configuration information to the UE through an RRC message. However, the second DRX configuration information includes other DRX parameters in addition to the DRX cycle, and the other parameters may be continuously used. Therefore, it may be inefficient to release all of the second DRX configuration information with the RRC message. Further, it takes some time for the UE to apply setup or release of the configuration information provided in the RRC message. Due to the nature of the DRX operation, it is important to apply setup or release of the configuration information at an accurate time point.

Therefore, the disclosure proposes a method of setting up and releasing the second DRX configuration information with an RRC message, introducing a new MAC CE, and using the new MAC CE in order to activate or deactivate the configured DRX cycle. The new MAC CE may be a DRX activation MAC CE for activating a DRX cycle configured in the second DRX configuration information or a DRX deactivation MAC CE for activating a DRX cycle configured in the second DRX configuration information. A new LCID is assigned to each MAC CE, and a payload thereof may be zero bits.

With reference to FIG. 2F, in step 2f-05, the UE may report capability information thereof to the base station. The capability information may include an indicator indicating that the UE may apply a plurality of DRXs when a plurality of serving cells are configured.

In step 2f-10, the UE may receive a configuration of the SCell together with the plurality of DRX configuration information from the base station.

In step 2f-15, the UE may receive the DRX activation MAC CE from the base station.

In step 2f-20, the UE may use the DRX cycle provided in the second DRX configuration information according to the DRX activation MAC CE. According to an embodiment, upon receiving the second DRX configuration information, the UE may use the DRX cycle provided by the second DRX configuration information regardless of reception of the MAC CE.

In step 2f-25, the UE may receive the DRX deactivation MAC CE from the base station.

In step 2f-30, the UE may not use the DRX cycle provided in the second DRX configuration information according to the DRX deactivation MAC CE. According to an embodiment, when the second DRX configuration information is released by a predetermined RRC message, the DRX cycle may be no longer used.

As described in the part related to FIG. 2A, because in the existing LTE technology, only two DRX cycles may be configured, the DRX cycle cannot be dynamically changed according to various DRB characteristics, traffic patterns, buffer states, and the like.

In the disclosure, it is characterized in that a plurality of DRXs may be configured and that one or more serving cells apply one of the plurality of configured DRXs. In particular, in order to minimize UE power consumption, it is characterized that a group consisting of one or more serving cells corresponds to one DRX and that the serving cells belonging to the group apply the DRX. For example, in the case of serving cells operating in the same radio frequency (RF) chain, it is preferable to apply the same DRX to minimize UE power consumption. In the case of carrier aggregation (CA), the base station may separately provide DRX applied to serving cells belonging to a frequency range 1 (FR1) and DRX applied to serving cells belonging to a frequency range 2 (FR2) to the UE. In the disclosure, the group information is referred to as a DRX group.

Figure 3A:
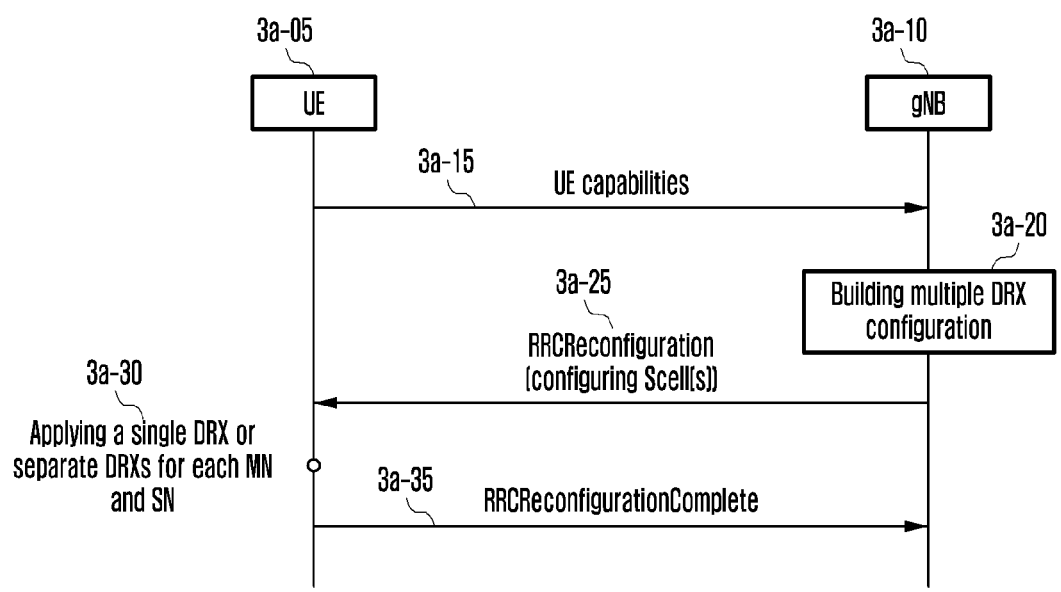
FIG. 3A is a message flow diagram illustrating a method of providing multiple DRX configuration information according to an embodiment of the disclosure.

FIG. 3A is a message flow diagram illustrating a method of providing multiple DRX configuration information according to an embodiment of the disclosure.

With reference to FIG. 3A, in step 3a-15, a UE 3a-05 may report capability information thereof to a base station 3a-10. The capability information may include information (indicator) indicating that the UE 3a-05 may apply a plurality of DRXs when a plurality of serving cells are configured. In step 3a-20, the base station 3a-10 may configure multiple DRX configuration information to be configured to the UE 3a-05. In the disclosure, it is considered that two pieces of DRX configuration information is provided to the UE 3a-05. In this case, it is necessary to configure to which serving cells each DRX configuration information is to be applied. The disclosure considers the following options.

Option 1: The serving cell belonging to the FR1 applies the first DRX configuration information, and the serving cell belonging to the FR2 applies the second DRX configuration information Option 2: Define an indicator indicating whether to apply which DRX configuration information to each serving cell configuration information Option 3: the UE 3a-05 determines to apply which serving cells to both DRX configuration information In the case of option 1, because DRX configuration information to be automatically applied is determined according to the FR to which the serving cell belongs, there is no need for the base station 3a-10 to separately transmit an indicator indicating this to the UE 3a-05. In option 1, it is assumed that the UE 3a-05 has separate RF modems for each FR1 and FR2. Therefore, in other cases, desired performance improvement may not be achieved.

In the case of option 2, the base station 3a-10 should recognize in advance information on the DRX group advantageous for the UE 3a-05 to save power consumption. To this end, the UE 3a-05 may report it to the base station 3a-10 through a capability information reporting process or a predetermined reporting process. The base station 3a-10 may identify information on the DRX group advantageous for the UE 3a-05 to save power consumption based on report information from the UE 3a-05.

In the case of option 3, the base station 3a-10 transmits only two DRX configuration information without the DRX group information to the UE 3a-05 through the RRCReconfiguration message. According to an embodiment, it may be regarded that the PCell always applies the first DRX configuration information. The UE 3a-05 transmits serving cell information (e.g., DRX group information) for applying each DRX configuration information to the RRCReconfigurationComplete message, which is a response message to the RRCReconfiguration message, to the base station 3a-10. In option 3, because the UE 3a-05 directly indicates serving cells applied to each DRX configuration information in consideration of the configured SCells, there is no need for the UE 3a-05 to report in advance information necessary for configuring the DRX group to the base station 3a-10.

The base station 3a-10 may configure the SCell together with the plurality of DRX configuration information to the UE 3a-05 in a connected mode (step 3a-25). In this case, the UE 3a-05 may apply DRX configuration information corresponding to each serving cell (step 3a-30). The UE 3a-05 may transmit an RRCReconfigurationComplete message as a response message to the RRCReconfiguration message to the base station 3a-10 (3a-35). Serving cell information (e.g., DRX group information) to which each DRX configuration information is applied may be stored in the message.

Although not illustrated, according to an embodiment, the UE 3a-05 may request the base station 3a-10 to reconfigure the DRX configuration when the DRX configuration needs to be reconfigured. According to an embodiment, the UE 3a-05 may request the base station 3a-10 to update a SCell list. In this case, the reconfiguration and update request may be made through a UE assistance information message.

Figure 3B:
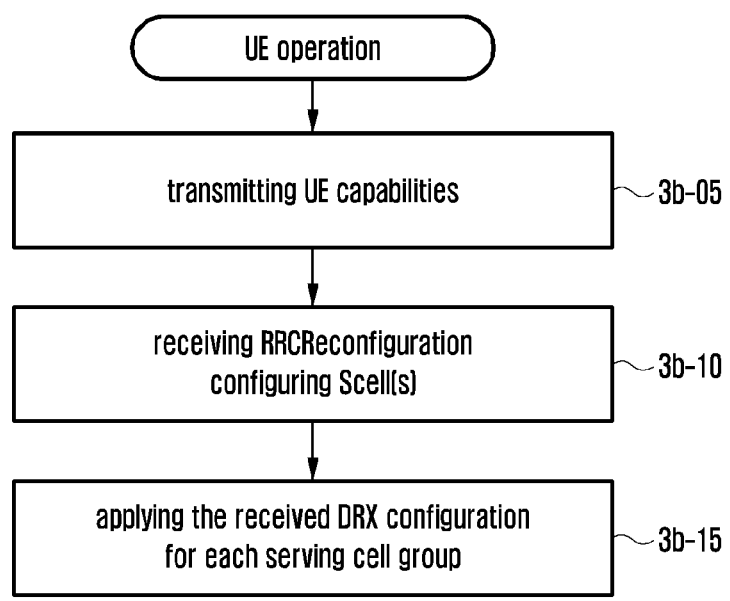
FIG. 3B is a flowchart illustrating an operation of a terminal according to an embodiment of the disclosure.

FIG. 3B is a flowchart illustrating an operation of a UE according to an embodiment of the disclosure.

With reference to FIG. 3B, in step 3b-05, the UE may report capability information thereof to the base station. The capability information includes an indicator indicating that the UE may apply a plurality of DRXs when a plurality of serving cells are configured.

In step 3b-10, the UE may receive a configuration of the SCell from the base station. In this case, the UE may also receive multiple DRX configuration information from the base station, and the SCell configuration information may include an indicator indicating DRX to be applied to each serving cell. According to an embodiment, the PCell may always apply first DRX configuration information.

In step 3b-15, the UE may apply the configured DRX to serving cells belonging to the corresponding group.

Although not illustrated, according to an embodiment, when the UE needs to reconfigure the DRX configuration, the UE may request the base station to reconfigure the DRX configuration. According to an embodiment, the UE may request the base station to update a SCell list. In this case, the reconfiguration and update request may be made through a UE assistance information message.

Figure 3C:
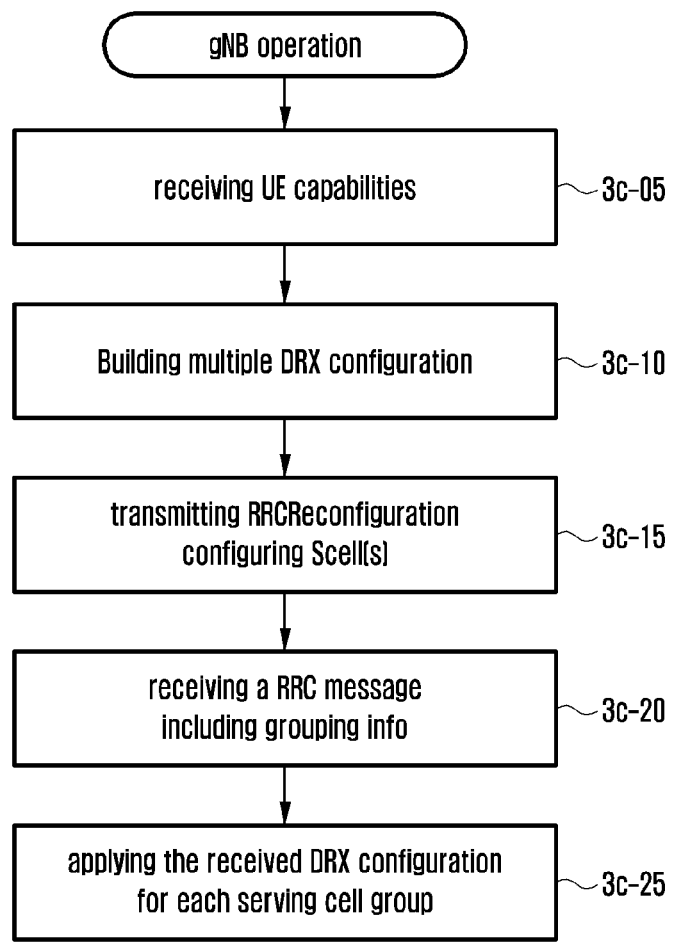
FIG. 3C is a flowchart illustrating an operation of a base station according to an embodiment of the disclosure.

FIG. 3C is a flowchart illustrating an operation of a base station according to an embodiment of the disclosure.

With reference to FIG. 3C, in step 3c-05, the base station may receive a report of capability information from at least one UE. The capability information may include an indicator indicating that the UE may apply a plurality of DRXs when a plurality of serving cells are configured.

In step 3c-10, in order to reduce power consumption of the UE, the base station may configure multiple DRX configuration information. A method of configuring second DRX configuration information together with the existing first DRX configuration information may consider several options as follows. Existing DRX configuration information may be the same as that illustrated in [Table 5].

TABLE 5

```
DRX-Config ::=              SEQUENCE {
   drx-LongCycleStartOffset    CHOICE {
                                  subMilliSeconds INTEGER (1..31),
                                  milliseconds ENUMERATED {
                                     ms1, ms2, ms3, ms4, ms5, ms6, ms8, ms10, ms20, ms30, ms40,
ms50, ms60,
                                     ms80 ms100, ms200, ms300, ms400, ms500, ms600, ms800,
ms1000, ms1200,
                                     ms1600, spare8, spare7, spare6, spare5, spare4, spare3,
spare2, spare1 }
                                  },
   drx-InactivityTimer         ENUMERATED {
                                  ms0, ms1, ms2, ms3, ms4, ms5, ms6, ms8, ms10, ms20, ms30, ms40,
ms50, ms60, ms80,
                                  ms100, ms200, ms300, ms500, ms750, ms1280, ms1920, ms2560,
spare9, spare8,
                                  spare7, spare6, spare5, spare4, spare3, spare2, spare1},
   drx-HARQ-RTT-TimerDL        INTEGER (0..56),
   drx-HARQ-RTT-TimerUL        INTEGER (0..56),
   drx-RetransmissionTimerDL   ENUMERATED {
                                  sl0, sl1, sl2, sl4, sl6, sl8, sl16, sl24, sl33, sl40, sl64, sl80,
s196, s1112, s1128,
                                  s1160, s1320, spare15, spare14, spare13, spare12, spare11,
spare10, spare9,
                                  spare8, spare7, spare6, spare5, spare4, spare3, spare2, spare1},
   drx-RetransmissionTimerUL   ENUMERATED {
                                  sl0, sl1, sl2, sl4, sl6, sl8, sl16, sl24, sl33, sl40, sl64, sl80,
s196, s1112, s1128,
                                  s1160, s1320, spare15, spare14, spare13, spare12, spare11,
spare10, spare9,
                                  spare8, spare7, spare6, spare5, spare4, spare3, spare2, spare1 },
   drx-LongCycleStartOff-set   CHOICE {
      ms10                        INTEGER (0..9),
      ms20                        INTEGER (0..19),
      ms32                        INTEGER (0..31),
      ms 40                       INTEGER (0..39),
      ms60                        INTEGER (0..59),
      ms 64                       INTEGER (0..63),
```

TABLE 5-continued

```
    ms70            INTEGER (0..69),
    ms80            INTEGER (0..79),
    ms128           INTEGER (0..127),
    ms160           INTEGER (0..159),
    ms256           INTEGER (0..255),
    ms320           INTEGER (0..319),
    ms512           INTEGER (0..511),
    ms640           INTEGER (0..639),
    ms1024          INTEGER (0..1023),
    ms1280          INTEGER (0..1279),
    ms2048          INTEGER (0..2047),
    ms2560          INTEGER (0..2559),
    ms5120          INTEGER (0..5119),
    ms10240         INTEGER (0..10239)
    },
    shortDRX        SEQUENCE {
       drx-ShortCycle   ENUMERATED {
            ms2, ms3, ms4, ms5, ms6, ms7, ms8, ms10, ms14, ms16, ms20,
ms30, ms32,
            ms35, ms40, ms64, ms80, ms128, ms160, ms256,ms320, ms512,
ms640, spare9,
            spare8, spare7, spare6, spare5, spare4, spare3, spare2,
spare1 },
       drx-ShortCycleTimer   INTEGER (1..16)
    }
OPTIONAL, -- Need R    INTEGER (0..31)
    drx-SlotOffset
}
```

Option 1: Define a separate DRX-Config and DRX-ConfigFR2

Option 2: Define a separate DRX-Config configured with only specific parameters

Some parameters, e.g., only a drx-InactivityTimer, drx-onDurationTimer, drx-ShortCycleTimer, and drx-ShortCycle are provided as second DRX configuration information, and DRX parameters not provided separately may be applied to parameters in the conventional DRX-Config.

A multiple of a long cycle or a short cycle in the conventional DRX-Config may be applied to the short cycle in the second DRX configuration information.

Option 3: Second DRX configuration information may be indicated by providing scaling information of parameters stored in the conventional DRX-Config. The scaling method may reduce a signaling overhead in providing the second DRX configuration information.

Scaling information is provided to each parameter stored in the conventional DRX-Config or The same scaling information is provided to some of the parameters stored in the conventional DRX-Config or different scaling information is provided to each specific parameter group A parameter in the conventional DRX-Config is applied to a DRX parameter in which scaling is not separately provided.

For example, when a short DRX value is 8 ms in the existing DRX configuration information, and a corresponding scaling value is indicated as 0.5, the short DRX in the second DRX configuration information is 4 ms.

In step 3c-15, the base station may configure the SCell to the UE in a connected mode.

In step 3c-20, the base station may receive preferred DRX group information from the UE.

In step 3c-25, the base station may apply the configured DRX to serving cells belonging to the corresponding group.

Figure 3D:
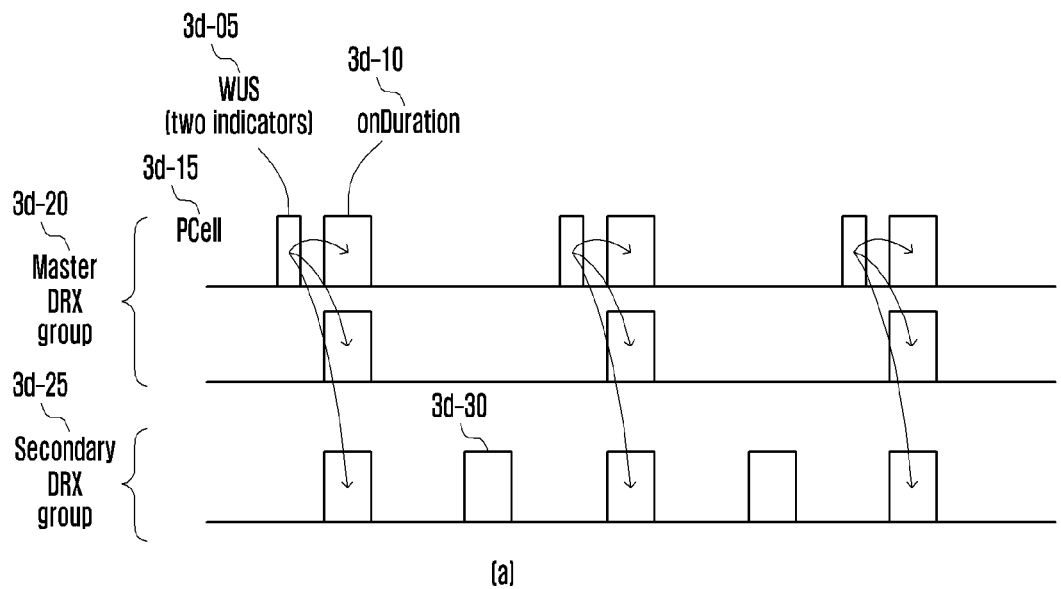
FIG. 3D is a diagram illustrating a method of supporting wake-up signaling when multiple DRX configuration information is provided according to an embodiment of the disclosure.
Figure 3D:
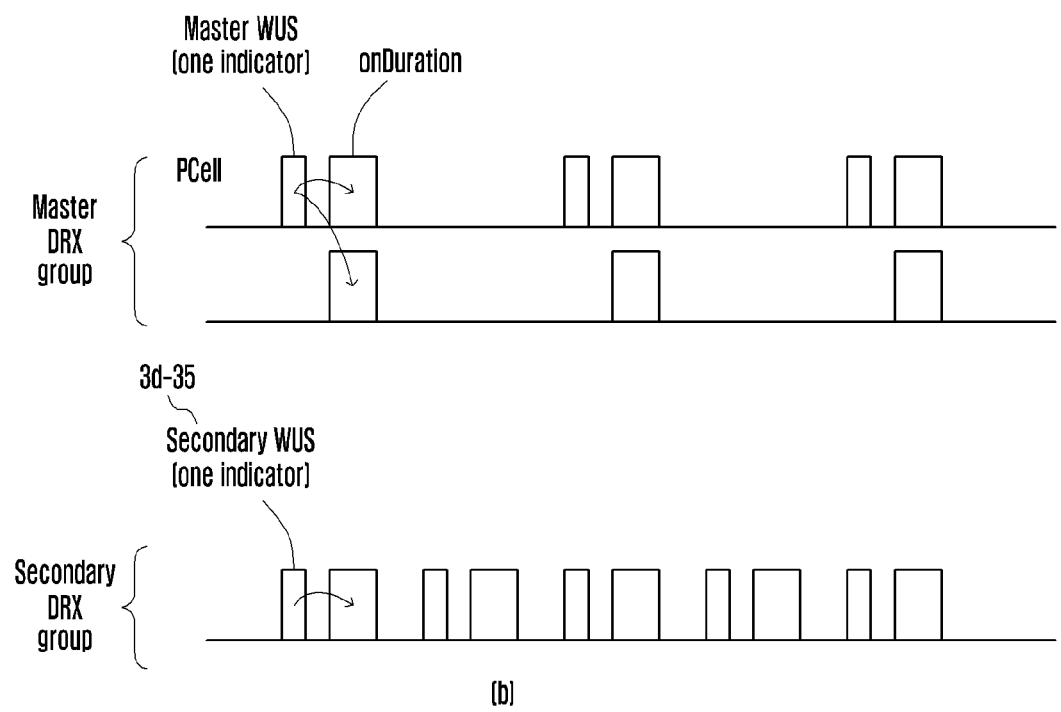

FIG. 3D is a diagram illustrating a method of supporting wake-up signaling when multiple DRX configuration information is provided according to an embodiment of the disclosure.

In order to reduce power consumption, when DRX is configured, the UE monitors the PDCCH at every indicated DRX cycle. However, scheduling information on a corresponding UE is not always included in each of the monitored PDCCHs. Therefore, in order to further reduce power consumption, the base station may transmit a wake-up signal (WUS) ahead of the onDuration by predetermined gap offset, and the WUS indicates whether the UE monitors the PDCCH at a coming onDuration time point.

With reference to FIG. 3D, the UE receives the WUS (3d-05), and when the WUS indicates wake-up, the UE may monitor the PDCCH at an onDuration time point that comes after the WUS (3d-10). The wake-up indicator in the WUS may be applied to all serving cells. Accordingly, the WUS may be transmitted from the PCell, and be also transmitted from a primary secondary cell (PSCell) for secondary cell group (SCG) cells in dual connectivity. In other words, it may be regarded that one corresponding WUS exists for each one DRX. The WUS is applied only in long DRX but may not be applied in short DRX.

In the disclosure, when first DRX and second DRX are configured at the same time, a method of applying the WUS is required.

A first method is to maintain one WUS as illustrated in FIG. 3D(a), but to introduce an indicator indicating whether to wake-up in the first DRX and the second DRX, respectively, to the WUS. That is, a first wake-up indicator may be applied to the first DRX, and a second wake-up indicator may be applied to the second DRX. When separate long DRX is not defined in the second DRX configuration information, the second wake-up indicator may not be needed. When separate long DRX is defined in the second DRX configuration information and cycles of the first long DRX and the second long DRX are different, in the case of a serving cell to which long DRX different form long DRX applied to the PCell is applied, a corresponding WUS may not exist at every specific onDuration time point (3*d*-30). In this case, one of the following options may be considered.

The UE may not monitor the PDCCH in the onDuration (3*d*-30) by default. Alternatively
  When there is no WUS corresponding to dedicated signaling, the base station may configure in advance to the UE whether to wake-up or not to wake-up in the coming onDuration (3*d*-30). Alternatively,
  When there is no corresponding WUS, the base station may recognize this in advance; thus, the base station may transmit a wake-up indicator for the onDuration (3*d*-30) to the UE in the previous WUS.

In another case, when the DRX group to which the PCell belongs is short DRX, and the other DRX group is long DRX, the PCell still transmits WUS and considers whether to apply it. In this case, one of the following options may be considered.

According to the rule applied to short DRX of the DRX group to which the PCell belongs, the WUS may not be applied to other DRX groups. In this case, in the serving cells of another DRX group, the UE may monitor the PDCCH for each long DRX.
  When at least one of two DRX groups is long DRX, the WUS is transmitted, and the WUS may be applied to the DRX group to which the long DRX is applied. In this case, the WUS is transmitted from the PCell, and the WUS transmission timing may consider an onDuration time point in the DRX group to which the long DRX is applied. That is, the WUS is not applied only when short DRX is applied in both DRX groups, and the UE may not monitor the WUS.

A second method is to configure a separate WUS (3*d*-35) for each DRX group, as illustrated in FIG. 3D(b). To this end, in a DRX group to which the PCell belongs, the WUS is transmitted from the PCell as before, and in a DRX group to which the PCell does not belong, the WUS may be transmitted from the serving cell configured by the base station. The configuration may be indicated together when the serving cell is configured.

Figure 3E:
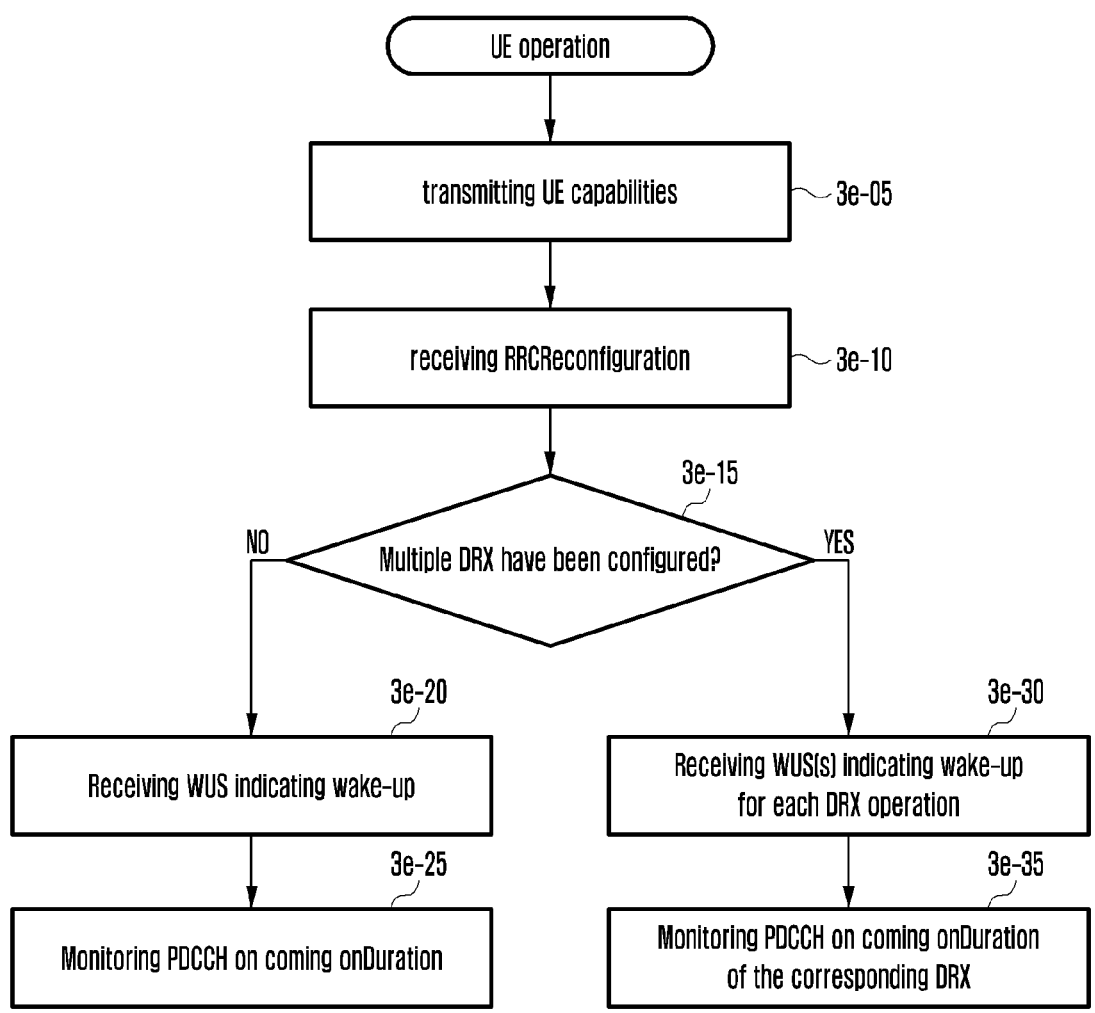
FIG. 3E is a flowchart illustrating an operation of a terminal supporting wake-up signaling when multiple DRX configuration information is provided according to an embodiment of the disclosure.

FIG. 3E is a flowchart illustrating an operation of a UE supporting wake-up signaling when multiple DRX configuration information is provided according to an embodiment of the disclosure.

With reference to FIG. 3E, in step 3*e*-05, when a plurality of DRXs are configured, the UE may transmit capability information including an indicator indicating that it can support the WUS to the base station.

In step 3*e*-10, the UE may be provided with DRX configuration information and WUS configuration information operating corresponding thereto information from the base station.

In step 3*e*-15, the UE may determine whether multiple DRX configuration information is provided.

In step 3*e*-20, if multiple DRX configuration information is not provided to the UE, the UE may monitor a WUS and receive the WUS including the wake-up indicator.

In step 3*e*-25, the UE may monitor a PDCCH in the coming onDuration.

In step 3*e*-30, if multiple DRX configuration information is provided to the UE, the UE may monitor the WUS and receive the WUS including wake-up indicators corresponding to each DRX group.

In step 3*e*-35, the UE may monitor the PDCCH in coming onDuration in the DRX group corresponding to the wake-up indicator.

As described in the part related to FIG. 2A, because only two DRX cycles may be configured in the existing LTE technology, the DRX cycle cannot be dynamically changed according to various DRB characteristics, traffic patterns, buffer states, and the like.

In the disclosure, it is characterized in that a plurality of DRXs may be configured and that one or more serving cells apply one of the plurality of configured DRXs. In particular, in order to minimize UE power consumption, it is characterized in that a group consisting of one or more serving cells corresponds to one DRX and that the serving cells belonging to the group apply the DRX. For example, in the case of serving cells operating in the same radio frequency (RF) chain, it is preferable to apply the same DRX to minimize UE power consumption. In the case of carrier aggregation (CA), the base station may separately provide DRX applied to serving cells belonging to a frequency range 1 (FR1) and DRX applied to serving cells belonging to a frequency range 2 (FR2) to the UE. In the disclosure, the group information is referred to as a DRX group.

Figure 4A:
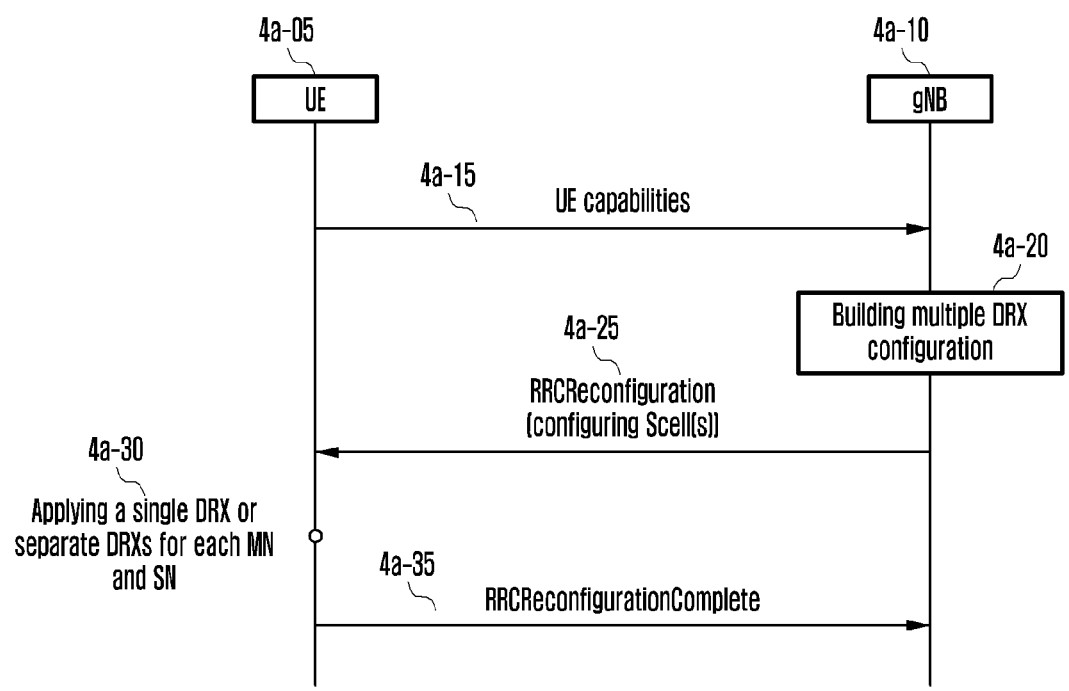
FIG. 4A is a message flow diagram illustrating a method of providing multiple DRX configuration information according to an embodiment of the disclosure.

FIG. 4A is a message flow diagram illustrating a method of providing multiple DRX configuration information according to an embodiment of the disclosure.

With reference to FIG. 4A, in step 4*a*-15, a UE 4*a*-05 may report capability information thereof to a base station 4*a*-10. The capability information may include information (indicator) indicating that the UE 4*a*-05 may apply a plurality of DRXs when a plurality of serving cells are configured. In step 4*a*-20, the base station 4*a*-10 may configure multiple DRX configuration information to be configured to the UE 4*a*-05. In the disclosure, it is considered that two pieces of DRX configuration information is provided to the UE 4*a*-05. In this case, it is necessary to configure to which serving cells each DRX configuration information is to be applied. The base station 4*a*-10 may enable the UE 4*a*-05 to apply first DRX configuration information to a serving cell belonging to the FR1 and second DRX configuration information to a serving cell belonging to the FR2. Alternatively, the base station 4*a*-10 may define an indicator indicating whether to apply which DRX configuration information to each serving cell configuration information. Alternatively, the UE 4*a*-05 may determine to apply which serving cells to DRX configuration information.

The base station 4*a*-10 may configure an SCell together with the plurality of DRX configuration information to the UE 4*a*-05 in a connected mode (step 4*a*-25). According to an embodiment, the configuration information may be an RRCReconfiguration message. In this case, the UE 4*a*-05 may apply DRX configuration information corresponding to each serving cell (step 4*a*-30).

The UE 4*a*-05 may transmit, to the base station 4*a*-10, an RRCReconfigurationComplete message as a response message to the RRCReconfiguration message (step 4*a*-35). According to an embodiment, serving cell information (e.g., DRX group information) to which each DRX configuration information is applied may be stored in the RRCReconfigurationComplete message.

Although not illustrated, according to an embodiment, the UE 4*a*-05 may request the base station 4*a*-10 to reconfigure the DRX configuration when the DRX configuration needs to be reconfigured. According to an embodiment, the UE 4*a*-05 may request the base station 4*a*-10 to update a SCell list. In this case, the reconfiguration and update request may be made through a UE assistance information message.

Figure 4B:
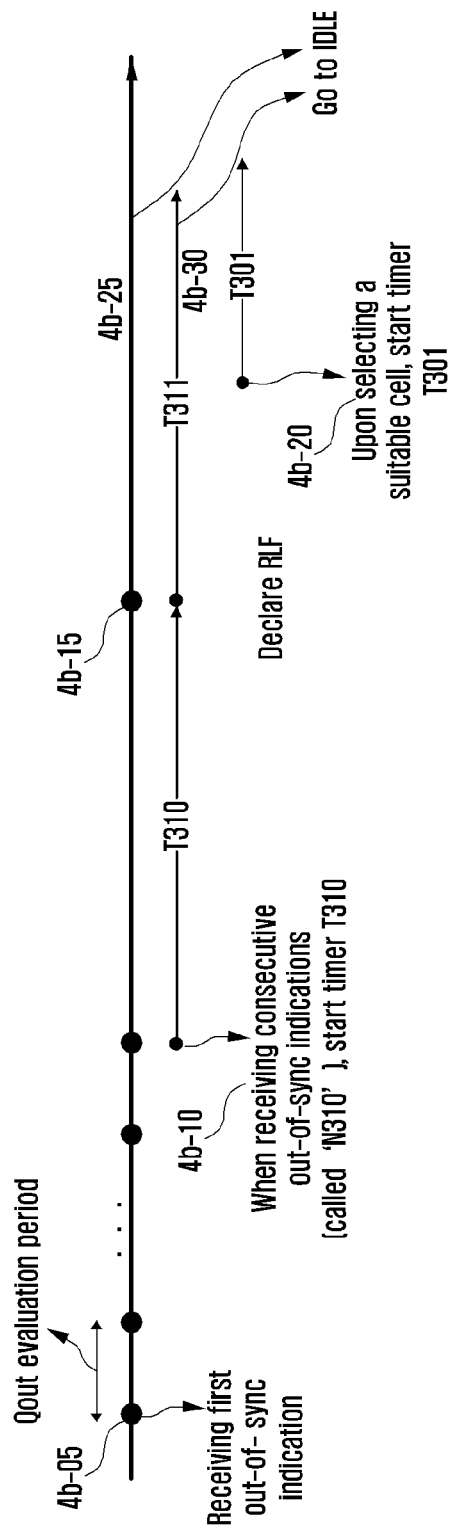
FIG. 4B is a diagram illustrating a radio link monitoring (RLM) operation according to an embodiment of the disclosure.

FIG. 4B is a diagram illustrating a radio link monitoring (RLM) operation according to an embodiment of the disclosure.

A radio link failure (RLF) may be declared according to the result from the RLM. The UE physical layer may determine whether a downlink signal quality is lower than a specific threshold Qout from a cell specific reference signal (CRS) of the serving cell at every specific period, Qout evaluation period, and T_Evaluate_out_SSB. If the signal quality is lower than a specific threshold Qout, the physical layer transmits an 'out-of-sync' indicator to a higher layer. After the 'out-of-sync' indicator is transmitted to the upper layer for the first time (4b-05), when the 'out-of-sync' indicator is transmitted to the upper layer by the specific number of times (e.g., N310), the UE drives a specific timer (e.g., T310) (4b-10). The physical layer may also determine whether the downlink signal quality is higher than a specific threshold Qin from the CRS of the serving cell for each Qout evaluation period and T_Evaluate_in_SSB. In this case, the Qout evaluation period, T_Evaluate_out_SSB, and T_Evaluate_in_SSB may be determined according to the DRX cycle, as illustrated in [Table 6] and [Table 7].

TABLE 8

| Timer | Start | Stop | At expiry |
|---|---|---|---|
| T301 | Upon transmission of RRCReestablishmentRequest | Upon reception of RRCReestablishment of RRCSetupmessage as well as when the selected cell becomes unsuitable: | Go to RRC_IDLE |
| T311 | Upon initiating the RRCconnection re-establishment procedure | Upon selection of a suitable NR cell or a cell using another RAT. | Enter RRC_IDLE |

The NR mobile communication system supports a beam operation in the FR2. Further, in order to determine whether the applying beam provides good signal strength for data

TABLE 6

Table 8.1.2.2-1: Evaluation period $T_{Evaluate\_out\_SSB}$ and $T_{Evaluate\_in\_SSB}$ for FR1

| Configuration | $T_{Evaluate\_out\_SSB}$ (ms) | $T_{Evaluate\_in\_SSB}$ (ms) |
|---|---|---|
| no DRX | Max(200, Ceil(10*P)*$T_{SSB}$) | Max(100, Ceil(5*P)*$T_{SSB}$) |
| DRX cycle ≤320 | Max(200, Ceil(15*P)*Max($T_{DRx}$,$T_{SSB}$)) | Max(100, Ceil(7.5*P)*Max($T_{DRX}$,$T_{SSB}$)) |
| DRX cycle >320 | Ceil(10*P)*$T_{DRX}$ | Ceil(5*P)*$T_{DRX}$ |

NOTE:
$T_{SSB}$ is the periodicity of the SSB configured for RLM. $T_{DRX}$ is the DRX cycle length.

TABLE 7

Table 8.1.2.2-2: Evaluation period $T_{Evaluate\_out\_SSB}$ and $T_{Evaluate\_in\_SSB}$ for FR2

| Configuration | $T_{Evaluate\_out\_SSB}$ (ms) | $T_{Evaluate\_in\_SSB}$ (ms) |
|---|---|---|
| no DRX | Max(200, Ceil(10*P*N)*$T_{SSB}$) | Max(100, Ceil(5*P*N)*$T_{SSB}$) |
| DRX cycle ≤320 | Max(200, Ceil(15*P*N)*Max($T_{DRX}$,$T_{SSB}$)) | Max(100, Ceil(7.5*P*N)*Max($T_{DRX}$,$T_{SSB}$)) |
| DRX cycle >320 | Ceil(10*P*N)*$T_{DRX}$ | Ceil(5*P*N)*$T_{DRX}$ |

NOTE:
$T_{SSB}$ is the periodicity of the SSB configured for RLM. $T_{DRX}$ is the DRX cycle length.

If the signal quality is higher than a specific threshold Qin, the physical layer transmits an 'in-sync' indicator to a higher layer. When the 'in-sync' indicator is transferred to the upper layer by the specific number of times, the UE may stop the running T310 timer. When the T310 timer is not stopped but expires, the upper layer may declare an RLF (4b-15). After the RLF is declared, the UE drives another timer (e.g., T311). The UE searches for a new suitable cell, and if a new suitable cell is not found until the T311 expires, a mode of the UE is switched to a standby mode (4b-25). When a new suitable cell is found before the T311 timer expires, the UE drives the T301 timer and performs a re-establishment process with the cell (4b-20). If the re-establishment is not successfully completed before the T301 timer expires, the UE is switched to the standby mode (4b-30). If the re-establishment is successful, the UE continues the connected mode to the cell.

An RLF may be declared by the RLM operation, and be declared according to another condition. For example, even when random access fails, an RLF may be declared (4b-35). Further, even if the number of maximum retransmissions is reached in the RLC layer, an RLF may be declared even when the packet is not successfully transmitted (4b-40). The description of the T301 and T311 operations may be the same as that illustrated in Table 8.

transmission and reception, the UE performs a beam failure detection operation at every predetermined time interval. For example, the UE determines whether the downlink radio link quality satisfies a predetermined quality threshold in the configured SSB radio resource for each T_Evaluate_BFD_SSB time interval. In this case, the T_Evaluate_BFD_SSB time interval is determined according to the DRX cycle. The following [Table 9] and [Table 10] represent the T_Evaluate_BFD_SSB time interval according to the DRX cycle in the TS38.133 standard document.

TABLE 9

Table 8.5.2.2-1: Evaluation period $T_{Evaluate\_BFD\_SSB}$ for FR1

| Configuration | $T_{Evaluate\_BFD\_SSB}$ (ms) |
|---|---|
| no DRX | Max([50], Ceil(5*P)*$T_{SSB}$) |
| DRX cycle ≤320ms | Max([50], Ceil(7.5*P)*Max($T_{DRX}$, $T_{SSB}$)) |
| DRX cycle >320ms | Ceil(5*P)*$T_{DRX}$ |

Note:

$T_{SSB}$ is the periodicity of SSB in the set $\bar{q}_\varsigma$. $T_{DRX}$ is the DRX cycle length.

TABLE 10

Table 8.5.2.2-2: Evaluation period $T_{Evaluate\_BFD\_SSB}$ for FR2

| Configuration | $T_{Evaluate\_BFD\_SSB}$ (ms) |
|---|---|
| no DRX | Max([50], Ceil(5*P)*$T_{SSB}$) |
| DRX cycle ≤320ms | Max([50], Ceil(7.5*P)*Max($T_{DRX}$, $T_{SSB}$)) |
| DRX cycle >320ms | Ceil(5*P)*$T_{DRX}$ |

Note:

$T_{SSB}$ is the periodicity of SSB in the set $\bar{q}_\zeta$. $T_{DRX}$ is the DRX cycle length.

The base station may provide configuration information related to beam failure detection and the RLM to the UE through an RRC message. For example, the RRC message may be the same as that illustrated in [Table 11], [Table 12], and [Table 13].

TABLE 11

RadioLinkMonitoringConfig information element

```
-- ASNISTART
-- TAG-RADIOLINKMONITORINGCONFIG-START
RadioLinkMonitoringConfig : =      SEQUENCE {
    failureDetectionResourcesToAddModList    SEQUENCE (SIZE (1. . maxNrofFailureDetectionResources) ) OF
RadioLinkMonitoringRS
OPTIONAL, -- Need N
    failureDetectionResourcesToReleaseList    SEQUENCE (SIZE (1. . maxNrofFailureDetectionResources) ) OF
RadioLinkMonitoringRS-Id
OPTIONAL, -- Need N
    beamFailure InstanceMaxCount          ENUMERATED {n1, n2, n3, n4, n5, n6, n8, n10}
OPTIONAL, -- Need R
    beamFailureDetectionTimer             ENUMERATED {pbfd1, pbfd2, pbfd3, pbfd4, pbfd5, pbfd6, pbfd8,
pbfd10} OPTIONAL, -- Need R
    . . .
}
RadioLinkMonitoringRS : :=         SEQUENCE {
    radioLinkMonitoringRS-Id          RadioLinkMonitoringRS-Id,
    purpose                           ENUMERATED {beamFailure, rlf, both},
    detectionResource                 CHOICE {
        ssb-Index                         SSB-Index,
        csi-RS-Index                      NZP-CSI-RS-ResourceId
    },
    . . .
}
-- TAG-RADIOLINKMONITORINGCONFIG-STOP
-- ASNISTOP
```

TABLE 12

RadioLinkMonitoringConfig field descriptions beamFailureDetectionTimer
Timer for beam failure detection (see TS 38.321 [3], clause 5.17). See also the BeamFailureRecoveryConfig IE. Value in number of "$Q_{out,LR}$ reporting periods of Beam Failure Detection" Reference Signal (see TS 38.213 [13], clause 6). Value pbfd1 corresponds to 1 $Q_{out,LR}$ reporting period of Beam Failure Detection Reference Signal, value pbfd2 corresponds to 2 $Q_{out,LR}$ reporting periods of Beam Failure Detection Reference Signal and so on.
beamFailureinstanceMaxCount
This field determines after how many beam failure events the UE triggers beam failure recovery (see TS 38.321 [3], clause 5.17), Value n1 corresponds to 1 beam failure instance, value n2 corresponds to 2 beam failure instances and so on.
failureDetectionResourcesToAddModList
A list of reference signals for detecting beam failure and/or cell level radio link failure (RLF). The limits of the reference signals that the network can configure are specified in TS 38.213 [13], table 5-1. The network configures at most two detectionResources per BWP for the purpose beamFailure of both. If no RSs are provided for the purpose of beam failure detection, the UE performs beam monitoring based on the activated TCI-State for PDCCH as described in TS 38.213 [13], clause 6. If no RSs are provided in this list for the purpose of RLF detection, the UE performs Cell-RLM based on the activated TCI-State of PDCCH as described in TS 38.213 [13], clause 5. The network ensures that the UE has a suitable set of reference signals for performing cell-RLM.

TABLE 13

RadioLinkMonitoringRS field descriptions detectionResource
A reference signal that the UE shall use for radio link monitoring or beam failure detection (depending on the indicated purpose).
purpose
Determines whether the UE shall monitor the associated reference signal for the purpose of cell- and/or beam failure detection.

Even in intra-frequency measurement, time intervals for the measurement may be determined according to the DRX cycle. For example, as in the following [Table 14] to [Table 19], both a time period used for primary synchronization signal (PSS)/secondary synchronization signal (SSS) detection and a time period used for obtaining index information (time period for time index detection) of a measured SSB may be affected by the DRX cycle.

TABLE 14

Table 9.2.5.1-1: Time period for PSS/SSS detection, (Frequency range FR1)

| DRX cycle | $T_{PSS/SSS\_sync\_intra}$ |
|---|---|
| No DRX | $\max(600 \text{ ms}, \text{ceil}(5 \times K_p) \times \text{SMTC period})^{Note\ 1} \times CSSF_{intra}$ |
| DRX cycle ≤ 320 ms | $\max(600 \text{ ms}, \text{ceil}(1.5 \times 5 \times K_p) \times \max(\text{SMTC period}, \text{DRX cycle})) \times CSSF_{intra}$ |
| DRX cycle > 320 ms | $\text{ceil}[5] \times K_p) \times \text{DRX cycle} \times CSSF_{intra}$ |

*NOTE 1:*
If different SMTC periodicities are configured for different cells, the SMTC period in the requirement is the one used by the cell being identified

TABLE 15

Table 9.2.5.1-2: Time period for PSS/SSS detection, (Frequency range FR2)

| DRX cycle | $T_{PSS/SSS\_sync\_intra}$ |
|---|---|
| No DRX | $\max(600 \text{ ms}, \text{ceil}(M_{pss/sss\_sync\_w/o\_gaps} \times K_p \times K_{layer1\_measurement}) \times \text{SMTC period})^{Note\ 1} \times CSSF_{intra}$ |
| DRX cycle ≤ 320 ms | $\max(600 \text{ ms}, \text{ceil}(1.5 \times M_{pss/sss\_sync\_w/o\_gaps} \times K_p \times K_{layer1\_measurement}) \times \max(\text{SMTC period}, \text{DRX cycle})) \times CSSF_{intra}$ |
| DRX cycle > 320 ms | $\text{ceil}(M_{pss/sss\_sync\_w/o\_gaps} \times K_p \times K_{layer1\_measurement}) \times \text{DRX cycle} \times CSSF_{intra}$ |

*NOTE 1:*
If different SMTO periodicities are configured for different cells, the SMTC period in the requirement is the one used by the cell being identified

TABLE 16

Table 9.2.5.1-3: Time period for time index detection (Frequency range FR1)

| DRX cycle | $T_{SSB\_time\_index\_intra}$ |
|---|---|
| No DRX | $\max(120 \text{ ms}, \text{ceil}(3 \times K_p) \times \text{SMTC period})^{Note\ 1} \times CSSF_{intra}$ |
| DRX cycle ≤ 320 ms | $\max(120 \text{ ms}, \text{ceil}(1.5 \times 3 \times K_p) \times \max(\text{SMTC period}, \text{DRX cycle}) \times CSSF_{intra}$ |
| DRX cycle > 320 ms | $\text{Ceil}(3 \times K_p) \times \text{DRX cycle} \times CSSF_{intra}$ |

*NOTE 1:*
If different SMTC periodicities are configured for different cells, the SMTC period in the requirement is the one used by the cell being identified

TABLE 17

Table 9.2.5.1-4: Time period for PSS/SSS detection, deactivated SCell (Frequency range FR1)

| DRX cycle | $T_{PSS/SSS\_sync\_intra}$ |
|---|---|
| No DRX | $5 \times \text{measCycleSCell} \times CSSF_{intra}$ |
| DRX cycle ≤ 320 ms | $5 \times \max(\text{measCycleSCell}, 1.5 \times \text{DRX cycle}) \times CSSF_{intra}$ |
| DRX cycle > 320 ms | $5 \times \max(\text{measCycleSCell}, \text{DRX cycle}) \times CSSF_{intra}$ |

TABLE 18

Table 9.2.5.1-5: Time period for PSS/SSS detection, deactivated SCell (Frequency range FR2)

| DRX cycle | $T_{PSS/SSS\_sync\_intra}$ |
|---|---|
| No DRX | $M_{pss/sss\_sync\_w/o\_gaps} \times \text{measCycleSCell} \times CSSF_{intra}$ |
| DRX cycle ≤ 320 ms | $M_{pss/sss\_sync\_w/o\_gaps} \times \max(\text{measCycleSCell}, 1.5 \times \text{DRX cycle}) \times CSSF_{intra}$ |
| DRX cycle > 320 ms | $M_{pss/sss\_sync\_w/o\_gaps} \times \max(\text{measCycleSCell}, \text{DRX cycle}) \times CSSF_{intra}$ |

TABLE 19

Table 9.2.5.1-6: Time period for time index detection, deactivated SCell (Frequency range FR1)

| DRX cycle | $T_{SSB\_time\_index\_intra}$ |
|---|---|
| No DRX | $3 \times \text{measCycleSCell} \times CSSF_{intra}$ |
| DRX cycle ≤ 320 ms | $3 \times \max(\text{measCycleSCell}, 1.5 \times \text{DRX cycle}) \times CSSF_{intra}$ |
| DRX cycle > 320 ms | $3 \times \max(\text{measCycleSCell}, \text{DRX cycle}) \times CSSF_{intra}$ |

In inter-frequency measurement, time intervals for the measurement may be determined according to the DRX cycle. For example, as illustrated in [Table 20] to [Table 23], both a time period used for detecting a PSS/SSS and a time period used for obtaining index information of the measured SSB (time period for time index detection) may be affected by the DRX cycle.

TABLE 20

Table 9.3.4-1: Time period for PSS/SSS detection, (Frequency range FR1)

| Condition [NOTE1,2] | $T_{PSS/SSS\_sync\_inter}$ |
|---|---|
| No DRX | max(600 ms, (8) × max(MGRP, SMTC period)) × $CSSF_{inter}$ |
| DRX cycle ≤ 320 ms | max(600 ms, ceil(8 × 1.5) × max(MGRP, SMTC period, DRX cycle)) × $CSSF_{inter}$ |
| DRX cycle > 320 ms | (8) × DRX cycle × $CSSF_{inter}$ |

NOTE 1:
DRX or non DRX requirements apply according to the conditions described in clause 3.6.1

NOTE 2:
In EN-DC operation, the parameters, timers and scheduling requests referred to in clause 3.6.1 are for the secondary cell group. The DRX cycle is the DRX cycle of the secondary cell group.

TABLE 21

Table 9.3.4-2: Time period for PSS/SSS detection, (Frequency range FR2)

| Condition [NOTE1,2] | $T_{PSS/SSS\_sync\_inter}$ |
|---|---|
| No DRX | max(600 ms, $M_{pss/sss\_sync\_inter}$ × max(MGRP, SMTC period)) × $CSSF_{inter}$ |
| DRX cycle ≤ 320 ms | max(600 ms, (1.5 × $M_{pss/sss\_sync\_inter}$) × max(MGRP, SMTC period, DRX cycle)) × $CSSF_{inter}$ |
| DRX cycle > 320 ms | $M_{pss/sss\_sync\_inter}$ × DRX cycle × $CSSF_{inter}$ |

NOTE 1:
DRX or non DRX requirements apply according to the conditions described in clause 3.6.1

NOTE 2:
In EN-DC operation, the parameters, timers and scheduling requests referred to in clause 3.6.1 are for the secondary cell group. The DRX cycle is the DRX cycle of the secondary cell group.

TABLE 22

Table 9.3.4-3: Time period for time index detection (Frequency range FR1)

| Condition [NOTE1,2] | $T_{SSB\_time\_index\_inter}$ |
|---|---|
| No DRX | max(120 ms, (3) × max(MGRP, SMTC period)) × $CSSF_{inter}$ |
| DRX cycle ≤ 320 ms | max(120 ms, ceil(3 × 1.5) × max(MGRP, SMTC period, DRX cycle)) × $CSSF_{inter}$ |
| DRX cycle > 320 ms | (3) × DRX cycle × $CSSF_{inter}$ |

NOTE 1:
DRX or non DRX requirements apply according to the conditions described in clause 3.6.1

NOTE 2:
In EN-DC operation, the parameters, timers and scheduling requests referred to in clause 3.6.1 are for the secondary cell group. The DRX cycle is the DRX cycle of the secondary cell group.

TABLE 23

Table 9.3.4-4: Time period for time index detection (Frequency range FR2)

| Condition [NOTE1,2] | $T_{SSB\_time\_index\_inter}$ |
|---|---|
| No DRX | max(200 ms, $M_{SSB\_index\_inter}$ × max(MGRP, SMTC period)) × $CSSF_{inter}$ |
| DRX cycle ≤ 320 ms | max(200 ms, (1.5 × $M_{SSB\_index\_inter}$) × max(MGRP, SMTC period, DRX cycle)) × $CSSF_{inter}$ |
| DRX cycle > 320 ms | $M_{SSB\_index\_inter}$ × DRX cycle × $CSSF_{inter}$ |

NOTE 1:
DRX or non DRX requirements apply according to the conditions described in clause 3.6.1

NOTE 2:
In EN-DC operation, the parameters, timers and scheduling requests referred to in clause 3.6.1 are for the secondary cell group. The DRX cycle is the DRX cycle of the secondary cell group.

The base station may provide measConfig and configuration information related to the cell measurement to the UE through an RRC message. For example, measConfig included in the RRC message may be the same as that illustrated in [Table 24]. The following measObject(MO) includes frequency information to be measured by the UE, and the following reportConfig may store configuration information on an event in which the UE reports a measurement result.

TABLE 24

| MeasConfig information element |
|---|
| -- ASN1START |
| -- TAG-MEASCONFIG-START |
| MeasConfig ::=                    SEQUENCE { |
|     measobjectToRemoveList        MeasObjectToRemovelist |
| OPTIONAL, -- Need N |
|     measobjectToAddModList        MeasObjectToAddModList |
| OPTIONAL, -- Need N |
|     reportConfigtoRemoveList      ReportConfigToRemoveList |
| OPTIONAL, -- Need N |
|     reportConfigtoAddModList      ReportConfigToRemoveList |
| OPTIONAL, -- Need N |
|     measIdtoRemoveList            MeasIdToRemoveList |
| OPTIONAL, -- Need N |
|     measIdToAddModList            MeasIdToAddModList |
| OPTIONAL, -- Need N |
|     s-MeasureConfig               CHOICE { |
|         ssb-RSRP                      RSRP-Range, |
|         csi-RSRP                      RSPP-Range |
|     } |
| OPTIONAL, -- Need M |
|     quantityConfig                QuantityConfig |
| OPTIONAL, -- Need M |
|     measGapConfig                 MeasGapConfig |
| OPTIONAL, -- Need M |
|     measGapSharingConfig          MeasGapSharingConfig |
| OPTIONAL, -- Need M |
|     . . . |
| } |
| MeasObjectToRemoveList ::=        SEQUENCE (SIZE (1..maxNrofObjectId)) OF MeasObjectId |
| MeasIdToRemoveList ::=            SEQUENCE (SIZE (1..maxNrofMeasId)) OF MeasId |
| ReportConfigToRemoveList ::=      SEQUENCE (SIZE (1..maxReportConfigId)) OF ReportConfigId |
| -- TAG-MEASCONFIG-STOP |
| -- ASN1START |

FIG. 4C is a flowchart illustrating a UE operation of applying multiple DRX configuration information to RLM, link recovery, and measurement operations according to an embodiment of the disclosure.

With reference to FIG. 4C, in step 4c-05, the UE may report capability information thereof to the base station. The capability information may include information (indicator) indicating that the UE may apply a plurality of DRXs when a plurality of serving cells are configured.

In step 4c-10, the UE may receive a configuration of the SCell together with multiple DRX configuration information from the base station. In this case, which DRX configuration information is to be applied to each serving cell may be configured. The serving cell belonging to the FR1 may be configured to apply first DRX configuration information, and the serving cell belonging to the FR2 may be configured to apply second DRX configuration information. Alternatively, the base station may define an indicator indicating whether to apply which DRX configuration information to the UE for each serving cell configuration information. Alternatively, the UE may determine to apply which serving cells to DRX configuration information. Further, the UE may also be provided with configuration information related to RLM, link recovery, and cell measurement from the base station.

In step 4c-15, the UE may perform RLM, link recovery, and intra-/inter-/inter-RAT measurement operations.

In step 4c-20, the UE may determine whether a plurality of connected DRX (C-DRX) cycles are applied. According to an embodiment, even if a plurality of C-DRXs are configured, one C-DRX cycle may be applied according to the base station configuration. The operation in the disclosure is performed when a plurality of C-DRX is configured to the UE and a plurality of C-DRX cycles are applied to the UE.

When a plurality of C-DRX cycles are applied to the UE, the UE may use the DRX cycle applied to the PCell in order to derive the RLM evaluation period in step 4c-25. RLM monitors a signal quality of the PCell and determines whether there is a link failure based on the result thereof. Therefore, when a plurality of DRX cycles are applied to serving cells, the UE may perform an RLM operation in consideration of the DRX cycle applied to the PCell.

In step 4c-30, when the UE performs a link recovery operation of each serving cell, the UE may apply the DRX cycle applied to each serving cell to derive a T_Evaluate_BFD_SSB time interval for detecting the beam failure.

In step 4c-35, when the UE performs an intra-frequency measurement operation of each serving cell, the UE may apply the DRX cycle applied to each serving cell to derive a time period used for detecting a PSS/SSS for performing the intra-frequency measurement and a time period for PSS/SSS detection and a time period used for obtaining index information of the measured SSB (time period for time index detection).

In step 4c-40, when the UE performs an inter-frequency measurement operation of each serving cell, the UE may select a DRX cycle used for deriving a time period used for PSS/SSS detection for performing the inter-frequency measurement and a time period used for obtaining the measured index information (time period for time index detection) of the SSB by applying one of the following options.

- Option 1: The base station may indicate, to the UE, the DRX cycle applied when measuring a frequency indicated by the measObject in the measObject IE in the measConfig IE (information element). To this end, the base station may introduce a new field to the measObject IE. The field may be used for indicating whether a first cycle or a second cycle of two applied DRX cycles, or for configuring to apply a longer period or a shorter period of two applied DRX cycles.
- Option 2: For inter-frequency measurement, the DRX cycle applied to the PCell (or SpCell) may always be applied.
- Option 3: For inter-frequency measurement, a shorter DRX cycle of two applied DRX cycles may always be applied. This is advantageous for maximizing a measurement performance.

Steps 4c-25 to 4c-40 are not performed in the described order, but specific steps thereof may be performed first, performed later, or performed simultaneously.

In step 4c-45, the UE may apply one applied DRX cycle to derive time period information necessary for the RLM, link recovery, and measurement operations.

As described in the part related to FIG. 1B, the UE may transmit information reporting preference to the base station. In particular, in the NR mobile communication system, the UE may report in more detail a preferred reconfiguration item to the base station for heat reduction compared to LTE.

Figure 5A:
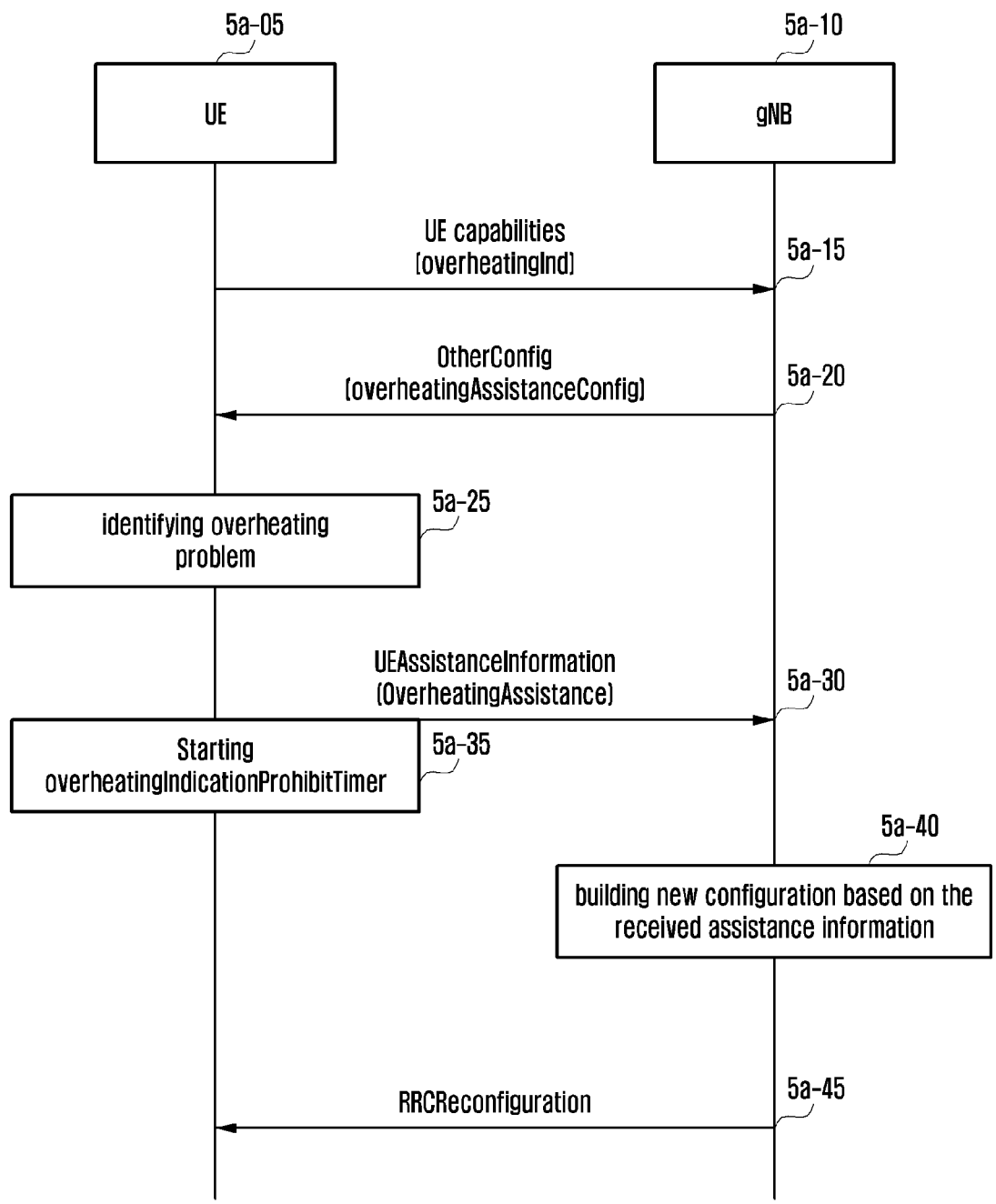
FIG. 5A is a message flow diagram illustrating a process in which a terminal reports predetermined information to a base station in order to alleviate terminal overheating in a mobile communication system according to an embodiment of the disclosure.

FIG. 5A is a message flow diagram illustrating a process in which a UE reports predetermined information to a base station in order to alleviate UE overheating in a mobile communication system according to an embodiment of the disclosure.

A UE 5a-05 may be overheated in a data transmission and reception process. Therefore, in order to alleviate a heat of the UE 5a-05, it may be necessary to reconfigure an RRC connection from a base station 5a-10. To this end, in the mobile communication system, a method in which the UE 5a-05 reports predetermined information to the base station 5a-10 was introduced to alleviate UE heat. The predetermined information reported by the UE 5a-05 to the base station 5a-10 is reconfiguration information preferred by the UE 5a-05 in order to suppress overheating of the UE 5a-05.

With reference to FIG. 5A, the UE 5a-05 reports to the base station 5a-10 that it has a capability to report the predetermined information (5a-15). The base station 5a-10 configures that the UE 5a-05 may report the predetermined information to the base station 5a-10 through an overheatingAssistanceConfig, which is a predetermined IE. overheatingAssistanceConfig includes a value of one prohibit timer, overheatingIndicationProhibitTimer. The prohibit timer is driven (5a-35) when the UE 5a-05 recognizes overheating (5a-25) and reports the predetermined information to the base station 5a-10 (5a-30), and the UE 5a-05 cannot report again the predetermined information to the base station 5a-10 while the timer is running. This is to prevent a signaling overhead from excessively occurring due to frequent trigger of a report of the predetermined information. The predetermined information is stored in the overheatingAssistance IE, and is transmitted to the base station 5a-10 through a UEAssistanceInformation message, which is one RRC message. The overheatingAssisatnce IE in the TS38.331 standard document may be the same as that illustrated in [Table 25].

TABLE 25

| | |
|---|---|
| OverheatingAssistance ::= | SEQUENCE { |
| reducedMaxCCs | SEQUENCE { |
| reducedCCsDL | INTEGER (0..31), |
| reducedCCsUL | INTEGER (0..31) |
| } OPTIONAL, | |
| reducedMaxBW-FR1 | SEQUENCE { |
| reducedBW-FR1-DL | ReducedAggregatedBandwidth, |
| reducedBW-FR1-UL | ReducedAggregatedBandwidth |
| } OPTIONAL, | |
| reducedMaxBW-FR2 | SEQUENCE { |
| reducedBW-FR2-DL | ReducedAggregatedBandwidth, |
| reducedBW-FR2-UL | ReducedAggregatedBandwidth |
| } OPTIONAL, | |
| reducedMaxMIMO-LayersFR1 | SEQUENCE { |
| reducedMIMO-LayersFR1-DL | MIMO-LayersDL, |
| reducedMIMO-LayersFR1-UL | MIMO-LayersUL |
| } OPTIONAL, | |
| reducedMaxMIMO-LayersFR2 | SEQUENCE { |
| reducedMIMO-LayersFR2-DL | MIMO-LayersDL, |
| reducedMIMO-LayersFR2-UL | MIMO-LayersUL |
| } OPTIONAL | |
| } | |

In order to prevent overheating through the overheatingAssisatnce IE, the UE 5a-05 may report reconfiguration information preferred by itself to the base station 5a-10.

reducedMaxCCs indicates the number of maximum SCells preferred by the UE 5a-05. The number of maximum SCells preferred by the UE 5a-05 is indicated for each uplink and downlink.

reducedMaxBW-FR1 and reducedMaxBW-FR2 indicate the maximum frequency bandwidth preferred by the UE 5a-05 in a frequency range 1 (FR1) and a frequency range 2 (FR2), respectively. The maximum frequency bandwidth preferred by the UE 5a-05 is indicated for each uplink and downlink. An FR is a frequency range defined by the NR standard, an FR1 means a lower frequency range based on a specific frequency, and an FR2 means an upper frequency range. reducedMaxBW-FR2 may indicate 0 MHz, which means requesting FR2 release. In reducedMaxBW-FR1, 0 MHz cannot be indicated.

reducedMaxMIMO-LayersFR1 and reducedMaxMIMO-LayersFR2 indicate the number of maximum MIMO layers preferred by the UE 5a-05 in the FR1 and the FR2, respectively. In the FR1 and the FR2, the number of maximum MIMO layers preferred by the UE is indicated for each uplink and downlink.

Upon receiving the overheatingAssistance IE, the base station 5a-10 may perform an RRC connection reconfiguration based on the reconfiguration information suggested by the UE 5a-05 (5a-40). In this case, whether an actual reconfiguration is performed and a reconfigured parameter configuration value are determined by the implementation of the base station 5a-10.

The reconfiguration information is provided from the base station 5a-10 to the UE 5a-05 through RRCReconfiguration, which is one RRC message (5a-45).

Figure 5B:
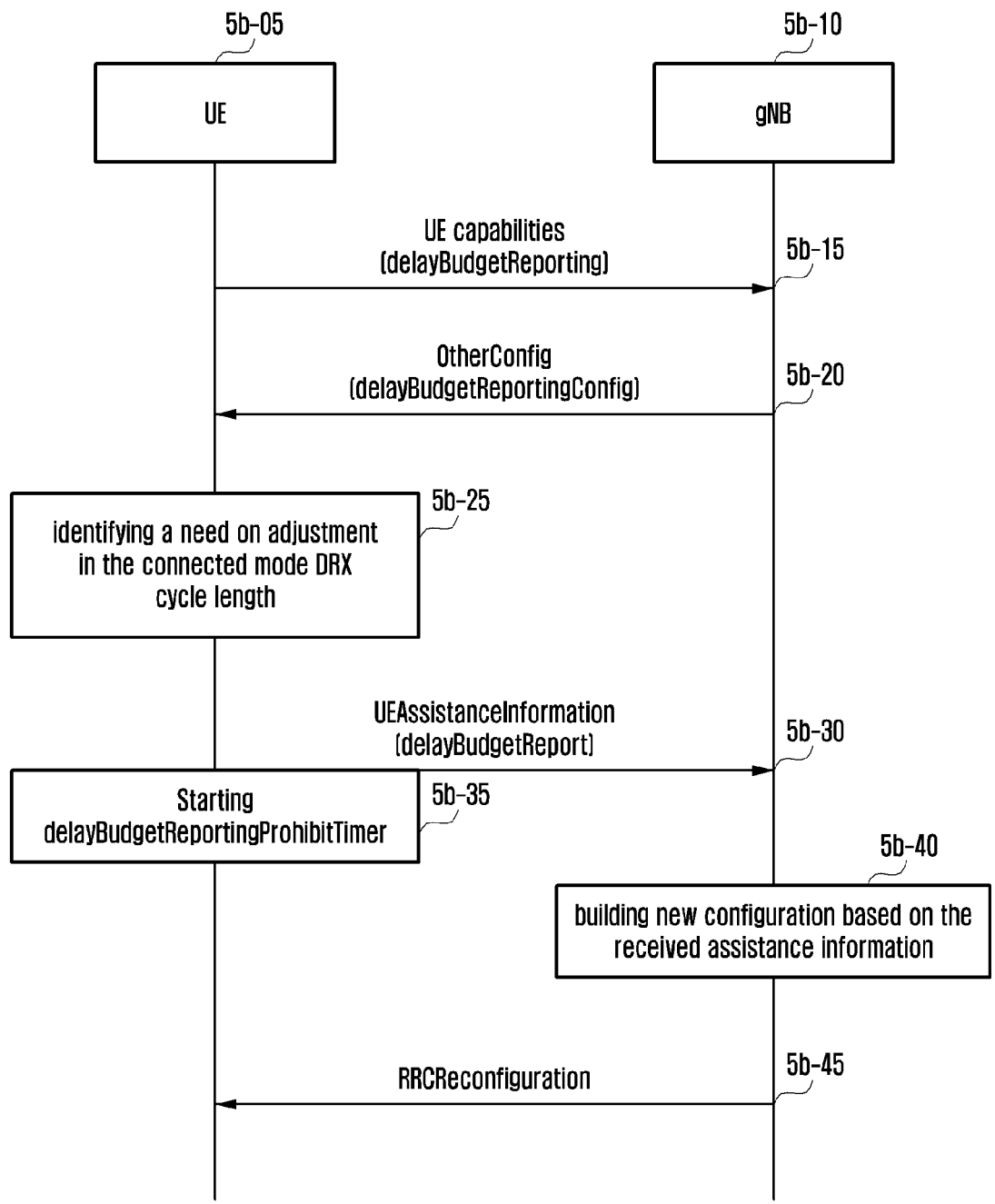
FIG. 5B is a message flow diagram illustrating a process in which a terminal reports predetermined information to a base station in order to alleviate a terminal delay phenomenon in a mobile communication system according to an embodiment of the disclosure.

FIG. 5B is a message flow diagram illustrating a process in which a UE reports predetermined information to a base station in order to alleviate a UE delay phenomenon in a mobile communication system according to an embodiment of the disclosure.

A UE 5b-05 may experience a delay in a data transmission and reception process. For a delay-sensitive service such as a VoLTE service, a predetermined delay requirement should be satisfied. Accordingly, in order to satisfy the preferred delay time, the UE 5b-05 may report DRX cycle information preferred by itself to a base station 5b-10.

With reference to FIG. 5B, the UE 5b-05 reports to the base station 5b-10 that it has a capability to report the predetermined information (5b-15). The base station 5b-10 configures that the UE 5b-05 may report the predetermined information to the base station 5b-10 through delayBudgetReportingConfig, which is a predetermined IE to the UE 5b-05. A delayBudgetReportingConfig IE includes a value of one prohibit timer and delayBudgetReportingProhibitTimer. When the UE 5b-05 recognizes an unsatisfactory delay phenomenon (5b-25) and when the predetermined information is reported (5b-30), the prohibit timer is driven (5b-35), and the UE 5b-05 cannot report again the predetermined information to the base station 5b-10 while the timer is running. This is to prevent a signaling overhead from excessively occurring due to frequent trigger of a report of the predetermined information. The predetermined information is stored in the delayBudgetReport IE, and is transmitted to the base station 5b-10 through a UEAssistanceInformation message, which is one RRC message. In the TS38.331 standard document, the delayBudgetReport IE may be the same as that of [Table 26].

TABLE 26

| | |
|---|---|
| DelayBudgetReport ::= | CHOICE { |
| type1 | ENUMERATED { |
| | msMinus1280, msMinus640, msMinus320, |
| msMinus160, msMinus80, msMinus60, msMinus40, | |
| | msMinus20, ms0, ms20, ms40, ms60, ms80, ms160, ms320, |
| ms640, ms1280}, | |
| ... | |
| } | |

In order to maintain an appropriate delay time through the delayBudgetReportingConfig IE, the UE 5b-05 may report DRX cycle information preferred by itself to the base station 5b-10. A Type1 field indicates DRX cycle information preferred by the UE 5b-05, and a unit thereof is msec. For example, ms40 means 40 msec, and msMinus40 means −40 msec.

Upon receiving the delayBudgetReportingConfig IE, the base station 5b-10 may perform an RRC connection reconfiguration based on the reconfiguration information suggested by the UE 5b-05 (5b-40). In this case, whether an actual reconfiguration is performed and a reconfigured parameter configuration value are determined by the implementation of the base station 5b-10.

The reconfiguration information is provided from the base station 5b-10 to the UE 5b-05 through RRCReconfiguration, which is one RRC message (5b-45).

The disclosure describes a process of reporting the UE assistance information in a dual connectivity (DC) scenario. In particular, the process is different according to a type of a first or second UE preference. In the disclosure, the first UE preference refers to overheating assistance information, and the second UE preference refers to delay budget, BW preference, SPS preference, and the like in addition to the overheating assistance information.

Dual connectivity is technology in which a UE is connected to two or more base stations to receive a service. In this case, two base stations to which the UE is connected may provide a service to the UE through a separate scheduler within a range not exceeding a capability of the UE through mutual interworking. A base station to which a PCell belongs is referred to as a master node (MN), and a base station to which a PCell does not belong is referred to as a secondary node (SN). There are several types of dual connectivity according to RAT to which the base stations belong. For example, dual connectivity between NR base stations is NR DC, dual connectivity between an LTE base station (PCell)-NR base station is EN-DC, and dual connectivity between an NR base station (PCell)-LTE base station is NE-DC.

Figure 5C:
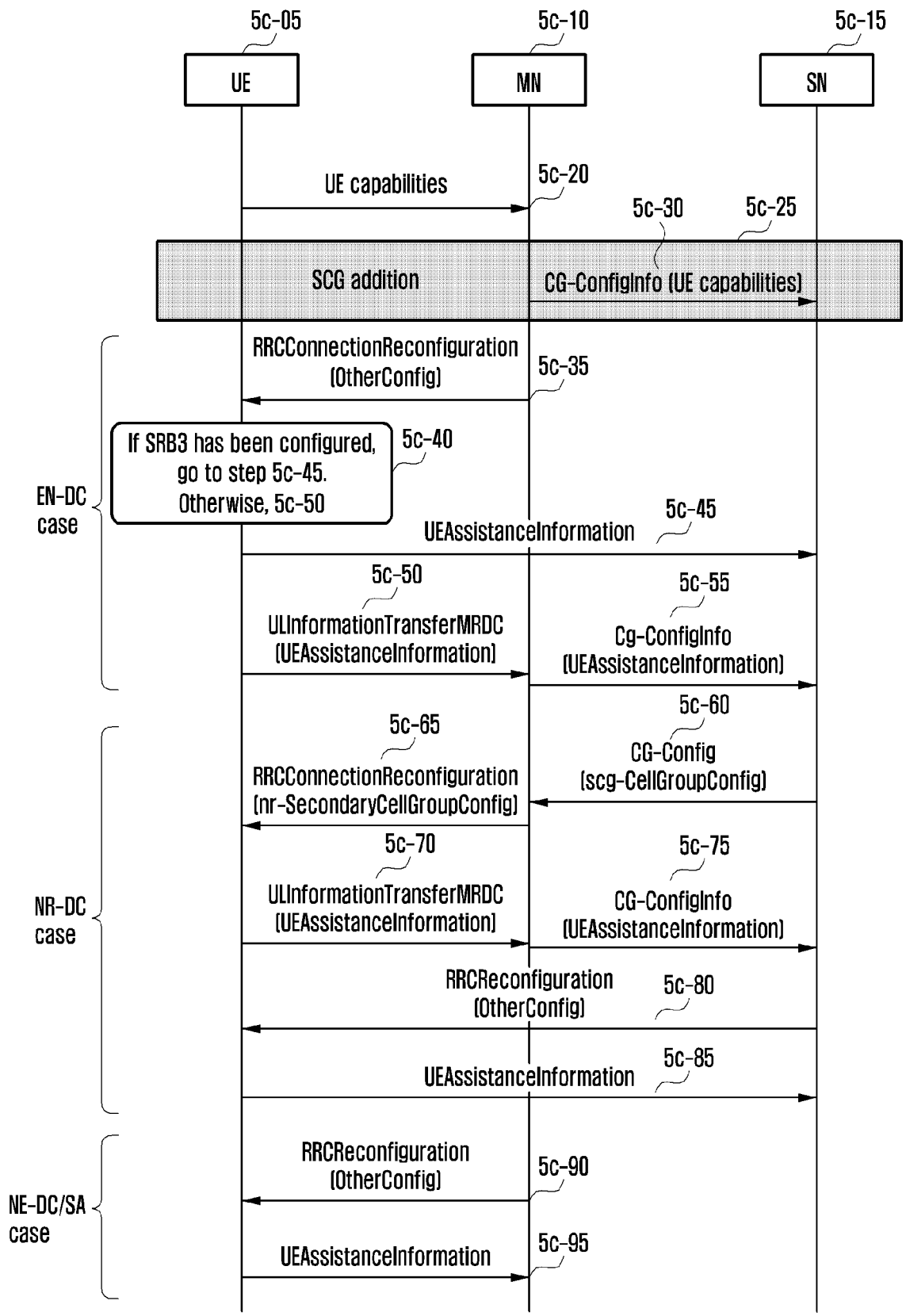
FIG. 5C is a message flow diagram illustrating a process of reporting predetermined information reporting a first terminal preference to a base station in a DC scenario according to an embodiment of the disclosure.

FIG. 5C is a message flow diagram illustrating a process of reporting predetermined information reporting a first UE preference to a base station in a DC scenario according to an embodiment of the disclosure.

A UE 5c-05 reports capability information thereof to an MN 5c-10. The capability information includes information on a capability reporting first UE overheating assistance information and a supporting DC scenario (5c-20).

The MN 5c-10 configures DC to the UE 5c-05 through coordination with an SN 5c-15 (5c-25). In the coordination process, the MN 5c-10 transmits capability information on the UE 5c-05 to the SN 5c-15 through a predetermined inter-node message (CG-ConfigInfo) (5c-30).

According to EN-DC, NR-DC, and NE-DC, the UE 5c-05 reports the first overheating assistance information to the base station (MN or SN) according to predetermined conditions.

When EN-DC is configured, the MN 5c-10 configures that the first overheating assistance information may be reported to the UE 5c-05 through a predetermined RRC message, if necessary (5c-35). The UE 5c-05 triggers an operation of reporting the first preference. For example, the UE 5c-05 may determine to report the first preference when the UE heat exceeds a predetermined threshold according to the implementation of the UE. In this case, in order to reduce heat generation, the UE 5c-05 may report the number of preferred maximum SCells, aggregated BW, and number of maximum MIMO layers to the base station. The UE 5c-05 determines whether SRB3 is configured (5c-40). If EN-DC is currently configured and SRB3 is configured, the UE 5c-05 stores the first overheating assistance information in a predetermined RRC message and UEAssistanceInformation, and transmits it to the SN 5c-15 (5c-45).

If EN-DC is currently configured and SRB3 is not configured, the UE 5c-05 stores the first overheating assistance information in a predetermined RRC message and UEInformationTransferMRDC and transmits it to the MN 5c-10 (5c-50). Upon receiving the first overheating assistance information, the MN 5c-10 stores the first overheating assistance information in a predetermined inter-node message (CG-ConfigInfo) and forwards it to the SN 5c-15 (5c-55). Upon receiving the first overheating assistance information, the SN 5c-15 triggers an RRC connection reconfiguration based on the first overheating assistance information.

When NR-DC is configured, the SN 5c-15 may configure that the first overheating assistance information may be reported to itself (i.e., the SN 5c-15), if necessary to the UE 5c-05.

If SRB3 is not configured, the SN 5c-15 transmits, to the MN 5c-10, information that the first overheating assistance information may be reported to the SN 5c-15, if necessary through a predetermined inter-node message (CG-Cofig) (5c-60). The MN 5c-10 that has received the configuration information stores information that the first overheating assistance information may be reported to the SN 5c-15, if necessary in a predetermined RRC message and RRCConnectionReconfiguration and transmits it to the UE 5c-05 (5c-65).

The UE 5c-05 triggers an operation of reporting the first preference. The UE 5c-05 stores the first overheating assistance information in a predetermined RRC message and UEInformationTransferMRDC, and transmits it to the MN 5c-10 (5c-70). Upon receiving the first overheating assistance information, the MN 5c-10 stores the first overheating assistance information in a predetermined inter-node message (CG-ConfigInfo) and forwards it to the SN 5c-15 (5c-75).

If SRB3 is configured, the SN 5c-15 directly transmits to the UE 5c-05 that the first overheating assistance information may be reported to itself (i.e., the SN 5c-15), if necessary using the predetermined RRC message and RRCReconfiguration through a predetermined inter-node message (CG-Cofig) (5c-80). The UE 5c-05 triggers an operation of reporting the first preference. The UE 5c-05 stores the first overheating assistance information in a predetermined RRC message and UEAssistanceInformation, and transmits it to the SN 5c-15 (5c-85).

In case of NE-DC or SA (Standalone), the MN 5c-10 configures that the first overheating assistance information may be reported to the UE 5c-05, if necessary through a predetermined RRC message and RRCReconfiguration (5c-90). The UE 5c-05 triggers an operation of reporting the first preference. The UE 5c-05 stores the first overheating assistance information in a predetermined RRC message and UEAssistanceInformation, and transmits it to the MN 5c-10 (5c-95).

Figure 5D:
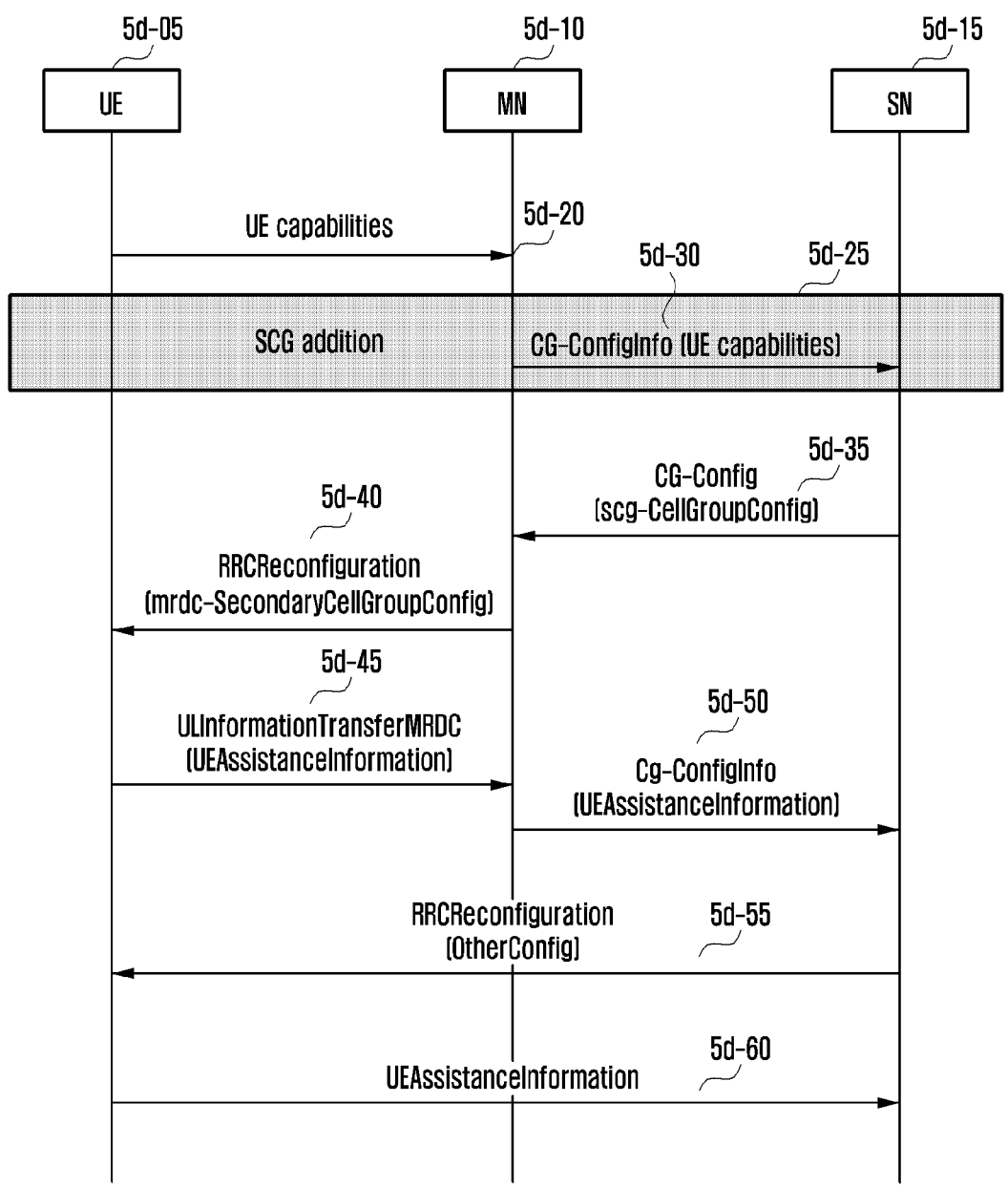
FIG. 5D is a message flow diagram illustrating a process of reporting predetermined information reporting a second terminal preference to a base station in a DC scenario according to an embodiment of the disclosure.

FIG. 5D is a message flow diagram illustrating a process of reporting predetermined information reporting a second UE preference to a base station in a DC scenario according to an embodiment of the disclosure.

A UE 5d-05 reports capability information thereof to an MN 5d-10. The capability information includes information on a capability reporting the second UE preference (e.g., delay budget, BW preference, SPS preference, and the like) and a supporting DC scenario (5d-20).

The MN 5d-10 configures DC to the UE 5d-05 through coordination with an SN 5d-15 (5d-25). In the coordination process, the MN 5d-10 transmits capability information of the UE 5d-05 to the SN 5d-15 through a predetermined inter-node message (CG-ConfigInfo) (5d-30).

The SN 5d-15 may configure that the second assistance information may be reported to itself (i.e., the SN 5d-15), if necessary to the UE 5d-05.

If SRB3 is not configured, the SN 5d-15 transmits information that the second assistance information may be reported to the SN 5d-15, if necessary to the MN 5d-10 through a predetermined inter-node message (CG-Cofig) (5d-35). Upon receiving information that the second assistance information may be reported to the SN 5d-15, if necessary, the MN 5d-10 stores information that the second assistance information may be reported to the SN 5d-15, if necessary in a predetermined RRC message and RRCReconfiguration (or RRCConnectionReconfiguration) and transmits it to the UE 5d-05 (5d-40).

The UE 5d-05 triggers an operation of reporting the second preference. The UE 5d-05 stores the second assistance information in a predetermined RRC message and UEInformationTransferMRDC, and transmits it to the MN 5d-10 (5d-45). Upon receiving the second assistance information, the MN 5d-10 stores the second assistance information in a predetermined inter-node message (CG-ConfigInfo) and forwards the message to the SN 5d-15 (5d-50).

If SRB3 is configured, the SN 5d-15 directly transmits to the UE 5d-05 that the second assistance information may be reported to itself (i.e., the SN 5d-15), if necessary using a predetermined RRC message and RRCReconfiguration through a predetermined inter-node message (CG-Cofig) (5d-55). The UE 5d-05 triggers an operation of reporting the second preference. The UE 5d-05 stores the second assistance information in a predetermined RRC message and UEAssistanceInformation, and transmits it to the SN 5d-15 (5d-60).

FIG. 5E is a flowchart illustrating an operation of a UE according to an embodiment of the disclosure.

In step 5e-05, the UE receives the otherConfig IE configured to be able to report the UE preference (the first UE preference or the second UE preference) from the base station (MN or SN).

In step 5e-10, the UE triggers an operation of reporting the UE preference.

In step 5e-15, the UE determines a type of currently configured dual connectivity (DC).

In step 5e-20, if the configured DC is (NG)EN-DC, the UE determines whether SRB3 has been configured.

In step 5e-25, if SRB3 has been configured, the UE transmits UEAssistanceInformation containing the UE assistance information to the SN through the SRB3.

In step 5e-30, if SRB3 has been not configured, the UE transmits ULInformationTransferMRDC containing the UE assistance information to the MN.

In step 5e-35, if the configured DC is NR-DC, the UE determines whether the received otherCofig IE is received by being stored in mrdc-SecondaryCellGroupConfig through SRB1 or received through SRB3.

In step 5e-40, if the otherCofig IE is received by being stored in mrdc-SecondaryCellGroupConfig through SRB1 or received through SRB3, the UE determines whether SRB3 has been configured.

In step 5e-45, if SRB3 has been configured, the UE transmits UEAssistanceInformation containing the UE assistance information to the SN through the SRB3.

In step 5e-50, if SRB3 has been not configured, the UE transmits ULInformationTransferMRDC containing the UE assistance information to the MN.

In step 5e-55, if the received otherCofig IE is stored in mrdc-SecondaryCellGroupConfig through SRB1 but is not received, and is not received through SRB3, the UE transmits UEAssistanceInformation containing the UE assistance information to the MN through SRB1.

Figure 5F:
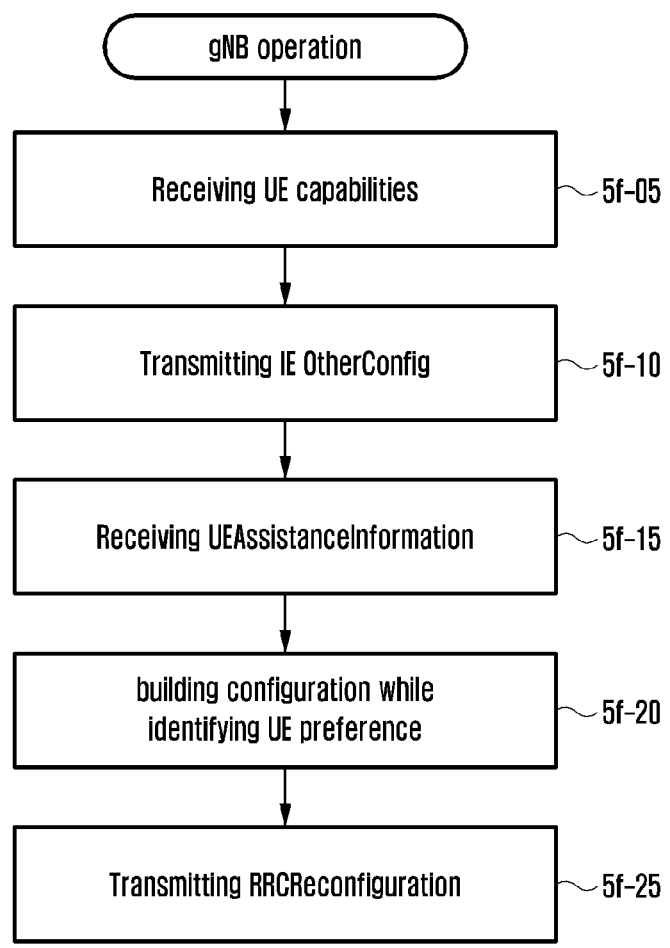
FIG. 5F is a flowchart illustrating an operation of a base station according to an embodiment of the disclosure.

FIG. 5F is a flowchart illustrating an operation of a base station according to an embodiment of the disclosure.

In step 5f-05, the base station receives UE capability information from the UE.

In step 5f-10, the base station transmits IE otherConfig including IE overheatingAssistanceConfig and IE powerPreferenceAssistanceConfig to the UE.

In step 5*f*-15, the base station receives a UEAssistanceInformation message from the UE. The UEAssistanceInformation message may include IE overheatingAssistance or IE powerPreferenceAssistance.

In step 5*f*-20, the base station configures configuration parameters based on the UEAssistanceInformation message received from the UE.

In step 5*f*-25, the base station stores the configuration information (i.e., configuration parameters) in an RRCReconfiguration message and transmits the message to the UE.

Figure 6:
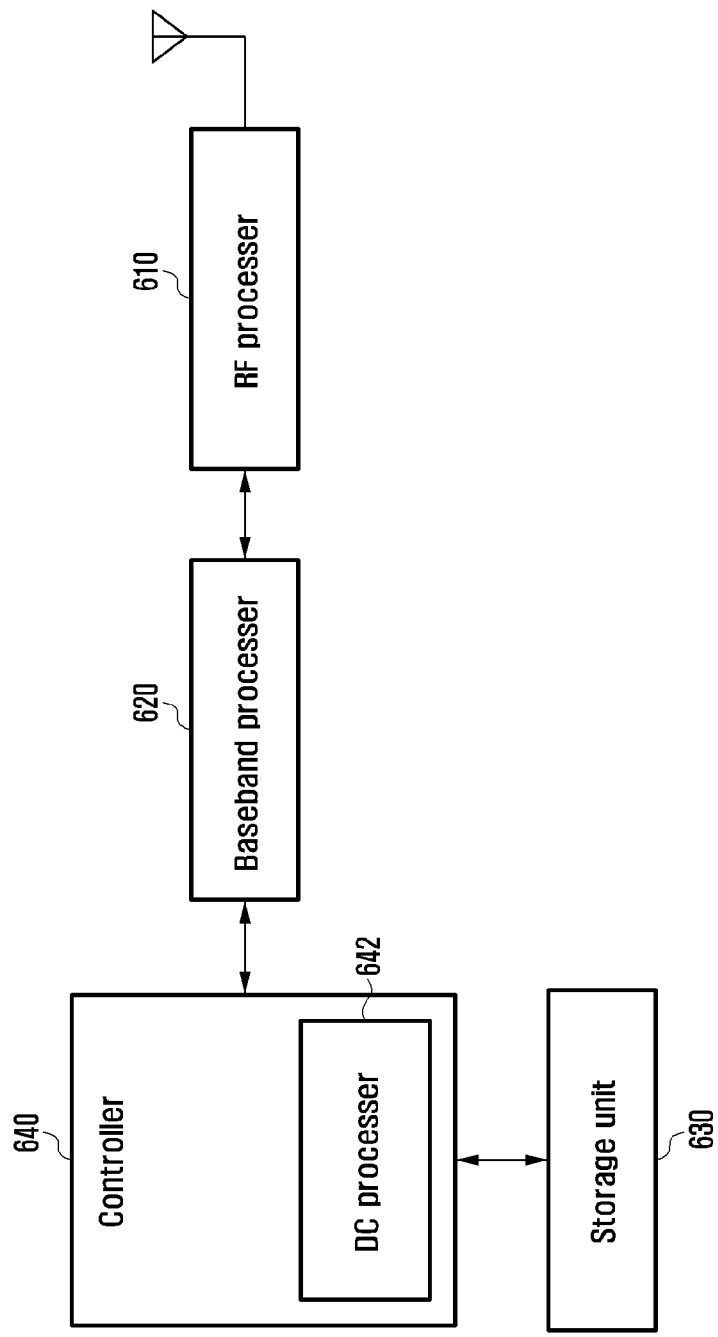
FIG. 6 is a block diagram illustrating an internal structure of a terminal according to an embodiment of the disclosure.

FIG. 6 is a block diagram illustrating an internal structure of a UE according to an embodiment of the disclosure.

With reference to FIG. 6, the UE includes a radio frequency (RF) processor 610, a baseband processor 620, a storage unit 630, and a controller 640.

The RF processor 610 performs a function for transmitting and receiving a signal through a wireless channel, such as band conversion and amplification of the signal. That is, the RF processor 610 up-converts a baseband signal provided from the baseband processor 620 into an RF band signal, transmits the RF band signal through an antenna, and down-converts the RF band signal received through the antenna into a baseband signal. For example, the RF processor 610 may include a transmission filter, a reception filter, an amplifier, a mixer, an oscillator, a digital to analog converter (DAC), an analog to digital converter (ADC), and the like. In FIG. 11, only one antenna is illustrated, but the UE may include a plurality of antennas. Further, the RF processor 610 may include a plurality of RF chains. Furthermore, the RF processor 610 may perform beamforming. For the beamforming, the RF processer 610 may adjust a phase and magnitude of each of signals transmitted and received through a plurality of antennas or antenna elements. Further, the RF processor may perform MIMO, and receive multiple layers when performing a MIMO operation.

The baseband processor 620 performs a function of converting a baseband signal and a bit string according to a physical layer standard of the system. For example, when transmitting data, by encoding and modulating a transmission bit string, the baseband processor 620 generates complex symbols. Further, when receiving data, by demodulating and decoding the baseband signal provided from the RF processer 610, the baseband processer 620 restores a received bit string. For example, in the case of following an orthogonal frequency division multiplexing (OFDM) scheme, when transmitting data, by encoding and modulating a transmission bit string, the baseband processor 620 generates complex symbols, maps the complex symbols to subcarriers, and then configures OFDM symbols through inverse fast Fourier transform (IFFT) operation and cyclic prefix (CP) insertion. Further, when receiving data, the baseband processor 620 divides the baseband signal provided from the RF processor 610 into OFDM symbol units, restore signals mapped to subcarriers through a fast Fourier transform (FFT) operation, and then restores the received bit string through demodulation and decoding.

The baseband processor 620 and the RF processor 610 transmit and receive signals, as described above. Accordingly, the baseband processor 620 and the RF processor 610 may be referred to as a transmitter, a receiver, a transceiver, or a communication unit. Furthermore, in order to support a plurality of different wireless access technologies, at least one of the baseband processor 620 and the RF processor 610 may include a plurality of communication modules. Further, in order to process signals of different frequency bands, at least one of the baseband processor 620 and the RF processor 610 may include different communication modules. For example, the different wireless access technologies may include a wireless LAN (e.g., IEEE 802.11), a cellular network (e.g., LTE), and the like. Further, the different frequency bands may include a super high frequency (SHF) (e.g., 2.NRHz, NRhz) band and a millimeter wave (e.g., 60 GHz) band.

The storage unit 630 stores data such as a basic program, an application program, and configuration information for an operation of the UE. In particular, the storage unit 630 may store information related to a second access node that performs wireless communication using second wireless access technology. Further, the storage unit 630 provides stored data according to the request of the controller 640.

The controller 640 controls overall operations of the UE so as to perform the operation according to the embodiment described in the part related to FIGS. 1A to 5F. For example, the controller 640 transmits and receives signals through the baseband processor 640 and the RF processor 610. Further, the controller 640 writes and reads data in the storage unit 630. To this end, the controller 640 may include at least one processor. For example, the controller 640 may include a communication processor (CP) that controls for communication and an application processor (AP) that controls an upper layer such as an application program.

Figure 7:
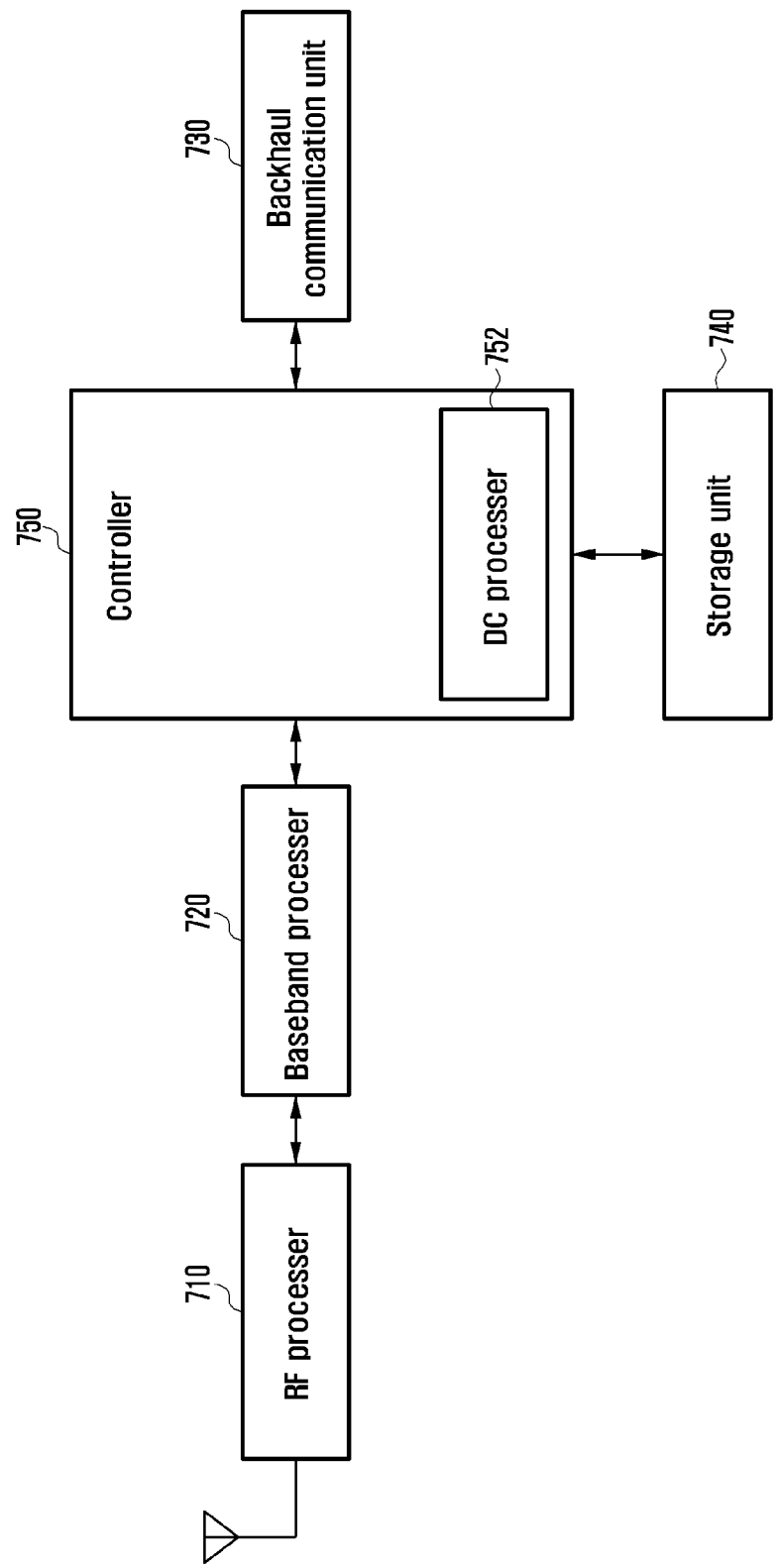
FIG. 7 is a block diagram illustrating the configuration of a base station according to an embodiment of the disclosure.

FIG. 7 is a block diagram illustrating the configuration of a base station according to an embodiment of the disclosure.

As illustrated in FIG. 7, the base station includes an RF processor 710, a baseband processor 720, a backhaul communication unit 730, a storage unit 740, and a controller 750.

The RF processor 710 performs a function for transmitting and receiving a signal through a wireless channel, such as band conversion and amplification of the signal. That is, the RF processor 710 up-converts a baseband signal provided from the baseband processor 720 into an RF band signal, transmits the baseband signal through an antenna, and down-converts the RF band signal received through the antenna into a baseband signal. For example, the RF processer 710 may include a transmission filter, a reception filter, an amplifier, a mixer, an oscillator, a DAC, an ADC, and the like. Although only one antenna is illustrated in the drawing, the first access node may include a plurality of antennas. Further, the RF processer 710 may include a plurality of RF chains. Furthermore, the RF processer 710 may perform beamforming. For the beamforming, the RF processer 710 may adjust a phase and magnitude of each of signals transmitted and received through a plurality of antennas or antenna elements. By transmitting one or more layers, the RF processor 710 may perform a downlink MIMO operation.

The baseband processor 720 performs a function of converting a baseband signal and a bit string according to a physical layer standard of first radio access technology. For example, when transmitting data, by encoding and modulating a transmission bit string, the baseband processor 720 generates complex symbols. Further, when receiving data, by demodulating and decoding a baseband signal provided from the RF processor 710, the baseband processor 720 restores a received bit string. For example, in the case of following the OFDM scheme, when transmitting data, by encoding and modulating a transmission bit string, the baseband processor 720 generates complex symbols, maps the complex symbols to subcarriers, and configures OFDM symbols through an IFFT operation and CP insertion. Further, upon data reception, the baseband processer 720 divides the baseband signal provided from the RF processer 710 into OFDM symbol units, restores signals mapped to subcarriers through an FFT operation, and then recovers the received bit string through demodulation and decoding. The baseband processor 720 and the RF processor 710 transmit and receive signals, as described above. Accordingly, the baseband processor 720 and the RF processor 710 may be referred to as a transmitter, a receiver, a transceiver, a communication unit, or a RF unit.

The backhaul communication unit 730 provides an interface for communicating with other nodes in the network. That is, the backhaul communication unit 730 converts a bit string transmitted from the main base station to another node, for example, an auxiliary base station, a core network, and the like into a physical signal, and converts a physical signal received from the other node into a bit string.

The storage unit 740 stores data such as a basic program, an application program, and configuration information for an operation of the main base station. In particular, the storage unit 740 may store information on bearer assigned to an accessed UE, a measurement result reported from the accessed UE, and the like. Further, the storage unit 740 may store information serving as a criterion for determining whether to provide or stop dual connectivity to the UE. Further, the storage unit 740 provides stored data according to a request of the controller 750.

The controller 750 controls overall operations of the base station so as to perform an operation according to the embodiment described in the part related to FIGS. 1A to 5F. For example, the controller 750 transmits and receives signals through the baseband processor 720 and the RF processor 710 or through the backhaul communication unit 730. Further, the controller 750 writes and reads data in the storage unit 740. To this end, the controller 750 may include at least one processor.

Methods according to the embodiments described in the claims or specifications of the disclosure may be implemented in the form of hardware, software, or a combination of hardware and software.

When implemented in software, a computer readable storage medium storing one or more programs (software modules) may be provided. One or more programs stored in the computer readable storage medium are configured for execution by one or more processors in an electronic device. The one or more programs include instructions for causing an electronic device to execute methods according to embodiments described in a claim or specification of the disclosure.

Such programs (software modules, software) may be stored in a random access memory, a non-volatile memory including a flash memory, a read only memory (ROM), an electrically erasable programmable ROM (EEPROM), a magnetic disc storage device, a compact disc-ROM (CD-ROM), digital versatile discs (DVDs), any other form of optical storage device, or a magnetic cassette. Alternatively, the programs may be stored in a memory configured with a combination of some or all thereof. Further, each configuration memory may be included in the plural.

Further, the program may be stored in an attachable storage device that may access through a communication network such as the Internet, Intranet, local area network (LAN), wide area network (WAN), or storage area Network (SAN), or a communication network configured with a combination thereof. Such a storage device may access to a device implementing an embodiment of the disclosure through an external port. Further, a separate storage device on a communication network may access to a device implementing the embodiment of the disclosure.

In the specific embodiments of the disclosure described above, elements included in the disclosure are expressed in the singular or plural according to the specific embodiments presented. However, the singular or plural expression is appropriately selected for a situation presented for convenience of description, and the disclosure is not limited to the singular or plural element, and even if a component is represented in the plural, it may be configured with the singular, or even if a component is represented in the singular, it may be configured with the plural.

In the detailed description of the disclosure, although specific embodiments have been described, various modifications are possible without departing from the scope of the disclosure. Therefore, the scope of the disclosure should not be limited to the described embodiments and should be defined by the claims described below as well as by those equivalent to the claims.

The invention claimed is:

1. A method performed by a user equipment (UE) of a wireless communication system, the method comprising:
receiving, from a first base station, a radio resource control (RRC) message including assistance configuration information, wherein the assistance configuration information includes a timer for prohibiting a report of first assistance information;
detecting an internal overheating; and
transmitting, to a second base station via the first base station, second assistance information for a secondary cell group (SCG) based on the detection,
wherein the timer is applied to prohibit a report of the second assistance information for the SCG, and
wherein the assistance configuration information indicates to transmit at least one of the first assistance information based on a detection of an internal overheating of the UE or the second assistance information based on a detection of an internal overheating of the SCG for the UE.

2. The method of claim 1, wherein the first assistance information includes at least one of first UE preference information on a UE category or second UE preference information on a maximum number of secondary cells (SCells), and
wherein the first assistance information is not transmitted to the first base station while the timer is running.

3. The method of claim 1, wherein the second assistance information includes at least one of third UE preference information on a maximum number of SCells, fourth UE preference information on a maximum frequency bandwidth in a frequency range 1 (FR1), fifth UE preference information on a maximum frequency bandwidth in a frequency range 2 (FR2), sixth UE preference information on a maximum number of multi input multi output (MIMO) layers in the FR1, or seventh information on a maximum number of MIMO layers in the FR2.

4. The method of claim 1, wherein the first base station is a long term evolution (LTE) base station and the second base station is a new radio (NR) base station, and
wherein the UE is in an evolved universal terrestrial radio access (E-UTRA)-NR dual connectivity (EN-DC) by the first base station and the second base station.

5. A method performed by a first base station in a wireless communication system, the method comprising:
transmitting, to a user equipment (UE), a radio resource control (RRC) message including assistance configuration information, wherein the assistance configuration information includes a timer for prohibiting a report of first assistance information;

receiving, from the UE, second assistance information for a secondary cell group (SCG); and transmitting, to a second base station, the second assistance information for the SCG, wherein the timer is applied to prohibit a report of the second assistance information, and wherein the assistance configuration information indicates to receive at least one of the first assistance information based on a detection of an internal overheating of the UE or the second assistance information based on an internal overheating of the SCG of the UE.

6. The method of claim 5, wherein the first assistance information includes at least one of first UE preference information on a UE category or second UE preference information on a maximum number of secondary cell (SCells), and wherein the first assistance information is not transmitted, to the first base station, while the timer is running.

7. The method of claim 5, wherein second assistance information includes at least one of third UE preference information on a maximum number of SCells, fourth UE preference information on a maximum frequency bandwidth in a frequency range 1 (FR1), fifth UE preference information on a maximum frequency bandwidth in a frequency range 2 (FR2), sixth UE preference information on a maximum number of multi input multi output (MIMO) layers in the FR1, or seventh information on a maximum number of MIMO layers in the FR2, and wherein the first base station is a long term evolution (LTE) base station and the second base station is a new radio (NR) base station.

8. A user equipment (UE) of a wireless communication system, the UE comprising:

a transceiver; and a controller configured to:

receive, from a first base station through the transceiver, a radio resource control (RRC) message including assistance configuration information, wherein the assistance configuration information includes a timer for prohibiting a report of first assistance information, detect an internal overheating, and transmit, to a second base station via the first base station, second assistance information for a secondary cell group (SCG) based on the detection, wherein the timer is applied to prohibit a report of the second assistance information for the SCG, and wherein the assistance configuration information indicates to transmit at least one of the first assistance information based on a detection of an internal overheating of the UE or the second assistance information based on a detection of an internal overheating of the SCG for the UE.

9. The UE of claim 8, wherein the first assistance information includes at least one of first UE preference information on a UE category or second UE preference information on a maximum number of secondary cell (SCell), and wherein the first assistance information is not transmitted to the first base station while the timer is running.

10. The UE of claim 8, wherein the second assistance information includes at least one of third UE preference information on a maximum number of SCells, fourth UE preference information on a maximum frequency bandwidth in a frequency range 1 (FR1), fifth UE preference information on a maximum frequency bandwidth in a frequency range 2 (FR2), sixth UE preference information on a maximum number of multi input multi output (MIMO) layers in the FR1, or seventh information on a maximum number of MIMO layers in the FR2.

11. The UE of claim 8, wherein the first base station is a long term evolution (LTE) base station and the second base station is a new radio (NR) base station, and wherein the UE is in an evolved universal terrestrial radio access (E-UTRA)-NR dual connectivity (EN-DC) by the first base station and the second base station.

12. A first base station of a wireless communication system, the first base station comprising:

a transceiver; and a controller configured to:

transmit, to a user equipment (UE), a radio resource control (RRC) message including assistance configuration information, wherein the assistance configuration information includes a timer for prohibiting a report of first assistance information, receive, from the UE, second assistance information for a secondary cell group (SCG), and transmitting, to a second base station, the second assistance information for the SCG, wherein the timer is applied to prohibit a report of the second assistance information, and wherein the assistance configuration information indicates to receive at least one of the first assistance information based on a detection of an internal overheating of the UE or the second assistance information based on an internal overheating of the SCG of the UE.

13. The first base station of claim 12, wherein the first assistance information includes at least one of first UE preference information on a UE category or second UE preference information on a maximum number of secondary cell (SCell), and wherein the first assistance information is not transmitted, to the first base station, while the timer is running.

14. The first base station of claim 12, wherein second assistance information includes at least one of third UE preference information on a maximum number of SCells, fourth UE preference information on a maximum frequency bandwidth in a frequency range 1 (FR1), fifth UE preference information on a maximum frequency bandwidth in a frequency range 2 (FR2), sixth UE preference information on a maximum number of multi input multi output (MIMO) layers in the FR1, or seventh information on a maximum number of MIMO layers in the FR2, and wherein the first base station is a long term evolution (LTE) base station and the second base station is a new radio (NR) base station.

15. A method performed by a second base station in a wireless communication system, the method comprising:

receiving, from a first base station, second assistance information for a secondary cell group (SCG), wherein a timer for prohibiting a report of first assistance information to the first base station is applied to prohibit a report of the second assistance information, and wherein the first assistance information is associated with a detection of an internal overheating of a user equipment (UE) and the second assistance information is associated with a detection of an internal overheating of the SCG.

16. The method of claim 15, wherein the first assistance information includes at least one of first UE preference information on a UE category or second UE preference information on a maximum number of secondary cell (SCell).

17. The method of claim 15, wherein the second assistance information includes at least one of third UE preference information on a maximum number of SCells, fourth UE preference information on a maximum frequency bandwidth in a frequency range 1 (FR1), fifth UE preference information on a maximum frequency bandwidth in a frequency range 2 (FR2), sixth UE preference information on a maximum number of multi input multi output (MIMO) layers in the FR1, or seventh information on a maximum number of MIMO layers in the FR2, and wherein the first base station is a long term evolution (LTE) base station and the second base station is a new radio (NR) base station.

18. A second base station of a wireless communication system, the second base station comprising:

a transceiver; and a controller configured to:

receive, from a first base station, second assistance information for a secondary cell group (SCG), wherein a timer for prohibiting a report of first assistance information to the first base station is applied to prohibit a report of the second assistance information, and wherein the first assistance information is associated with a detection of an internal overheating of a user equipment (UE) and the second assistance information is associated with a detection of an internal overheating of the SCG.

19. The second base station of claim 18, wherein the first assistance information includes at least one of first UE preference information on a UE category or second UE preference information on a maximum number of secondary cell (SCell), and wherein the first assistance information is not transmitted, to the first base station, while the timer is running.

20. The second base station of claim 18, wherein the second assistance information includes at least one of third UE preference information on a maximum number of SCells, fourth UE preference information on a maximum frequency bandwidth in a frequency range 1 (FR1), fifth UE preference information on a maximum frequency bandwidth in a frequency range 2 (FR2), sixth UE preference information on a maximum number of multi input multi output (MIMO) layers in the FR1, or seventh information on a maximum number of MIMO layers in the FR2, and wherein the first base station is a long term evolution (LTE) base station, and the second base station is a new radio (NR) base station.

\* \* \* \* \*